United States Patent
Paladugu et al.

(10) Patent No.: US 10,687,263 B2
(45) Date of Patent: Jun. 16, 2020

(54) ENHANCED MAKE-BEFORE-BREAK HANDOVER

(71) Applicant: QUALCOMM Incorporated, San Diego, CA (US)

(72) Inventors: Karthika Paladugu, San Diego, CA (US); Gavin Bernard Horn, La Jolla, CA (US); Prashanth Haridas Hande, San Diego, CA (US); Keiichi Kubota, Tokyo (JP); Prasad Reddy Kadiri, San Diego, CA (US); Alberto Rico Alvarino, San Diego, CA (US); Masato Kitazoe, Hachiouji (JP); Umesh Phuyal, San Diego, CA (US); Supratik Bhattacharjee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/275,214

(22) Filed: Feb. 13, 2019

(65) Prior Publication Data
US 2019/0253945 A1    Aug. 15, 2019

Related U.S. Application Data

(60) Provisional application No. 62/631,479, filed on Feb. 15, 2018, provisional application No. 62/631,350, filed on Feb. 15, 2018.

(51) Int. Cl.
*H04W 36/18* (2009.01)
*H04W 36/08* (2009.01)
(Continued)

(52) U.S. Cl.
CPC ....... *H04W 36/18* (2013.01); *H04W 12/0013* (2019.01); *H04W 12/04* (2013.01);
(Continued)

(58) Field of Classification Search
CPC ......... H04W 36/0072; H04W 36/0005; H04W 36/08; H04W 88/08; H04W 36/0055;
(Continued)

(56) References Cited

U.S. PATENT DOCUMENTS

2015/0215827 A1    7/2015  Zhang et al.
2016/0029213 A1*   1/2016  Rajadurai ............. H04W 12/04
                                                          380/283
(Continued)

FOREIGN PATENT DOCUMENTS

WO        2017138978 A1    8/2017

OTHER PUBLICATIONS

3GPP TS 36.323 V14.4.0, dated Sep. 2017 (Year: 2017).*
(Continued)

*Primary Examiner* — Daniel Lai
(74) *Attorney, Agent, or Firm* — Harrity & Harrity, LLP\Qualcomm

(57) ABSTRACT

Various aspects of the present disclosure generally relate to wireless communication. In some aspects, a user equipment concurrently communicates with a source base station (BS) and a target BS on a connection with the source BS and a connection with the target BS as part of a make-before-break (MBB) handover procedure; and performs a common packet data convergence protocol (PDCP) function for the connection with the source BS and the connection with the target BS before the connection with the source BS is released as part of the MBB handover procedure. Numerous other aspects are provided.

30 Claims, 26 Drawing Sheets

(51) Int. Cl.
*H04W 76/27* (2018.01)
*H04W 12/00* (2009.01)
*H04W 12/04* (2009.01)
*H04W 12/10* (2009.01)
*H04W 36/00* (2009.01)

(52) U.S. Cl.
CPC ... *H04W 12/1006* (2019.01); *H04W 36/0069* (2018.08); *H04W 36/08* (2013.01); *H04W 76/27* (2018.02)

(58) Field of Classification Search
CPC . H04W 36/0083; H04W 36/12; H04W 36/24; H04W 24/02; H04W 72/0426; H04W 72/044; H04W 36/0077; H04W 12/10; H04W 56/0015; H04W 36/04; H04W 36/0016; H04W 36/0033; H04W 36/0069; H04W 36/18; H04W 36/36; H04W 72/04; H04W 36/00; H04W 36/023; H04W 36/28; H04W 40/24; H04W 12/0013; H04W 12/04; H04W 28/06; H04W 28/12; H04W 36/0022; H04W 12/1006; H04W 76/27
See application file for complete search history.

(56) References Cited

U.S. PATENT DOCUMENTS

| | | | |
|---|---|---|---|
| 2016/0057687 A1* | 2/2016 | Horn | H04W 24/10 370/331 |
| 2017/0374578 A1* | 12/2017 | Selvaganapathy | H04W 28/08 |
| 2018/0098250 A1* | 4/2018 | Vrzic | H04W 36/18 |
| 2018/0176839 A1* | 6/2018 | Ohara | H04W 16/32 |
| 2018/0213456 A1* | 7/2018 | Jheng | H04W 76/20 |
| 2018/0295544 A1* | 10/2018 | Feng | H04W 36/08 |
| 2018/0352491 A1* | 12/2018 | Shih | H04W 36/14 |
| 2019/0098606 A1* | 3/2019 | Sharma | H04B 7/0404 |

OTHER PUBLICATIONS

U.S. Appl. No. 62/514,200 (Priority application of Shih et al. (US 2018/0352491 A1), Jun. 2, 2017 (Year: 2017).*
"LTE X2 Handover Call Flow Procedure" by Panigrahi, dated Dec. 4, 2013 (Year: 2013).*
International Search Report and Written Opinion—PCT/US2019/018068—ISA/EPO—dated Apr. 3, 2019.

* cited by examiner

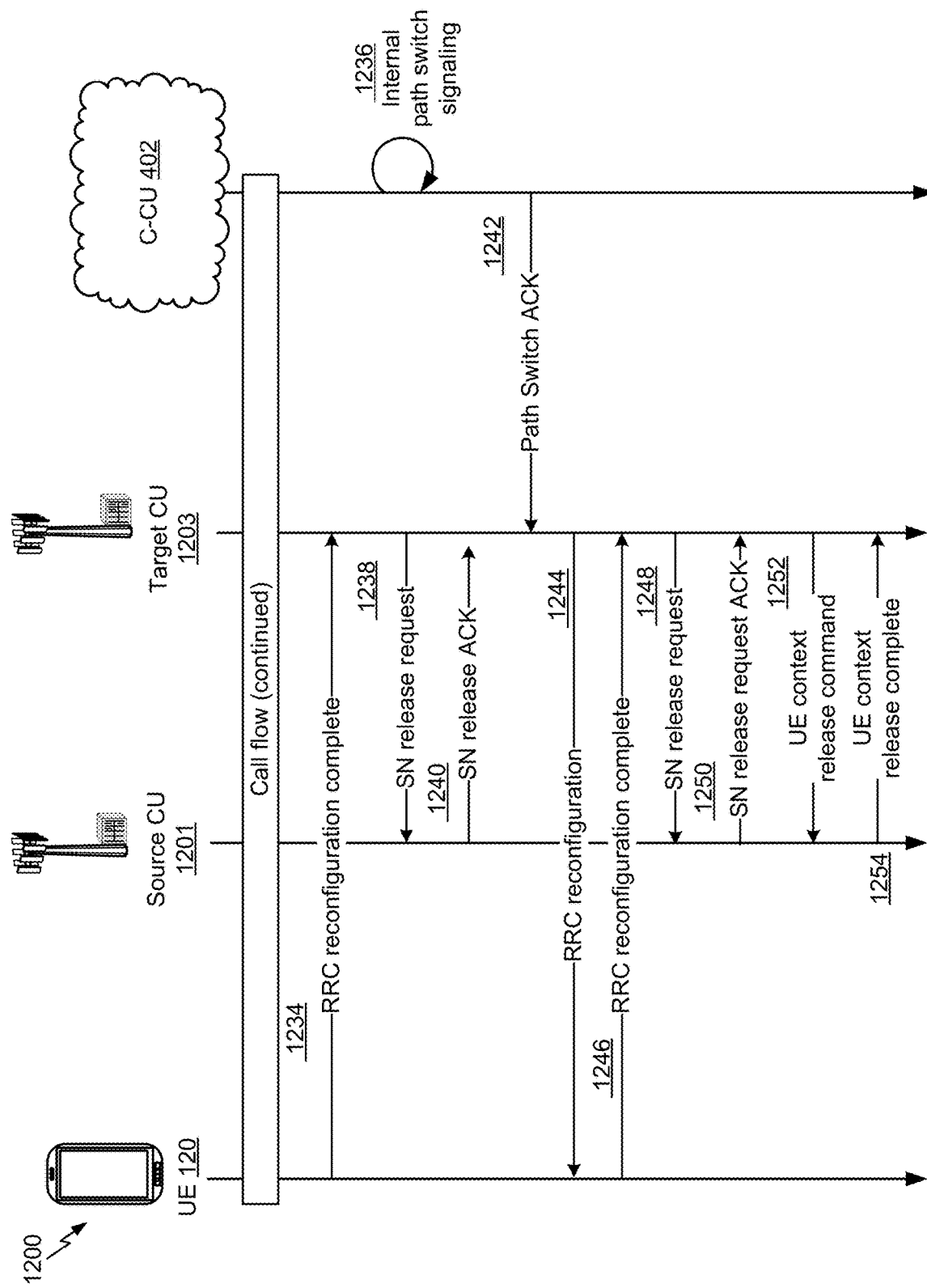

ENHANCED MAKE-BEFORE-BREAK HANDOVER

CROSS-REFERENCE TO RELATED APPLICATIONS UNDER 35 U.S.C. § 119

This application claims priority to Provisional Patent Application No. 62/631,479, filed on Feb. 15, 2018, entitled "TECHNIQUES AND APPARATUSES FOR DETERMINING A HANDOVER CONFIGURATION FOR A HANDOVER PROCEDURE OF A RADIO ACCESS NETWORK," and to Provisional Patent Application No. 62/631,350, filed on Feb. 15, 2018, entitled "TECHNIQUES AND APPARATUSES FOR HANDOVER LATENCY REDUCTION OR AVOIDANCE," which are hereby expressly incorporated by reference herein.

FIELD OF THE DISCLOSURE

Aspects of the present disclosure generally relate to wireless communication, and more particularly to techniques and apparatuses for enhanced make-before-break (MBB) handover.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include concurrently communicating with a source base station (BS) and a target BS on a connection with the source BS and a connection with the target BS as part of a make-before-break (MBB) handover procedure; and performing a common packet data convergence protocol (PDCP) function for the connection with the source BS and the connection with the target BS before the connection with the source BS is released as part of the MBB handover procedure.

In some aspects, a UE for wireless communication may include memory and one or more processors operatively coupled to the memory. The memory and the one or more processors may be configured to concurrently communicate with a source base station (BS) and a target BS on a connection with the source BS and a connection with the target BS as part of a make-before-break (MBB) handover procedure; and perform a common packet data convergence protocol (PDCP) function for the connection with the source BS and the connection with the target BS before the connection with the source BS is released as part of the MBB handover procedure.

In some aspects, an apparatus for wireless communication may include means for concurrently communicating with a source base station (BS) and a target BS on a connection with the source BS and a connection with the target BS as part of a make-before-break (MBB) handover procedure; and means for performing a common packet data convergence protocol (PDCP) function for the connection with the source BS and the connection with the target BS before the connection with the source BS is released as part of the MBB handover procedure.

In some aspects, a non-transitory computer-readable medium may store one or more instructions for wireless communication. The one or more instructions, when executed by one or more processors of a UE, may cause the one or more processors to concurrently communicate with a source base station (BS) and a target BS on a connection with the source BS and a connection with the target BS as part of a make-before-break (MBB) handover procedure; and perform a common packet data convergence protocol (PDCP) function for the connection with the source BS and the connection with the target BS before the connection with the source BS is released as part of the MBB handover procedure.

In some aspects, a method of wireless communication, performed by a first base station, may include communicating with a second base station to configure transmission of an indication for a user equipment (UE) to release a connection with a source base station of a make-before-break (MBB) handover procedure, wherein the first base station is one of the source base station or the target base station and the second base station is the other of the source base station or the target base station; and communicating with the second base station to configure a release of the connection with the source base station.

In some aspects, an apparatus for wireless communication may include communicating with a base station to configure transmission of an indication for a user equipment (UE) to release a connection with a source base station of a make-before-break (MBB) handover procedure, wherein the apparatus is one of the source base station or the target base station and the base station is the other of the source base station or the target base station; and communicating with the base station to configure a release of the connection with the source base station.

In some aspects, a first base station for wireless communication may include memory and one or more processors operatively coupled to the memory. The memory and the one or more processors may be configured to communicate with a second base station to configure transmission of an indication for a user equipment (UE) to release a connection with a source base station of a make-before-break (MBB) handover procedure, wherein the first base station is one of the source base station or the target base station and the second base station is the other of the source base station or the target base station; and communicate with the second base station to configure a release of the connection with the source base station.

In some aspects, a non-transitory computer-readable medium may store one or more instructions for wireless communication. The one or more instructions, when executed by one or more processors of a first base station, may cause the one or more processors to communicate with a second base station to configure transmission of an indication for a user equipment (UE) to release a connection with a source base station of a make-before-break (MBB) handover procedure, wherein the first base station is one of the source base station or the target base station and the second base station is the other of the source base station or the target base station; and communicate with the second base station to configure a release of the connection with the source base station.

In some aspects, a method of wireless communication, performed by a user equipment (UE) may include indicating, to a source base station (BS), a capability of the UE; and receiving a handover configuration for a handover procedure in which the UE is handed over from the source BS to a target BS, wherein the handover configuration indicates to the UE whether to maintain a connection with the source BS and a connection with the target BS until receiving a notification, from the target BS or the source BS, to release the connection with the source BS.

In some aspects, a user equipment for wireless communication may include memory and one or more processors operatively coupled to the memory. The memory and the one or more processors may be configured to indicate, to a source base station (BS), a capability of the UE; and receive a handover configuration for a handover procedure in which the UE is handed over from the source BS to a target BS, wherein the handover configuration indicates to the UE whether to maintain a connection with the source BS and a connection with the target BS until receiving a notification, from the target BS or the source BS, to release the connection with the source BS.

In some aspects, a non-transitory computer-readable medium may store one or more instructions for wireless communication. The one or more instructions, when executed by one or more processors of a user equipment, may cause the one or more processors to indicate, to a source base station (BS), a capability of the UE; and receive a handover configuration for a handover procedure in which the UE is handed over from the source BS to a target BS, wherein the handover configuration indicates to the UE whether to maintain a connection with the source BS and a connection with the target BS until receiving a notification, from the target BS or the source BS, to release the connection with the source BS.

In some aspects, an apparatus for wireless communication may include means for indicating, to a source base station (BS), a capability of the apparatus; and means for receiving a handover configuration for a handover procedure in which the apparatus is handed over from the source BS to a target BS, wherein the handover configuration indicates to the apparatus whether to maintain a connection with the source BS and a connection with the target BS until receiving a notification, from the target BS or the source BS, to release the connection with the source BS.

In some aspects, a method of wireless communication performed by a wireless communication device may include determining a capability of a user equipment (UE); and providing, to the UE, a configuration for a handover procedure based at least in part on the capability, wherein the configuration indicates whether, during the handover procedure, the UE is to maintain a connection with a source base station (BS) and a connection with a target BS while the UE is being handed over from the source BS to the target BS.

In some aspects, a wireless communication device for wireless communication may include memory and one or more processors operatively coupled to the memory. The memory and the one or more processors may be configured to determine a capability of a user equipment (UE); and provide, to the UE, a configuration for a handover procedure based at least in part on the capability, wherein the configuration indicates whether, during the handover procedure, the UE is to maintain a connection with a source base station (BS) and a connection with a target BS while the UE is being handed over from the source BS to the target BS.

In some aspects, a non-transitory computer-readable medium may store one or more instructions for wireless communication. The one or more instructions, when executed by one or more processors of a user equipment, may cause the one or more processors to determine a capability of a user equipment (UE); and provide, to the UE, a configuration for a handover procedure based at least in part on the capability, wherein the configuration indicates whether, during the handover procedure, the UE is to maintain a connection with a source base station (BS) and a connection with a target BS while the UE is being handed over from the source BS to the target BS.

In some aspects, an apparatus for wireless communication may include means for determining a capability of a user equipment (UE); and means for providing, to the UE, a configuration for a handover procedure based at least in part on the capability, wherein the configuration indicates whether, during the handover procedure, the UE is to maintain a connection with a source base station (BS) and a connection with a target BS while the UE is being handed over from the source BS to the target BS.

In some aspects, a method of wireless communication, performed by a user equipment (UE), may include configuring, by a first protocol stack of the UE, a handover from a source base station to a target base station; and configuring, while a first connection using the first protocol stack is active with the source base station, a second connection with the target base station, wherein the second connection is configured using a second protocol stack of the UE.

In some aspects, a user equipment (UE) for wireless communication may include memory and one or more processors operatively coupled to the memory. The memory and the one or more processors may be configured to configure, by a first protocol stack of the UE, a handover from a source base station to a target base station; and configure, while a first connection using the first protocol stack is active with the source base station, a second connection with the target base station, wherein the second connection is configured using a second protocol stack of the UE.

In some aspects, a non-transitory computer-readable medium may store one or more instructions for wireless communication. The one or more instructions, when executed by one or more processors of a UE, may cause the one or more processors to configure, by a first protocol stack of the UE, a handover from a source base station to a target base station; and configure, while a first connection using the first protocol stack is active with the source base station, a second connection with the target base station, wherein the second connection is configured using a second protocol stack of the UE.

In some aspects, an apparatus for wireless communication may include means for configuring, by a first protocol stack of the apparatus, a handover from a source base station to a target base station; and means for configuring, while a first connection using the first protocol stack is active with the source base station, a second connection with the target base station, wherein the second connection is configured using a second protocol stack of the apparatus.

In some aspects, a method of wireless communication, performed by a target base station, may include establishing a target connection with a user equipment (UE) for handover of the UE from a source base station to the target base station, wherein the source base station is associated with a source connection with the UE, and wherein the source connection is associated with a first protocol stack of the UE and the target connection is associated with a second protocol stack of the UE; and performing the handover of the UE while the source connection and the target connection are active.

In some aspects, a target base station for wireless communication may include memory and one or more processors operatively coupled to the memory. The memory and the one or more processors may be configured to establish a target connection with a user equipment (UE) for handover of the UE from a source base station to the target base station, wherein the source base station is associated with a source connection with the UE, and wherein the source connection is associated with a first protocol stack of the UE and the target connection is associated with a second protocol stack of the UE; and perform the handover of the UE while the source connection and the target connection are active.

In some aspects, a non-transitory computer-readable medium may store one or more instructions for wireless communication. The one or more instructions, when executed by one or more processors of a target base station, may cause the one or more processors to establish a target connection with a user equipment (UE) for handover of the UE from a source base station to the target base station, wherein the source base station is associated with a source connection with the UE, and wherein the source connection is associated with a first protocol stack of the UE and the target connection is associated with a second protocol stack of the UE; and perform the handover of the UE while the source connection and the target connection are active.

In some aspects, an apparatus for wireless communication may include means for establishing a target connection with a user equipment (UE) for handover of the UE from a source base station to the apparatus, wherein the source base station is associated with a source connection with the UE, and wherein the source connection is associated with a first protocol stack of the UE and the target connection is associated with a second protocol stack of the UE; and means for performing the handover of the UE while the source connection and the target connection are active.

Aspects generally include a method, apparatus, system, computer program product, non-transitory computer-readable medium, user equipment, base station, centralized core network unit (C-CU), wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
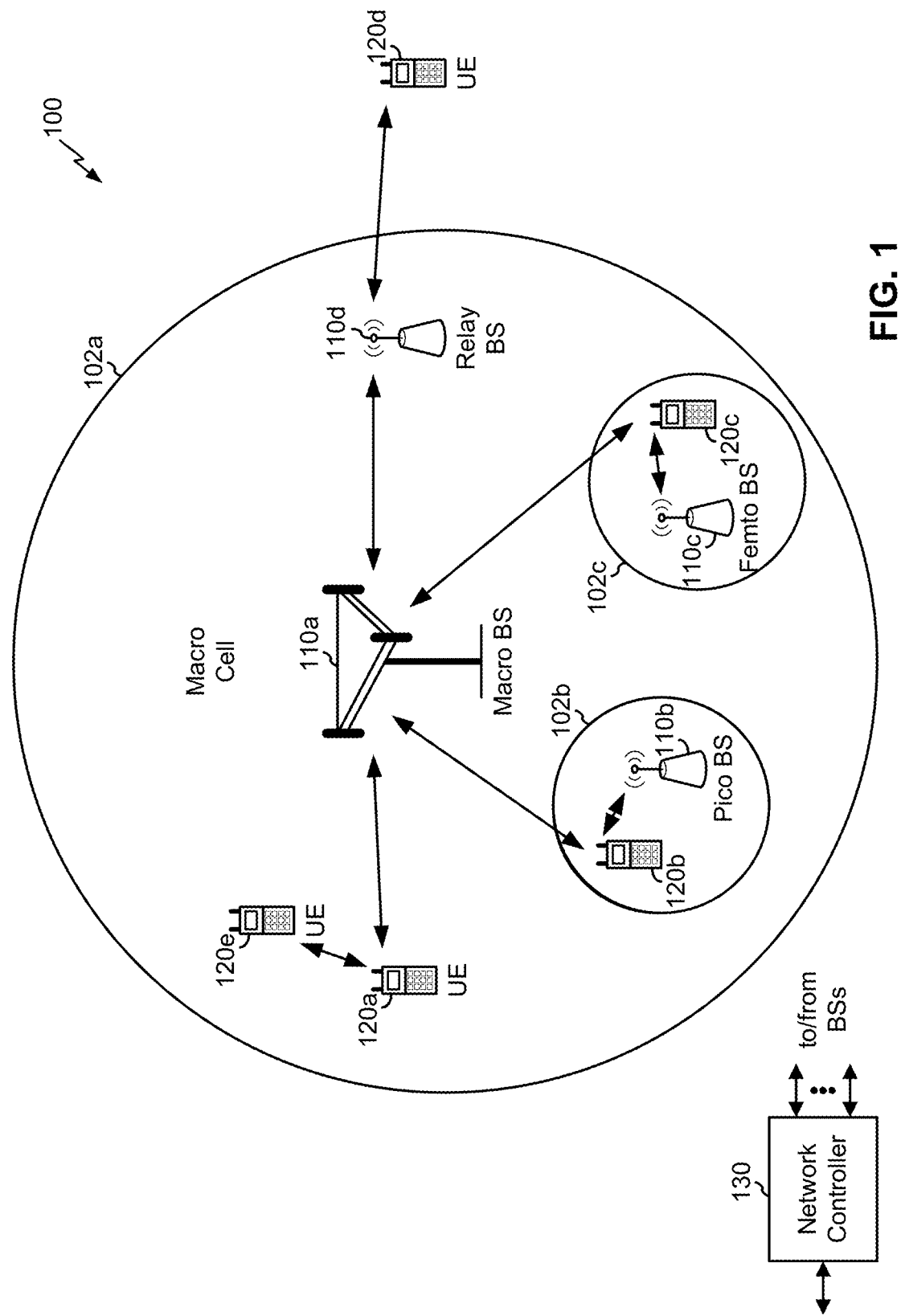
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
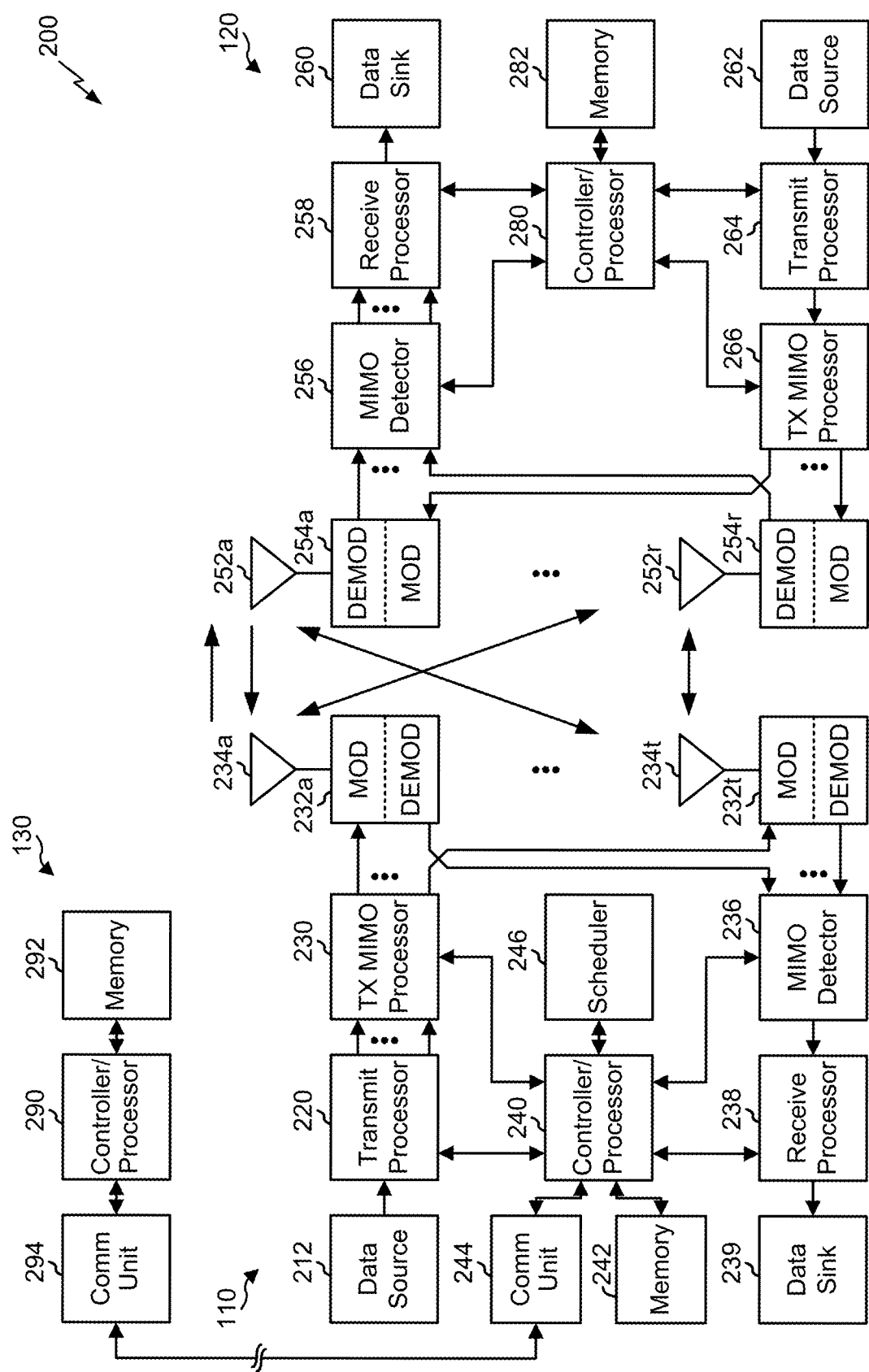
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280.

Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292. In some aspects, one or more components of UE 120 may be included in a housing.

Controller/processor 240 of base station 110, controller/processor 280 of UE 120, and/or any other component(s) of FIG. 2 may perform one or more techniques associated with determining a handover configuration for a handover procedure of a radio access network, as described in more detail elsewhere herein. For example, controller/processor 240 of base station 110, controller/processor 280 of UE 120, and/or any other component(s) of FIG. 2 may perform or direct operations of, for example, process 1400 of FIG. 14, process 1500 of FIG. 15, process 2100 of FIG. 21, process 2200 of FIG. 22, and/or other processes as described herein. Memories 242 and 282 may store data and program codes for base station 110 and UE 120, respectively. A scheduler 246 may schedule UEs for data transmission on the downlink and/or uplink.

In some aspects, a UE (e.g., UE 120) may include means for indicating, to a source base station (BS), a capability of the UE; means for receiving a handover configuration for a handover procedure in which the UE is handed over from the source BS to a target BS, wherein the handover configuration indicates to the UE whether to maintain a connection with the source BS and a connection with the target BS until receiving a notification, from the target BS or the source BS, to release the connection with the source BS; means for concurrently communicating with a source base station (BS) and a target BS on a connection with the source BS and a connection with the target BS as part of a make-before-break (MBB) handover procedure; means for adding a target cell of the target BS to a secondary cell group based at least in part on a request received from the source BS; means for maintaining a source cell of the source BS in a master cell group while establishing the connection with the target BS, wherein the UE is configured to send uplink (UL) data to the target BS after the connection with the target BS is established; means for providing at least one indication to the source BS or the target BS based at least in part on a successful setup of the connection with the target BS; means for receiving one or more notifications to switch the target cell from the secondary cell group to the master cell group or to release the source cell of the source BS; means for receiving a master cell group serving cell identification field in a radio resource control (RRC) reconfiguration message indicating which configured cell group is the master cell group; means for performing a role switch procedure to switch the master cell group to the target cell of the target BS, wherein the connection with the source cell of the master cell group is maintained during the role switch procedure; means for releasing the connection with the source cell of the master cell group based at least in part on receiving the one or more notifications; means for signaling the capability of the UE to a network entity, wherein the capability is a simultaneous transmission and receiving capability; means for releasing the connection with the source BS based at least in part on a message received from the source BS or target BS; means for performing radio resource control signaling for the MBB handover procedure on a signaling radio bearer for the source BS before a signaling radio bearer for the target BS is established; means for performing radio resource control signaling for the MBB handover procedure on the signaling radio bearer for the source BS or the signaling radio bearer for the target BS after the signaling radio bearer for the target BS is established and/or the like. In some aspects, such means may include one or more components of UE 120 described in connection with FIG. 2.

In some aspects, a wireless communication device (e.g., base station 110) may include means for determining a capability of a user equipment (UE); means for providing, to the UE, a configuration for a handover procedure based at least in part on the capability, wherein the configuration indicates whether, during the handover procedure, the UE is to maintain a connection with a source base station (BS) and a connection with a target BS while the UE is being handed over from the source BS to the target BS; and/or the like. In some aspects, such means may include one or more components of base station 110 described in connection with FIG. 2.

In some aspects, a base station (e.g., base station 110) may include means for communicating with a second base station to configure transmission of an indication for a user equipment (UE) to release a connection with a source base station of a make-before-break (MBB) handover procedure to a target base station, wherein the first base station is one of the source base station or the target base station and the second base station is the other of the source base station or the target base station; means for communicating with the second base station to configure a release of the connection with the source base station; means for transmitting an indication to release the connection with the source base station; means for transmitting or receiving information associated with a packet data convergence protocol (PDCP) sequence number (SN) status transfer from the source base station to the target base station in connection with the MBB handover procedure; means for transmitting or receiving a downlink PDCP SN for data units transmitted by the target BS for radio link control acknowledged-mode and unacknowledged-mode bearers; means for requesting that the UE add a target cell of the target BS to a secondary cell group; means for causing the UE to maintain a source cell of the source BS in a master cell group while the UE is establishing the connection with the target BS; means for transmitting an indication of a handover type as the MBB handover procedure or a dual-connectivity (DC)-based MBB handover procedure based at least in part on a capability of the UE or a type of handover scenario of the MBB handover procedure or the DC-based MBB handover procedure; and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3:
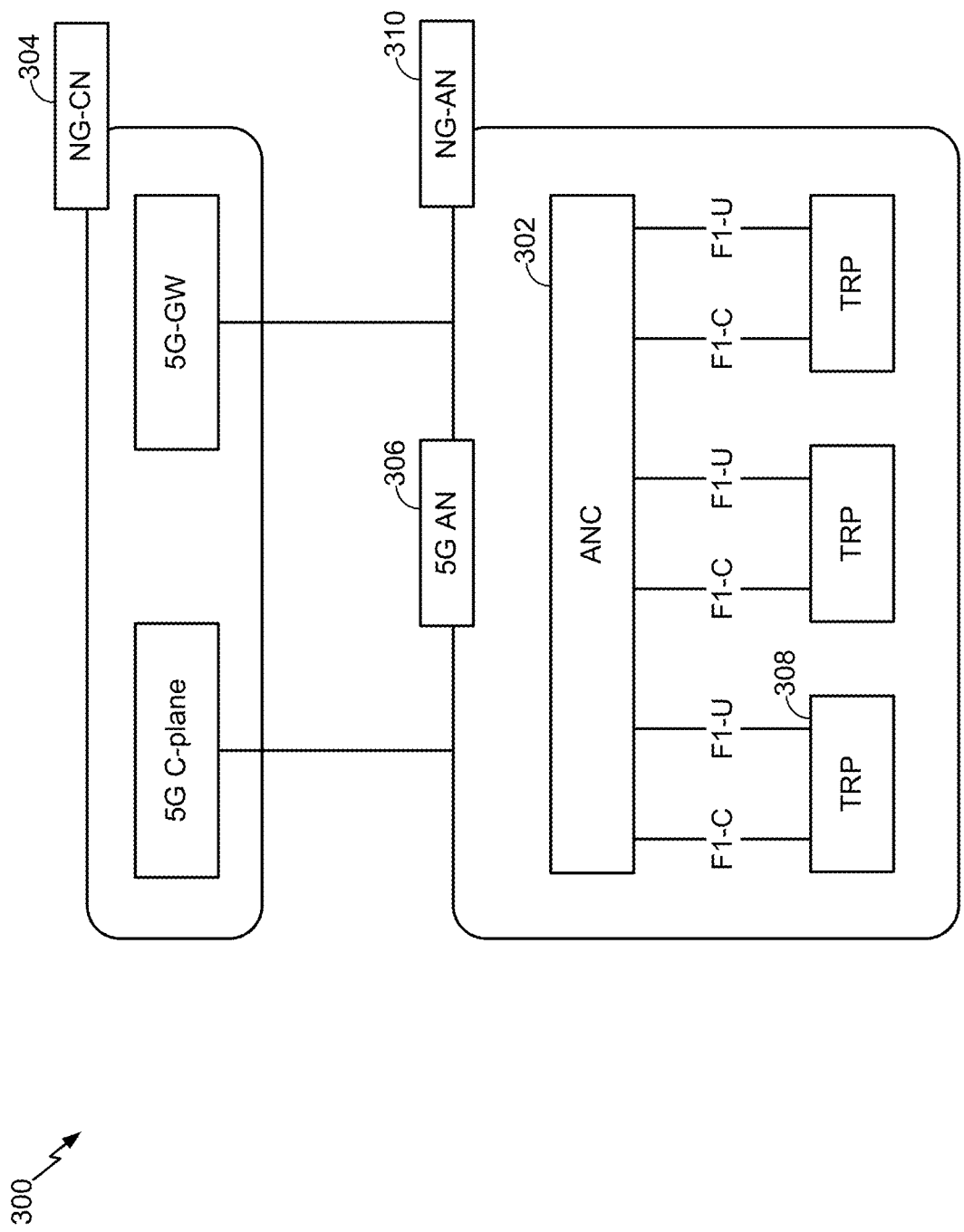
FIG. 3 illustrates an example logical architecture of a distributed radio access network (RAN), in accordance with various aspects of the present disclosure.

FIG. 3 illustrates an example logical architecture of a distributed RAN 300, according to aspects of the present disclosure. A 5G access node 306 may include an access node controller (ANC) 302. The ANC may be a centralized unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, gNB, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 300 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of RAN 300. The packet data convergence protocol (PDCP), radio link control (RLC), media access control (MAC) protocol may be adaptably placed at the ANC or TRP.

According to various aspects, a BS may include a centralized unit (CU) (e.g., ANC 302) and/or one or more distributed units (e.g., one or more TRPs 308). A CU may be associated with a coverage area, such as a set of BSs and/or UEs. A handover may be referred to as intra-CU (e.g., from one BS to another BS that are both associated with the same CU) or inter-CU (e.g., from a source BS associated with a first CU to a target BS associated with a second CU). Inter-CU handover may involve the management of security keys or other information associated with the first CU and the second CU, as described in more detail elsewhere herein.

As indicated above, FIG. 3 is provided merely as an example. Other examples are possible and may differ from what was described with regard to FIG. 3.

Figure 4:
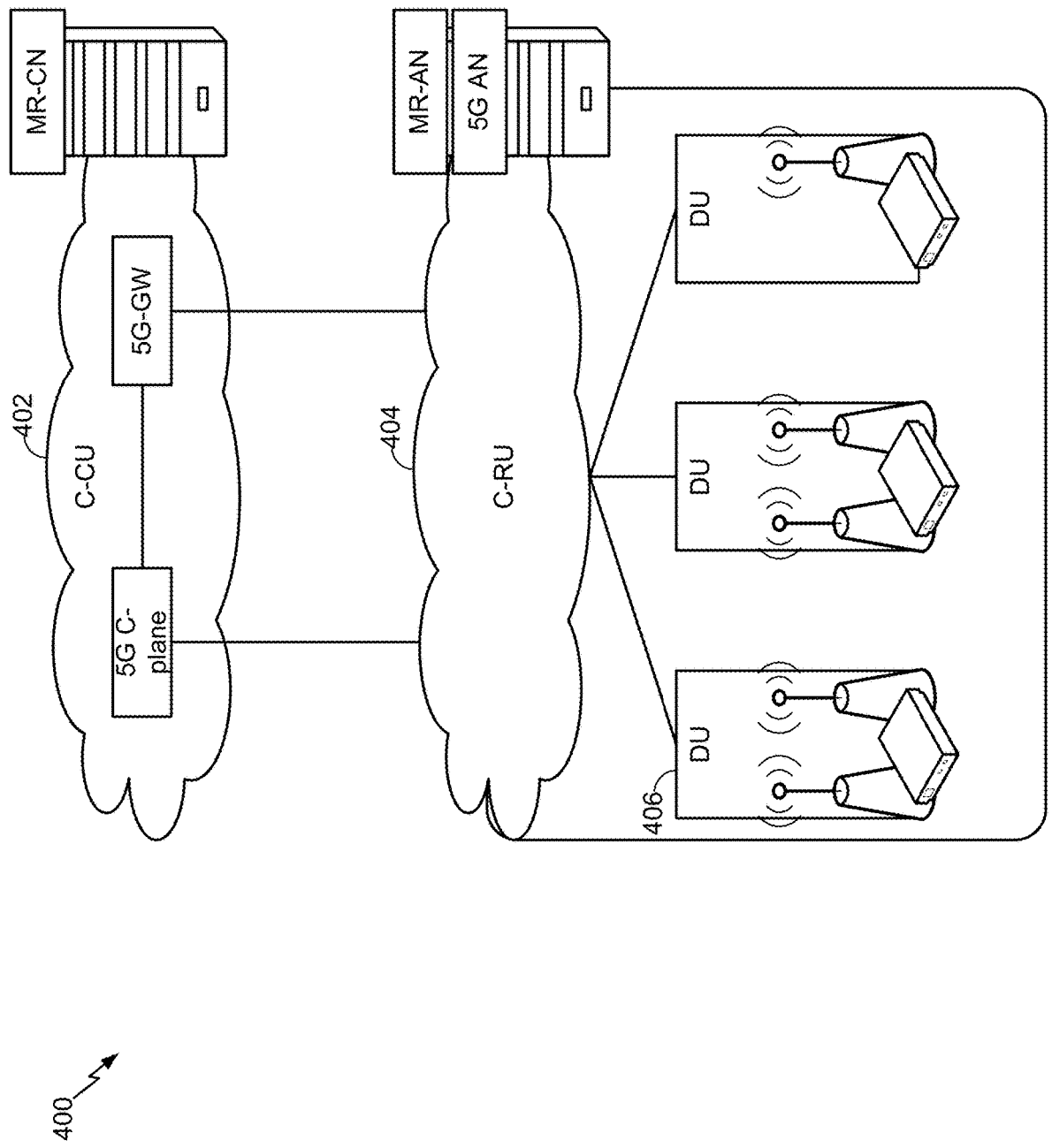
FIG. 4 illustrates an example physical architecture of a distributed RAN, in accordance with various aspects of the present disclosure.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity.

A centralized RAN unit (C-RU) 404 may host one or more ANC functions. Optionally, the C-RU may host core network functions locally. The C-RU may have distributed deployment. The C-RU may be closer to the network edge.

A distributed unit (DU) 406 may host one or more TRPs. The DU may be located at edges of the network with radio frequency (RF) functionality. In some aspects, one or more DUs 406 may be implemented by BS 110 of FIG. 1.

As indicated above, FIG. 4 is provided merely as an example. Other examples are possible and may differ from what was described with regard to FIG. 4.

Of concern in many wireless communication systems is the performance and handling of handover procedures, during which UEs are handed over from one base station to the next. Due to the various purposes and/or uses of UEs in wireless communications, certain UEs may have enhanced capabilities relative to others. However, in such cases, UEs may not be configured to utilize the enhanced capabilities during handover procedures (e.g., because the network may not be configured to use the enhanced procedures, because the network utilizes a same handover procedure for all UEs, and/or the like).

Handover may be associated with a certain amount of latency. For example, latency may arise from radio resource control (RRC) processing of an RRC connection reconfiguration message (e.g., mobility control information), a Layer 1 (L1) and/or Layer 2 (L2) stack reconfiguration and reset (e.g., for radio link control (RLC) and/or media access control (MAC) layers), a packet data convergence (PDCP) robust header compression reset, security key reconfiguration, a target cell search, acquisition, and/or synchronization, random access delay, transmission of an RRC connection reconfiguration complete by the target base station, and/or the like. The latency may negatively impact certain applications. For example, some applications may require low latency or zero latency, so handover may cause loss of a session or user experience degradation for such applications.

According to some examples herein, a handover procedure can be configured for a UE based at least in part on capabilities of the UE to enable the UE to take full advantage of the capabilities of the UE. According to some aspects described herein, a UE may utilize enhanced capabilities (e.g., a simultaneous transmit and receive capability, a dual connectivity capability, and/or the like) to perform enhanced handover procedures by indicating to a network (or a BS of the network) that the UE has the enhanced capability and receiving a configuration for a handover procedure from the network (or the BS of the network) that utilizes the enhanced capability. Furthermore, according to some aspects, a wireless communication device (e.g., a BS, a C-RU, and/or the like) of a wireless communication network may determine a capability of a UE and provide a configuration for the handover procedure to take advantage of the capability of the UE.

Accordingly, in some aspects, a UE and/or BS may perform a handover procedure with enhanced performance that lessens a mobility interruption time (e.g., by achieving a 0 millisecond (ms) handover) relative to previous techniques that ended a connection between a UE and a first BS before establishing a connection with a second BS. As such, in some aspects, data loss, computing resources, and/or network resources can be conserved by efficiently and effectively enabling UEs to use enhanced capabilities during a handover procedure. For example, a UE may perform an enhanced make-before-break handover using a simultaneous transmit and receive capability of the UE and/or a dual connectivity-based handover using a dual connectivity capability of the UE.

Some techniques and apparatuses described herein provide for low-latency or zero-latency handover from a source BS to a target base station (e.g., in a network such as a 4G/LTE or 5G/NR network). For example, some techniques and apparatuses described herein provide for configuration of the handover using a first protocol stack of the UE and a second protocol stack of the UE, wherein the first protocol stack is used for communication with the first BS and the second protocol stack is used for communication with the second BS. The use of the two protocol stacks may enable configuration of handover with regard to the target BS to be performed while communication with the source BS is ongoing. Thus, a latency associated with handing over the UE from the source base station to the target base station is reduced. Furthermore, some techniques and apparatuses described herein may provide for buffering and backhauling of UE traffic between the source BS and the target BS so that a flow of traffic to the UE is not interrupted (or so that interruption is reduced or minimized), thereby further reducing latency associated with handing over the UE. In this way, service levels at the UE may be satisfied in the case of handover of the UE, which allows for satisfaction of performance requirements for certain types of traffic (e.g., gaming traffic, multimedia traffic, high-reliability traffic, low-latency traffic, etc.).

Furthermore, some techniques and apparatuses described herein may provide a common packet data convergence protocol (PDCP) function for the make-before-break (MBB) handover procedure, which may streamline security key management, ciphering/deciphering, integrity protection, integrity verification, data unit reordering/duplicate discarding, link selection logic, and/or the like. Some techniques and apparatuses described herein provide control-plane (e.g., BS, network controller, control entity, etc.) messaging and handling to support the MBB handover. Some techniques and apparatuses described herein provide for an MBB handover using a carrier aggregation (CA) multiple-input multiple-output (MIMO) technique, wherein a diminished MIMO configuration is signaled to cause at least one antenna to be available for use for the MBB handover. Still further, some techniques and apparatuses described herein provide a role switch-based MBB handover technique, wherein a master cell group of the UE is switched from the source base station to the target base station while connections with the source base station and the target base station are active. In this way, low-latency or zero-latency handover (and the benefits described above in connection with low-latency or zero-latency handover) are realized.

Figure 5:
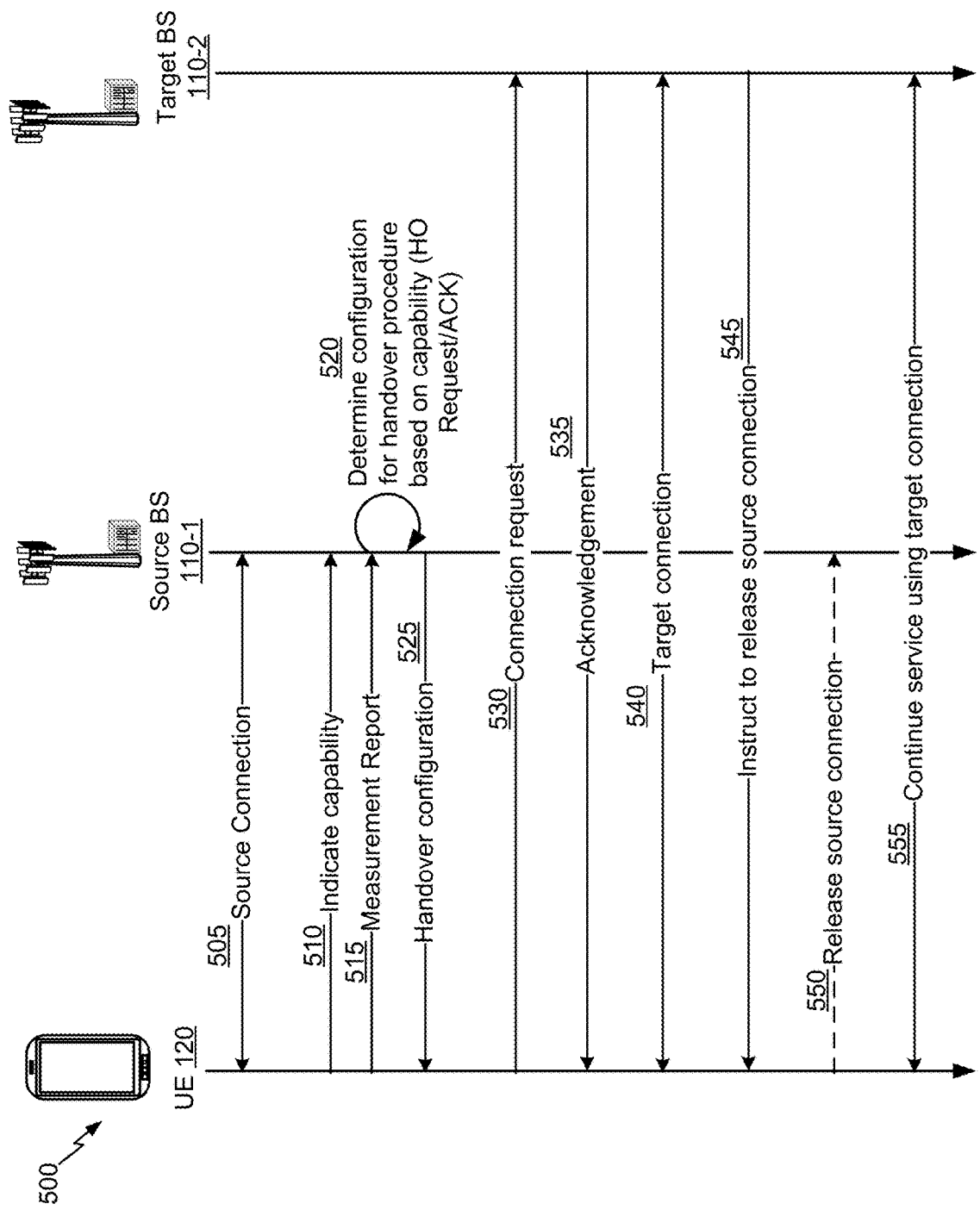
FIGS. 5-13 are diagrams illustrating examples of determining a handover configuration for a handover procedure of a radio access network, in accordance with various aspects of the present disclosure.

FIG. 5 is a diagram illustrating an example 500 of determining a handover configuration for a handover procedure of a radio access network, in accordance with various aspects of the present disclosure. As shown in FIG. 5, UE 120 is handed over from a source BS 110-1 to a target BS 110-2, wherein source BS 110-1 and target BS 110-2 may be implemented by BS 110 of FIG. 1, TRP 308 of FIG. 3, and/or DU 406 of FIG. 4. The handover described in connection with FIG. 5 may be intra-frequency or inter-frequency and/or may be intra-CU or inter-CU.

As shown in FIG. 5 and by reference number 505, UE 120 has established a connection with source BS 110-1 (hereinafter referred to as a source connection). As shown by reference number 510, in example 500, UE 120 indicates a capability of UE 120 to any one or more of source BS 110-1, target BS 110-2, a network entity such as an access management function, and/or the like. For example, UE 120 may indicate that UE 120 has simultaneous transmit and receive capability and/or dual connectivity capability.

As shown by reference number 515, UE 120 may provide a measurement report to source BS 110-1. The measurement report may indicate that a handover is to be performed from the source BS 110-1 to a target BS 110-2. As shown by reference number 520, source BS 110-1 may determine a configuration for a handover procedure based at least in part on the capability. For example, source BS 110-1 may provide a handover request to target BS 110-2, and may receive a handover acknowledgment (ACK) from target BS 110-2. In some aspects, source BS 110-1 may communicate with target BS 110-2 to determine a handover configuration for UE 120. Source BS 110-1, as shown by reference number 525, may then provide the handover configuration to the UE 120. For example, the handover configuration may include a configuration for a handover procedure that utilizes or does not utilize the indicated capability of the UE 120. In some aspects, the handover configuration may indicate that a make-before-break (MBB) handover procedure and/or a DC-based MBB handover procedure is performed. Thus, UE 120 may know to maintain the source connection while and/or after the target connection is established.

As further shown in FIG. 5, and by reference number 530, UE 120 requests to connect with target BS 110-2 (e.g., using the configuration received from source BS 110-1). For example, UE 120 may perform a random access procedure to establish a connection with target BS 110-2 (hereinafter referred to as a target connection). Target BS 110-2, as shown by reference number 535, may reply with an acknowledgment and UE 120 and target BS 110-2 may establish the target connection, as shown by reference number 540. As is evident in example 500, UE 120 may concurrently maintain both a source connection with source BS 110-1 and target BS 110-2 during the handover process. In such cases, because UE 120 maintains an active connection with both source BS 110-1 and target BS 110-2 for a period of time, UE 120 may experience decreased delays relative to previous techniques and/or minimal data interruption time (e.g., 0 ms handover).

As further shown in FIG. 5, and by reference number 545, target BS 110-2 instructs UE 120 to release the source connection (e.g., to complete the handover). For example, once it is determined that the UE 120 has established a strong connection (e.g., a measured parameter by UE 120 satisfied a threshold indicating a strong connection), target BS 110-2 may send an instruction to complete the handover. In some aspects, the release of the source connection may not be based on an instruction from target BS 110-2. For example, UE 120 may release the source connection may be based at least in part on the establishment of the target connection. In some aspects, the release of the source connection may be based on an instruction from the source BS 110-1, based at least in part on receiving an indication of establishment of the target connection from the target BS 110-2 or from the UE 120. Accordingly, as shown by reference number 550, UE 120 releases the source connection to source BS 110-1. Further, as shown by reference number 555, UE 120 continues service using the target connection with target BS 110-2.

Accordingly, as shown by example 500 in FIG. 5, a UE may provide a capability to a BS or network entity and the BS may configure an MBB handover procedure for the UE to enable the UE to use the capability during the handover procedure. Therefore, a UE may achieve enhanced performance during a handover procedure and may experience minimal mobility interruption time (e.g., via a 0 ms handover) relative to a handover procedure that does not take advantage of the capability of the UE.

As indicated above, FIG. 5 is provided as an example. Other examples may differ from what is described with respect to FIG. 5.

Figure 6:
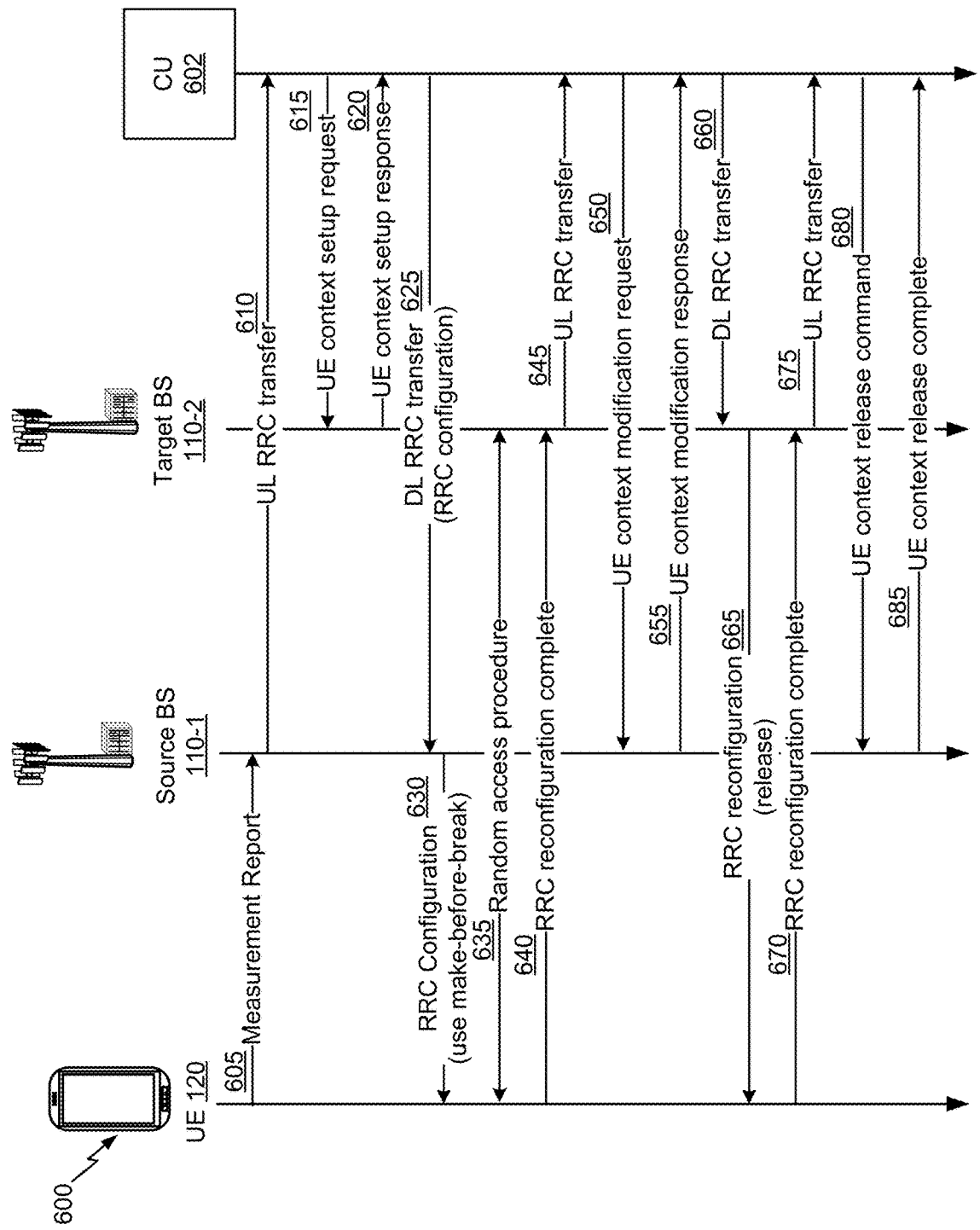

FIG. 6 is a diagram illustrating an example 600 of determining a handover configuration for a handover procedure of a radio access network, in accordance with various aspects of the present disclosure. As shown in a call flow of the example 600 of FIG. 6, an example intra-CU handover procedure is performed, using an enhanced make-before-break handover, in which both a source BS 110-1 and a target BS 110-2 are associated with a same CU 602. In example 600 of FIG. 6, source BS 110-1 and target BS 110-2 may be implemented by BS 110 of FIG. 1, TRP 308 of FIG. 3, and/or DU 406 of FIG. 4; and CU 602 may be implemented by ANC 302 of FIG. 3 and/or C-RU 404 of FIG. 4.

In FIG. 6, UE 120, prior to the beginning of the call flow, may be exchanging user data (e.g., uplink user data and/or downlink user data) with CU 602 via source BS 110-1. As shown by reference number 605, UE 120 sends a measurement report to the source BS 110-1. In some aspects, UE 120 sends the measurement report based at least in part on an event trigger (e.g., a signal measurement that satisfies a threshold) associated with determining that a handover procedure is to be initiated. The UE 120 may be associated with a capability for a handover. For example, the capability may be a simultaneous transmit and receive capability that allows UE 120 to concurrently transmit and receive data and/or information. In such a case, UE 120 may establish a plurality of connections with a plurality of different BSs (e.g., with source BS 110-1 and target BS 110-2).

As further shown in FIG. 6, and by reference number 610, source BS 110-1 sends an uplink (UL) radio resource control (RRC) transfer to CU 602. In some aspects, the UL RRC transfer can include the measurement report. Furthermore, in some aspects, the UL RRC transfer can cause CU 602 to determine a handover configuration that is to be used for a handover procedure for UE 120. For example, CU 602 may select from possible handover procedures that may be performed by UE 120 based at least in part on the indicated capability of UE 120. In some aspects, CU 602 may select an enhanced make-before-break handover procedure for UE 120 based at least in part on UE 120 indicating a simultaneous transmit and receive capability.

As further shown in FIG. 6, and by reference number 615, CU 602 sends a UE context setup request to target BS 110-2. For example, CU 602 may send the UE context setup request to indicate to target BS 110-2 that UE 120 is to be handed over to target BS 110-2 during a handover procedure. As shown by reference number 620, target BS 110-2 sends a UE context setup response. For example, target BS 110-2 may send the UE context setup response to acknowledge the request and/or indicate an ability to serve UE 120 after the handover procedure.

As further shown in FIG. 6, and by reference number 625, CU 602 sends a downlink (DL) RRC transfer to source BS 110-1. In some aspects, the DL RRC transfer can include a RRC reconfiguration message that indicates a configuration for a handover procedure in which UE 120 is to be handed over from source BS 110-1 to target BS 110-2. As shown by reference number 630, source BS 110-1 sends an RRC reconfiguration to UE 120. In some aspects, the RRC reconfiguration can include information identifying target BS 110-2, information identifying a handover configuration, and/or the like. For example, the RRC reconfiguration may indicate that UE 120 is to perform an enhanced make-before-break handover procedure with target BS 110-2 using a simultaneous transmit and receive capability of UE 120. In such a case, UE 120 may identify and/or determine that UE 120 is to maintain a connection with source BS 110-1 while establishing a connection with target BS 110-2. As shown by reference number 635, UE 120 performs a random access procedure with target BS 110-2 (e.g., to initiate and/or to establish a connection with target BS 110-2). In some aspects, UE 120 can continue to exchange user data (e.g., uplink user data and/or downlink user data) with CU 602 via source BS 110-1 after the random access procedure.

As shown by reference number 640, UE 120 sends a RRC reconfiguration complete message to target BS 110-2. In some aspects, UE 120 may use a dual protocol stack, which includes a source protocol stack for communicating with source BS 110-1 and a target protocol stack for communicating with target BS 110-2. Each of these protocol stacks may include a packet data convergence protocol (PDCP) layer, a radio link control (RLC) layer, a medium access control (MAC) layer, and/or a physical (PHY) layer. In some aspects, the source protocol stack and the target protocol stack may share one or more layers, such as a common PDCP layer or entity (described in more detail elsewhere herein). In some aspects, the target protocol stack may be used for uplink data transmissions.

As shown by reference number 645, target BS 110-2 sends a UL RRC transfer to CU 602. For example, the UL RRC transfer may indicate the RRC reconfiguration is complete. Accordingly, in some aspects, based at least in part on receiving the RRC reconfiguration complete message, CU 602 may determine a handover completion configuration. For example, when making a completion determination, CU 602 can utilize and/or configure one or more thresholds for one or more measurement parameters to perform a handover completion procedure (e.g., to release source BS 110-1). Furthermore, in some aspects, after the RRC reconfiguration is complete, UE 120 may perform uplink user/control plane duplication with source BS 110-1 and CU 602. For example, control plane data may be duplicated and shared between BS 110-1 and CU 602. Furthermore, in some aspects, after the CU 602 determines the RRC reconfiguration is complete, CU 602 can send downlink user data via target BS 110-2, but continue to send downlink user/control plane duplication via source BS 110-1. Accordingly, UE 120 may achieve improved reliability when receiving the data on the downlink.

As shown by reference number 650, CU 602 sends a UE context modification request to source BS 110-1. For example, the UE context modification request may include a transmission stop indicator to indicate that source BS 110-1 is to be released from serving UE 120. In some aspects, source BS 110-1 may provide a downlink data delivery status to CU 602. As shown by reference number 655, source BS 110-1 sends a UE context modification response to CU 602. For example, the UE context modification response may include an acknowledgement that source BS 110-1 is to be released during the handover procedure and/or is to no longer serve UE 120.

As further shown in FIG. 6, and by reference number 660, CU 602 sends a DL RRC transfer to target BS 110-2. For example, the DL RRC transfer to target BS 110-2 may include an RRC reconfiguration message indicating that the handover procedure is to be completed. As shown by reference number 665, target BS 110-2 sends an RRC reconfiguration to UE 120. For example, the RRC reconfiguration message may indicate that UE 120 is to release a connection with source BS 110-1. As such, UE 120 may release the connection with source BS 110-1, based at least in part on receiving the RRC reconfiguration message. Furthermore, UE 120 may then begin exchanging uplink user data and downlink user data with CU 602 via target BS 110-2.

As shown by reference number 670, UE 120 may send a RRC reconfiguration complete message to target BS 110-2. In some aspects, the RRC reconfiguration complete message may indicate that UE 120 has released the connection with source BS 110-1. As shown by reference number 675, target BS 110-2 may send a UL RRC transfer to CU 602. In some aspects, the UL RRC transfer may indicate that the RRC reconfiguration complete message was received from UE 120. As shown by reference number 680, CU 602 may then send a UE context release command to source BS 110-1 (e.g., so that source BS 110-1 does not continue to attempt to serve UE 120). As shown by reference number 685, source BS 110-1 sends a UE context release complete message to CU 602. For example, the UE context release complete message may be an acknowledgement that source BS 110-1 is no longer in communication with and/or serving UE 120.

As indicated above, FIG. 6 is provided as an example. Other examples may differ from what is described with respect to FIG. 6.

Figure 7:
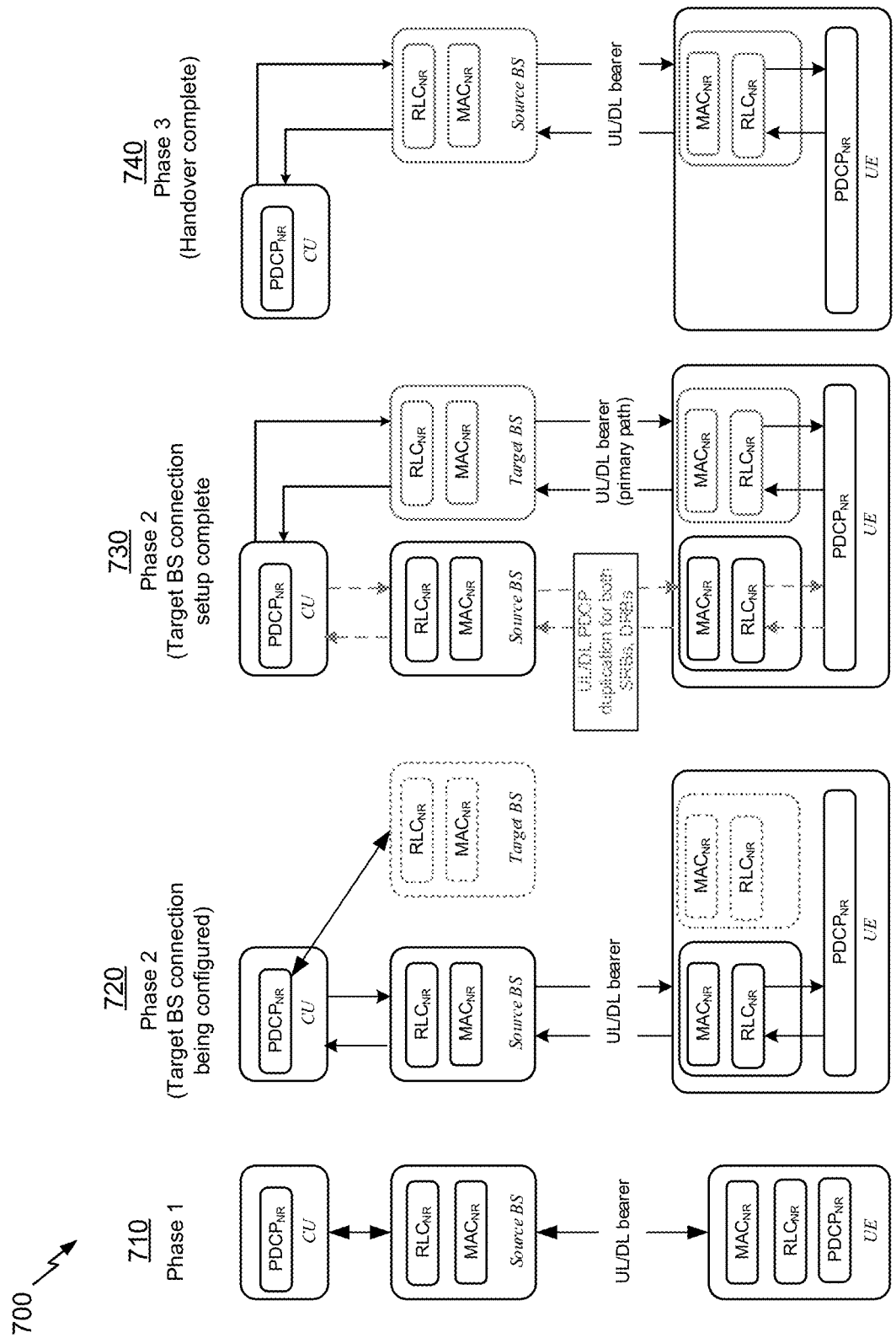

FIG. 7 is a diagram illustrating an example 700 of determining a handover configuration for a handover procedure of a radio access network, in accordance with various aspects of the present disclosure. The example 700 of FIG. 7 shows a network protocol stack and data flow for an enhanced make-before-break, intra-CU handover procedure (e.g., similar to the handover procedure described with respect to example 600 of FIG. 6).

As shown by reference number 710, in a first phase (e.g., before the handover procedure begins) of the example enhanced make-before-break, intra-CU handover procedure, a UE uses a source protocol stack (e.g., with PDCP/RLC/MAC layers) to communicate with a source BS via a UL/DL bearer (using the RLC and MAC layers) and a CU (using the PDCP layer). As shown by reference number 720, in a second phase (e.g., when a connection to a target BS is being configured) of the example enhanced make-before-break, intra-CU handover procedure, the UE configures a target protocol stack (e.g., with RLC/MAC layers) and the CU instructs the target BS to configure a corresponding RLC/MAC stack.

As further shown in FIG. 7, and by reference number 730, in a third phase (e.g., after the target BS connection is complete) of the example enhanced make-before-break, intra-CU handover procedure, the UE utilizes PDCP duplication for the UL/DL bearer (e.g., via a signaling radio bearer and/or a data radio bearer) and a primary path for the UL/DL is established between the target BS and the UE. As shown by reference number 740, in a fourth phase (e.g., after the handover is complete) of the example enhanced make-before-break, intra-CU handover procedure, the target BS becomes the source BS as the target BS serves the UE (and the previous source BS is released) and the UE removes the original source protocol stack.

As indicated above, FIG. 7 is provided as an example. Other examples may differ from what is described with respect to FIG. 7.

Figure 8:
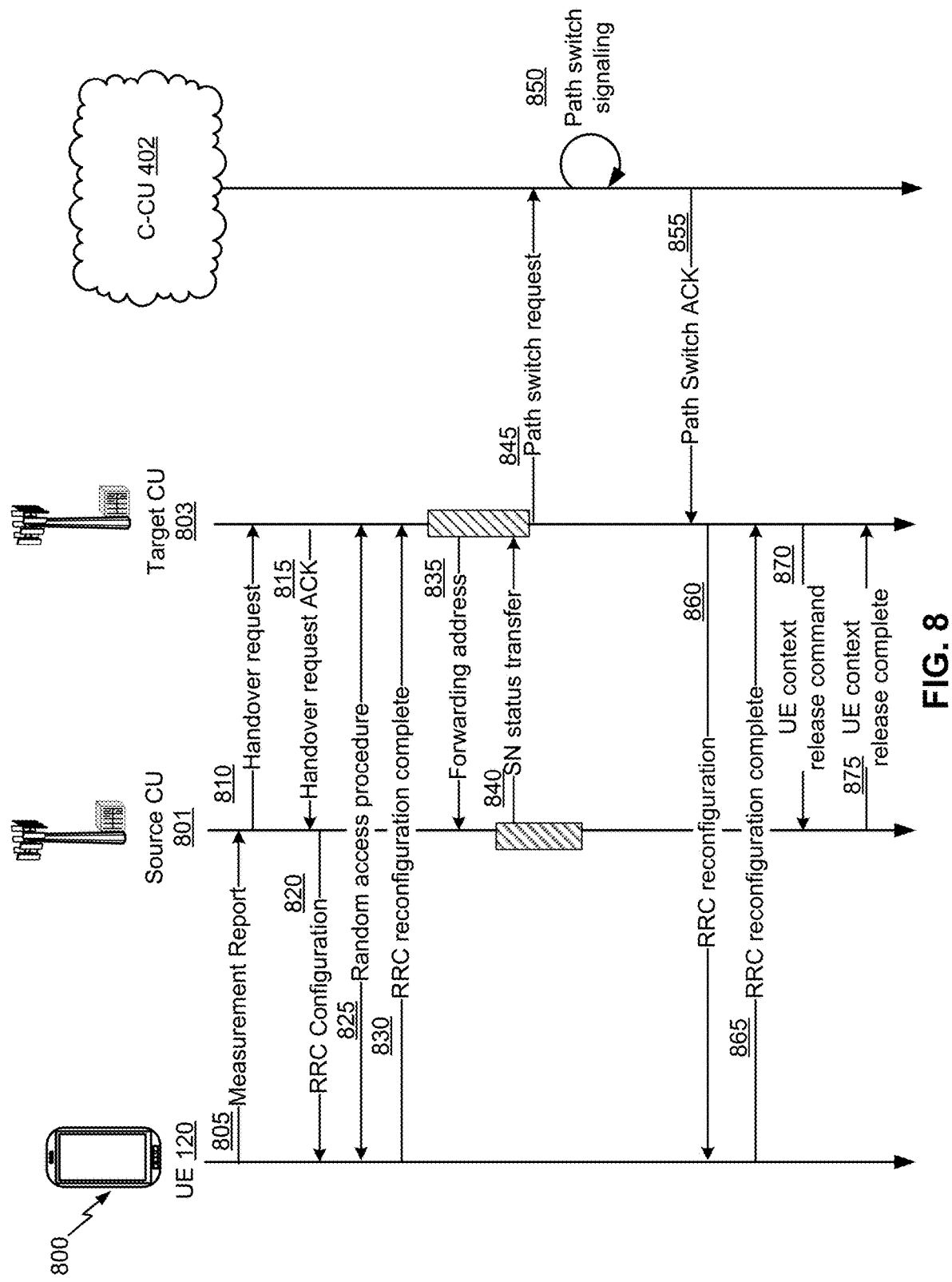

FIG. 8 is a diagram illustrating an example 800 of determining a handover configuration for a handover procedure of a radio access network, in accordance with various aspects of the present disclosure. As shown in a call flow of the example 800 of FIG. 8, an example inter-CU handover procedure is performed, using an enhanced make-before-break handover, in which a source BS (e.g., a BS 110) is associated with a source CU 801 and a target BS (e.g., another BS 110) is associated with a target CU 803 that is different from the source CU 801. As described herein, any operation performed by source CU 801 and/or target CU 803 may correspond to an operation performed by a BS associated with source CU 801 and/or target CU 803, respectively. As shown, a UE 120, source CU 801, target CU 803, and a C-CU 402 communicate to perform the enhanced make-before-break handover procedure. In example 800, source CU 801 and target CU 803 may be implemented by C-RU 404 of FIG. 4 and C-CU 402 may be implemented by C-CU 402 of FIG. 4.

In FIG. 8, UE 120, prior to the beginning of the call flow, may be exchanging user data (e.g., uplink user data and/or downlink user data) with C-CU 402 via source CU 801. As shown by reference number 805, UE 120 sends a measurement report to source CU 801 (e.g., which may be included in a UL RRC transfer of a source BS of source CU 801). In some aspects, the measurement report may cause source CU 801 to determine a handover configuration that is to be used for an enhanced make-before-break handover procedure for UE 120 (e.g., in a similar manner as example 600 of FIG. 6).

As shown by reference number 810, source CU 801 sends a handover request to target CU. In some aspects, the handover request to target CU may indicate a capability of UE 120. Accordingly, target CU 803 may process the request and, as shown by reference number 815, send a handover request acknowledgement back to source CU 801.

As shown by reference number 820, source CU 801 sends an RRC configuration to UE 120. In some aspects, according to the RRC configuration, UE 120 is to maintain a connection with a source BS associated with source CU 801 and a connection with a target BS associated with target CU 803. As shown by reference number 825, UE 120 performs a random access procedure with target CU 803 (e.g., to establish a connection with a target BS of target CU 803).

As shown by reference 830, UE 120 sends an RRC reconfiguration complete message to target CU 803. In some aspects, based at least in part on receiving the RRC reconfiguration complete message, target CU 803 may determine a handover completion configuration. For example, target CU 803 can configure one or more thresholds for one or more measurement parameters that may be used to release source CU 801. In some aspects, UE 120 may generate and/or maintain a dual layer 2 stack (or two protocol stacks) of PDCP/RLC/MAC layers (and/or a PHY layer) during the handover. In such instances, UE 120 may use one protocol stack for the connection with source CU 801 (i.e., a source protocol stack) and the other stack for the connection with target CU 803 (i.e., a target protocol stack). These dual stacks may have a common PDCP function, which may be implemented by respective PDCP entities of the dual stacks or a common PDCP entity that is common to both stacks.

In some aspects, UE 120 may use the target protocol stack as the primary stack for uplink user data. As such, in some aspects, UE 120 may begin sending uplink user data to target CU 803 (or a target BS of target CU 803). In some aspects, UE 120 may transmit uplink and/or downlink (UL/DL) PDCP protocol data units (PDUs) that have not been acknowledged by a lower layer (e.g., unacknowledged PDUs) and may duplicate PDCP service data units (SDUs) that are to be forwarded to target CU 803. In some aspects, UE 120 may use the source stack to duplicate UL data sent on the target protocol stack. In some aspects, UE 120 may send a PDCP sequence number (SN) status transfer message to the target CU 803 as soon as the target protocol stack/connection is established to assist the target CU with PDCP reordering and reduce the delays.

As shown by reference number 835, target CU 803 may provide a handover connection setup complete indication to source CU 801. For example, target CU 803 may provide the handover connection setup complete indication to inform source CU 801 that UE 120 successfully completed the target connection setup. In some aspects, the source CU 801 may be informed by UE 120 directly that the target cell connection setup is successful. As shown by reference number 840, source CU 801 may stop sending data to the UE 120 and provide a sequence number (SN) status transfer message to target CU 803 indicating to assist target CU 803 in reducing reordering delays associated with receiving duplicate information. In some aspects, the source CU 801 can buffer some data and assign a sequence number for the PDCP SDUs sent to the target CU 803 considering the SNs for the buffered data at source.

As further shown in FIG. 8, and by reference number 845, target CU 803 sends a path switch request to C-CU 402. As shown by reference number 850, C-CU 402 may perform path switch signaling, which may involve sending signals among components of the C-CU 402 to configure a downlink path in user plane functions (UPFs) of the C-CU 402. As shown by reference number 855, C-CU 402 sends a path switch acknowledgement to target CU 803. As shown by reference number 860, target CU 803 may send an RRC reconfiguration message to UE 120 (e.g., to release a connection with source CU 801). In some aspects, the RRC message to release a connection with source CU 801 may be sent by the source CU 801 itself. In some aspects, this RRC reconfiguration message may occur before the path switch request and ACK shown by reference numbers 845 through 855. In some aspects, UE 120, based at least in part on the RRC reconfiguration message, may release a connection with source CU 801 (and/or a source BS associated with source CU 801). As such, UE 120 may begin sending and/or receiving user data to/from C-CU 402 via target CU 803. As shown by reference number 865, UE 120 may send an RRC reconfiguration complete message to target CU 803. Similar to example 600, target CU 803, as shown by reference number 870, may send a UE context release command to source CU 801, and source CU 801 may send a UE context release complete message back to target CU 803, as shown by reference number 875. In some aspects, the decision to release the connection with source CU 801 may be based at least in part on the RRC reconfiguration complete message described in connection with reference number 865, a measurement report (as described elsewhere herein), and/or the like. Accordingly, in some aspects, based at least in part on receiving the RRC reconfiguration complete message, C-CU 402 may determine a handover completion configuration. For example, when making a completion determination, C-CU 402 can utilize and/or configure one or more thresholds for one or more measurement parameters to perform a handover completion procedure (e.g., to release source BS 110-1).

As indicated above, FIG. 8 is provided as an example. Other examples may differ from what is described with respect to FIG. 8.

Figure 9A:
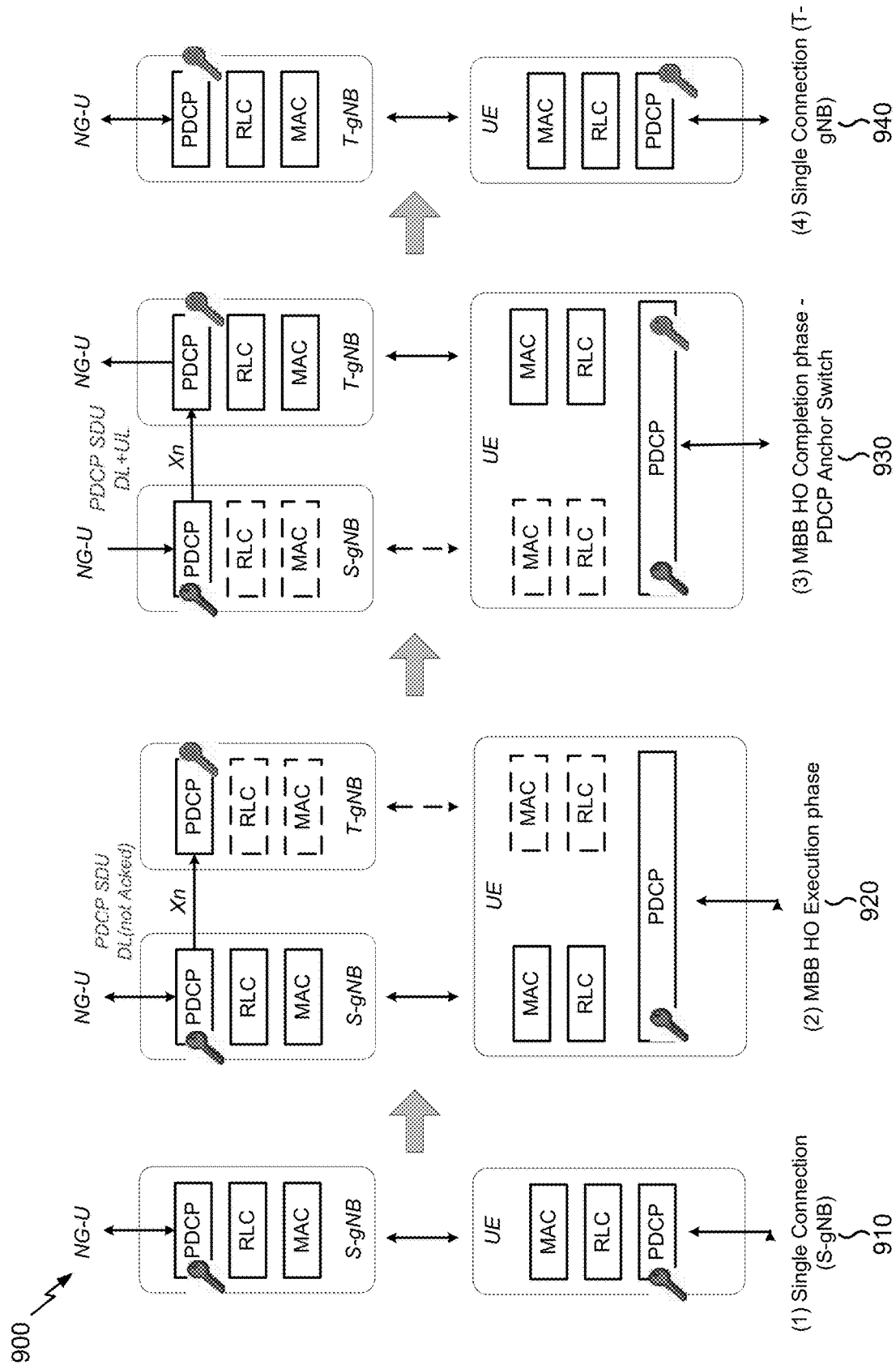
Figure 9B:
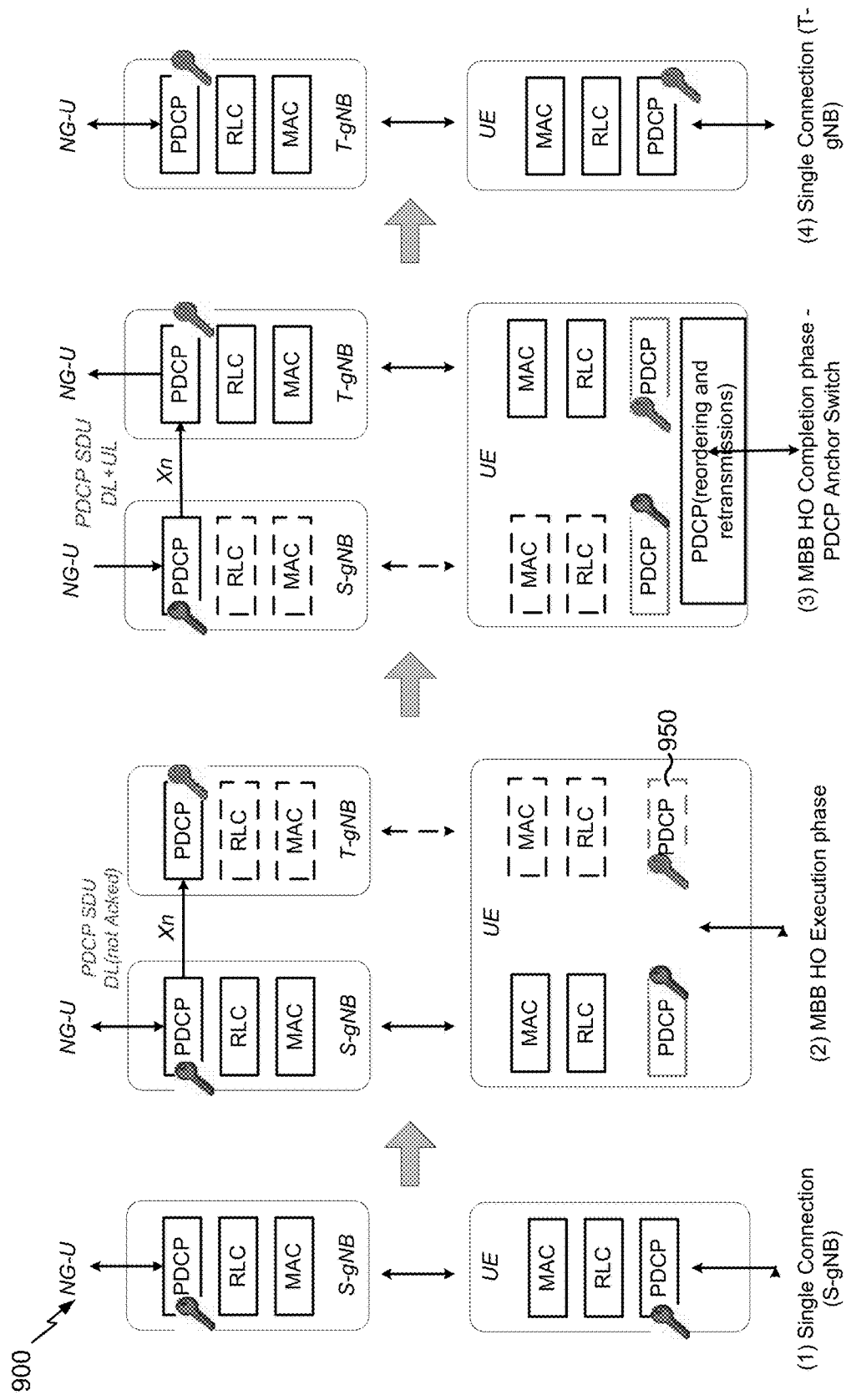

FIGS. 9A and 9B are diagrams illustrating examples 900 of performing a handover procedure of a radio access network using a common PDCP function, in accordance with various aspects of the present disclosure. The examples 900 of FIGS. 9A and 9B show network protocol stacks and data flows for an enhanced make-before-break (either the make-before-break HO procedure or DC role switch based MBB HO), inter-CU handover procedure (e.g., similar to the handover procedure described with respect to example 800 of FIG. 8). FIG. 9A shows the case when a common PDCP entity performs ciphering/deciphering, integrity protection/verification, PDCP SN continuity, reordering, and/or security key management for the source connection and the target connection. FIG. 9B shows the case when respective PDCP entities perform ciphering/deciphering and security key handling, and a common PDCP entity performs reordering and retransmissions. Security keys for a source connection and a target connection are shown proximate to the protocol stack associated with the source connection or the target connection.

As shown in FIG. 9A, and by reference number 910, in a first phase (e.g., before the handover procedure begins) of the example enhanced make-before-break, inter-CU handover procedure, a UE uses a source protocol stack (e.g., with PDCP/RLC/MAC layers) to communicate with a source CU via a UL/DL bearer (using the PDCP, RLC, and MAC entities) and a C-CU. As further shown, a security key of the source protocol stack is handled by a PDCP entity of the source protocol stack.

As shown by reference number 920, in a second phase (e.g., when a connection to a target CU is being configured) of the example enhanced make-before-break, inter-CU handover procedure, the UE configures a target protocol stack (e.g., with PDCP/RLC/MAC entities for the respective radio bearers) and the source CU instructs the target CU (e.g., via an Xn interface between the source CU and the target CU) to configure a corresponding PDCP/RLC/MAC entities for the radio bearers associated with the UE. Furthermore, a common PDCP entity on the UE associated with the bearers for the two protocol stacks supports ciphering/deciphering, integrity protection/verification, reordering, duplicate discarding and maintains security keys of the source protocol stack and the target protocol stack. In such cases, the UE 120 may decide on a security key (e.g., the security key from the source protocol stack or the security key from the target protocol stack) to use based at least in part on the RLC/MAC/PHY stack (e.g., the logical channel unique identifier corresponding to the RLC) from which data is received on the downlink or transmitted on the uplink, based at least in part on an explicit indication in the PDCP PDU header that indicates which security key to use, and/or the like. In some aspects, the source CU and target CU may have different security keys as the source CU and the target CU may employ different PDCP entities.

As shown by reference number 930, in a third phase (e.g., after the target BS connection is complete) of the example enhanced make-before-break, inter-CU handover procedure, the UE may support downlink duplication/retransmission for downlink data received by the source CU and exchanges UL/DL data with the target CU as the primary link. For example, the UE may support UL/DL duplication on a radio bearer (e.g., a signaling radio bearer or a data radio bearer), as described in more detail in connection with the intra-CU handover case, above. Further, as shown in the third phase, the source CU may employ downlink data forwarding to the target CU to enable the target CU to process downlink data from the C-CU sent to the source CU. The target CU may provide this data to the UE on the target connection.

As shown by reference number 940, in a fourth phase (e.g., after the handover is complete) of the example enhanced make-before-break, inter-CU handover procedure, the target CU becomes the source CU as the target CU (or a BS of target CU) serves the UE (and the previous source CU is released) and the UE removes the original source protocol stack.

As shown in FIG. 9B, and by reference number 950, in some aspects, the UE may be associated with respective PDCP entities of the source protocol stack (associated with the source connection) and the target protocol stack (associated with the target connection). The respective PDCP entities may handle security keys of the respective protocol stacks and may perform ciphering/deciphering, integrity protection/verification. Furthermore, as shown by reference number 960, the UE may be associated with a common reordering entity for a bearer configured on both source protocol stack and target protocol stack. The common reordering entity may perform reordering and/or retransmission in accordance with techniques described elsewhere herein.

As indicated above, FIG. 9 is provided as an example. Other examples are possible and may differ from what was described with respect to FIG. 9.

Figure 10:
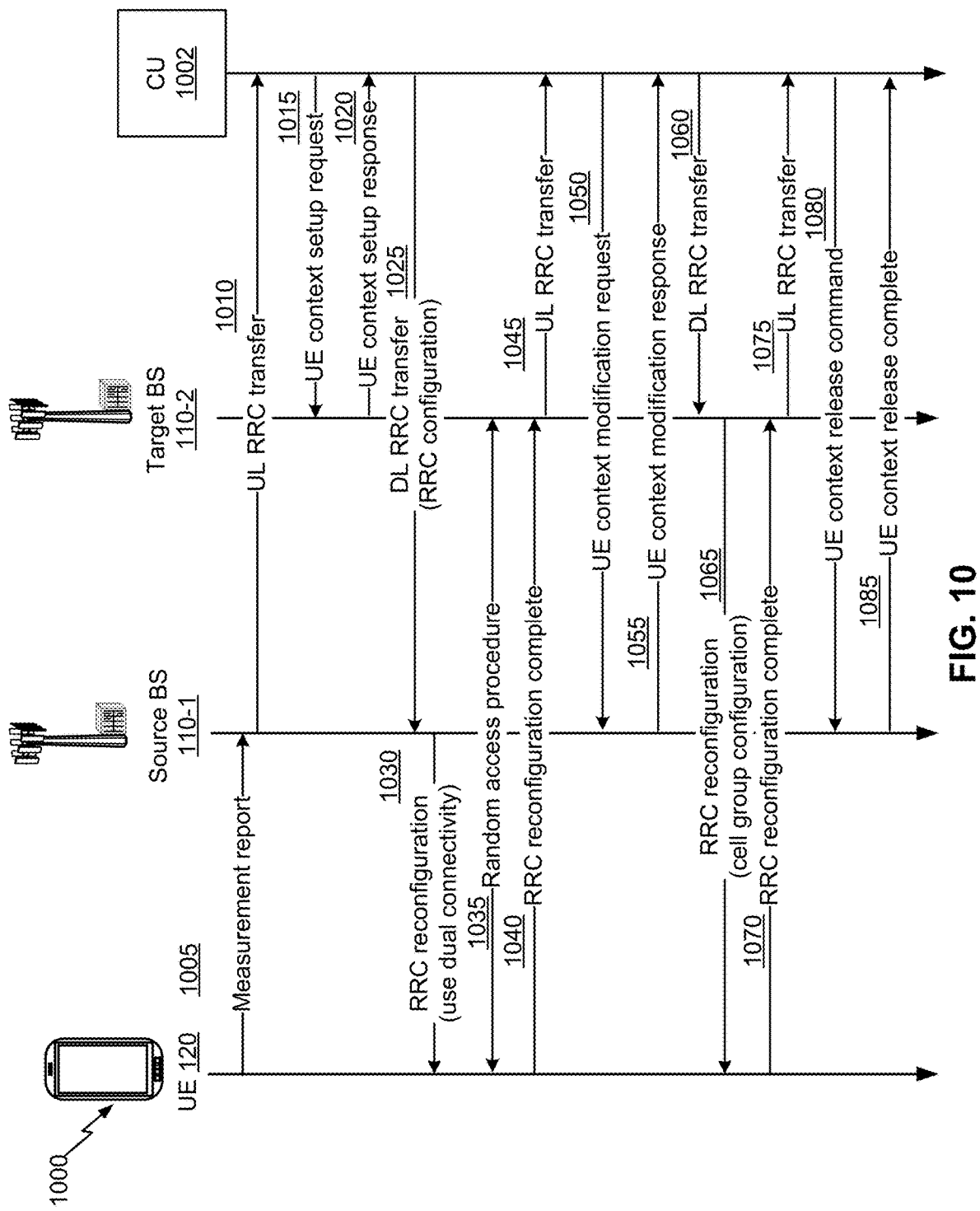

FIG. 10 is a diagram illustrating an example 1000 of determining a handover configuration for a handover procedure of a radio access network, in accordance with various aspects of the present disclosure. Example 1000 is for a dual-connectivity (DC)-based MBB handover. As shown in a call flow of the example 1000 of FIG. 10, an example intra-CU handover procedure is performed, using dual connectivity, in which both a source BS 110-1 and a target BS 110-2 are associated with a same CU 1002. In example 1000 of FIG. 10, source BS 110-1 and target BS 110-2 may be implemented by BS 110 of FIG. 1, TRP 308 of FIG. 3, and/or DU 406 of FIG. 4; and CU 1002 may be implemented by ANC 302 of FIG. 3 and/or C-RU 404 of FIG. 4.

In FIG. 10, UE 120, prior to the beginning of the call flow, may be exchanging user data (e.g., uplink user data and/or downlink user data) with CU 1002 via source BS 110-1. As shown by reference number 1005, a UE 120 sends a measurement report to a source BS 110-1. In some aspects, UE 120 sends the measurement report based at least in part on an event trigger (e.g., a signal measurement that satisfies a threshold) associated with determining that a handover procedure is to be initiated.

As further shown in FIG. 10, and by reference number 1010, source BS 110-1 sends an uplink (UL) radio resource control (RRC) transfer to CU 1002. In some aspects, the UL RRC transfer can include the measurement report. Furthermore, in some aspects, the UL RRC transfer can cause CU 1002 to determine a handover configuration that is to be used for a handover procedure for UE 120. For example, CU 1002 may select from possible handover procedures that may be performed by UE 120 based at least in part on the indicated capability of UE 120. In some aspects, CU 1002 may select a dual connectivity-based handover procedure for UE 120 based at least in part on UE 120 indicating a dual connectivity capability.

As further shown in FIG. 10, and by reference number 1015, CU 1002 sends a UE context setup request to target BS 110-2. For example, CU 1002 may send the UE context setup request to indicate to target BS 110-2 that UE 120 is to be handed over to target BS 110-2 during a dual connectivity handover procedure. For example, the UE context setup request may include a request for SCG configuration information. As shown by reference number 1020, target BS 110-2 sends a UE context setup response. For example, target BS 110-2 may send the UE context setup response to indicate cell group configuration information of target BS 110-2 (e.g., a SCG configuration information and/or MCG configuration information).

As further shown in FIG. 10, and by reference number 1025, CU 1002 sends a downlink (DL) RRC transfer to source BS 110-1. In some aspects, the DL RRC transfer can include a RRC reconfiguration message that indicates a configuration for a handover procedure in which UE 120 is to be handed over from source BS 110-1 to target BS 110-2. For example, the RRC reconfiguration message may indicate cell group configuration information of target BS 110-2. As shown by reference number 1030, source BS 110-1 sends an RRC reconfiguration message to UE 120. In some aspects, the RRC reconfiguration message can include information identifying cell group configuration information associated with target BS 110-2, information identifying a handover configuration, and/or the like. For example, the RRC reconfiguration message may indicate that UE 120 is to assign target BS 110-2 to a SCG of UE 120.

As shown by reference number 1035, UE 120 performs a random access procedure with target BS 110-2 (e.g., to initiate and/or to establish a connection with target BS 110-2). In some aspects, UE 120 can continue to exchange user data (e.g., uplink user data and/or downlink user data) with CU 1002 via source BS 110-1 after the random access procedure. In some aspects, UE 120 may identify and/or determine that UE 120 is to maintain source BS 110-1 in a MCG and target BS 110-2 in a SCG during the dual connectivity-based handover. As shown by reference number 1040, the UE 120 may transmit an RRC reconfiguration complete message. In some aspects, the RRC reconfiguration message may indicate that UE 120 is to use a SCG identifier (e.g., an identifier associated with target BS 110-2) for a primary uplink path.

As shown by reference number 1045, target BS 110-2 sends a UL RRC transfer to CU 1002. For example, the UL RRC transfer may indicate the RRC reconfiguration is complete. Accordingly, in some aspects, based at least in part on receiving the RRC reconfiguration complete message, CU 1002 may determine a handover completion configuration. For example, CU 1002 can configure UE 120 to designate target BS 110-2 to be switched to a MCG and configure UE 120 to release source BS 110-1 from the MCG.

As shown by reference number 1050, CU 1002 sends a UE context modification request to source BS 110-1. For example, the UE context modification request may include a transmission stop indicator to indicate that source BS 110-1 is to be released from serving UE 120 (e.g., to be released from MCG). In some aspects, source BS 110-1 may provide a downlink data delivery status to CU 1002. As shown by reference number 1055, source BS 110-1 sends a UE context modification response to CU 1002. For example, the UE context modification may include an acknowledgement that source BS 110-1 is to be released during the handover procedure, is to be removed from a MCG of UE 120, and/or is to no longer serve UE.

As further shown in FIG. 10, and by reference number 1060, CU 1002 sends a DL RRC transfer to target BS 110-2. For example, the DL RRC transfer to target BS 110-2 may include an RRC reconfiguration message indicating that the handover procedure is to be completed. As shown by reference number 1065, target BS 110-2 sends an RRC reconfiguration to UE 120. For example, the RRC reconfiguration message may indicate that UE 120 is to configure a MCG and SCG. More specifically, the RRC reconfiguration message may indicate that UE 120 is to assign target BS 110-2 to a MCG (e.g., based at least in part on a cell ID associated with target BS 110-2 being included as a MCG of the RRC reconfiguration), that UE 120 is to release source BS 110-1 (e.g., by including the cell ID associated with source BS 110-1 in a "to be released" list, by indicating that source BS 110-1 is to be removed from a cell group of UE 120, and/or the like). Furthermore, UE 120 may then begin exchanging uplink user data and downlink user data with CU 1002 via target BS 110-2.

As shown by reference number 1070, UE 120 may send a RRC reconfiguration complete message to target BS 110-2. In some aspects, the RRC reconfiguration complete message may indicate that UE 120 has released the connection with source BS 110-1. As shown by reference number 1075, target BS 110-2 may send a UL RRC transfer to CU 1002.

In some aspects, the UL RRC transfer may indicate that the RRC reconfiguration complete message was received from UE 120. As shown by reference number 1080, CU 1002 may then send a UE context release command to source BS 110-1 (e.g., so that source BS 110-1 does not continue to attempt to serve UE 120). As shown by reference number 1085, source BS 110-1 sends a UE context release complete message. For example, the UE context release complete message may be an acknowledgement that source BS 110-1 is no longer in communication with and/or serving UE 120.

As indicated above, FIG. 10 is provided as an example. Other examples may differ from what is described with respect to FIG. 10.

Figure 11:
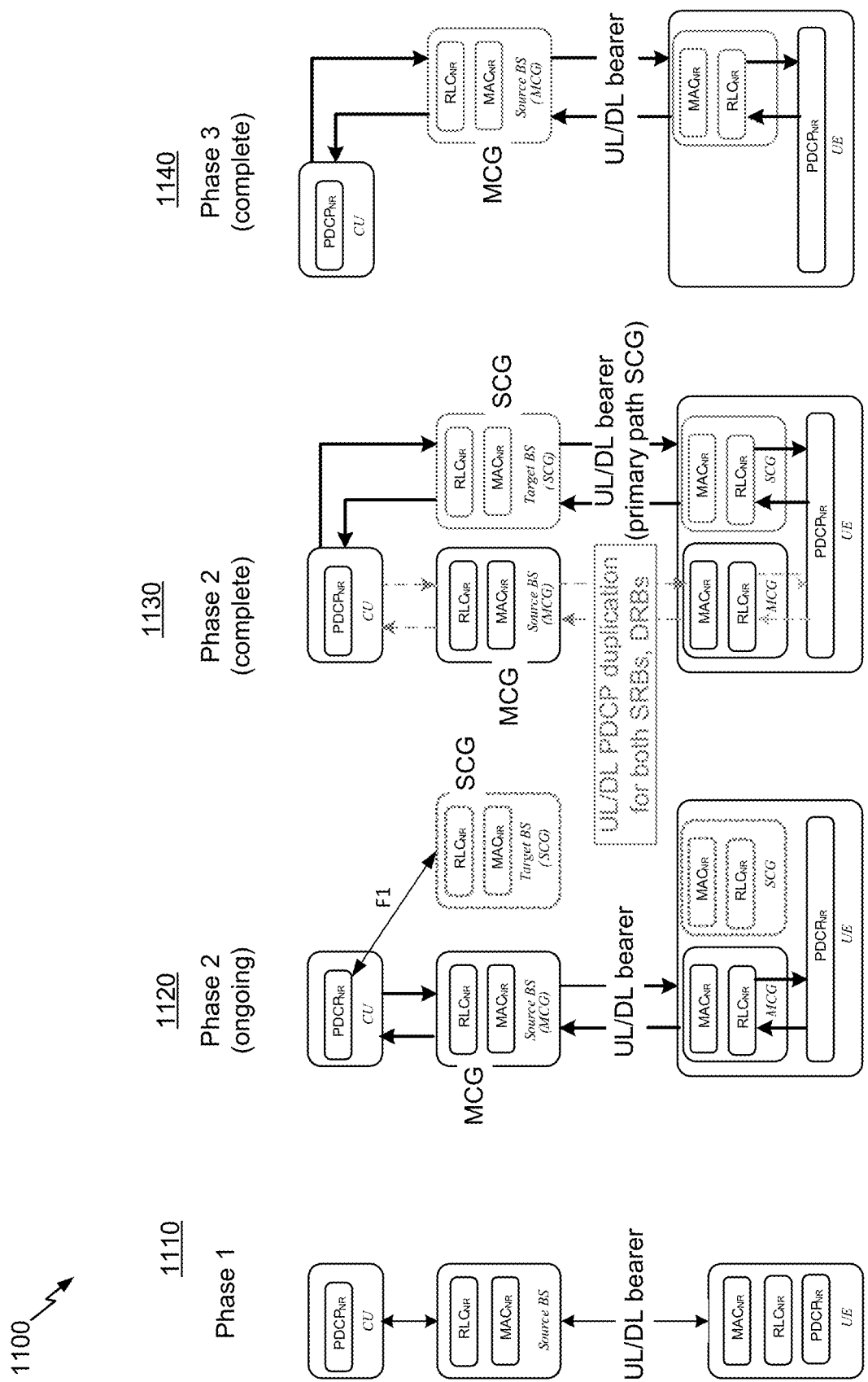

FIG. 11 is a diagram illustrating an example 1100 of determining a handover configuration for a handover procedure of a radio access network, in accordance with various aspects of the present disclosure. The example 1100 of FIG. 11 shows a network protocol stack and data flow for a dual connectivity-based, intra-CU handover procedure (e.g., similar to the handover procedure described with respect to example 1000 of FIG. 10).

As shown by reference number 1110, in a first phase (e.g., before the handover procedure begins) of the example dual connectivity-based, intra-CU handover procedure, a UE uses a source protocol stack (e.g., with PDCP/RLC/MAC layers) to communicate with a source BS via a UL/DL bearer (using the RLC and MAC layers) and a CU (using the PDCP layer). As shown by reference number 1120, in a second phase (e.g., when a connection to a target BS is being configured) of the example dual connectivity-based, intra-CU handover procedure, the UE configures a first protocol stack (e.g., with RLC/MAC layers) for a MCG and a second protocol stack (e.g., with RLC/MAC layers) for a SCG and the CU instructs the target BS to configure a corresponding RLC/MAC stack for a SCG.

As further shown in FIG. 11, and by reference number 1130, in a third phase (e.g., after the target BS connection is complete) of the example dual connectivity-based, intra-CU handover procedure, the UE utilizes PDCP duplication for the UL/DL bearer (e.g., via a signaling radio bearer and/or a data radio bearer) and a primary path for the UL/DL is established for SCG (including the target BS).

As shown by reference number 1140, in a fourth phase (e.g., after the handover is complete) of the example dual connectivity-based, intra-CU handover procedure, the target BS becomes the source BS as the target BS is assigned to the MCG. In other words, a role of the target BS is switched from an SCG to an MCG, thereby providing DC-based MBB handover.

As indicated above, FIG. 11 is provided as an example. Other examples may differ from what is described with respect to FIG. 11.

Figure 12A:
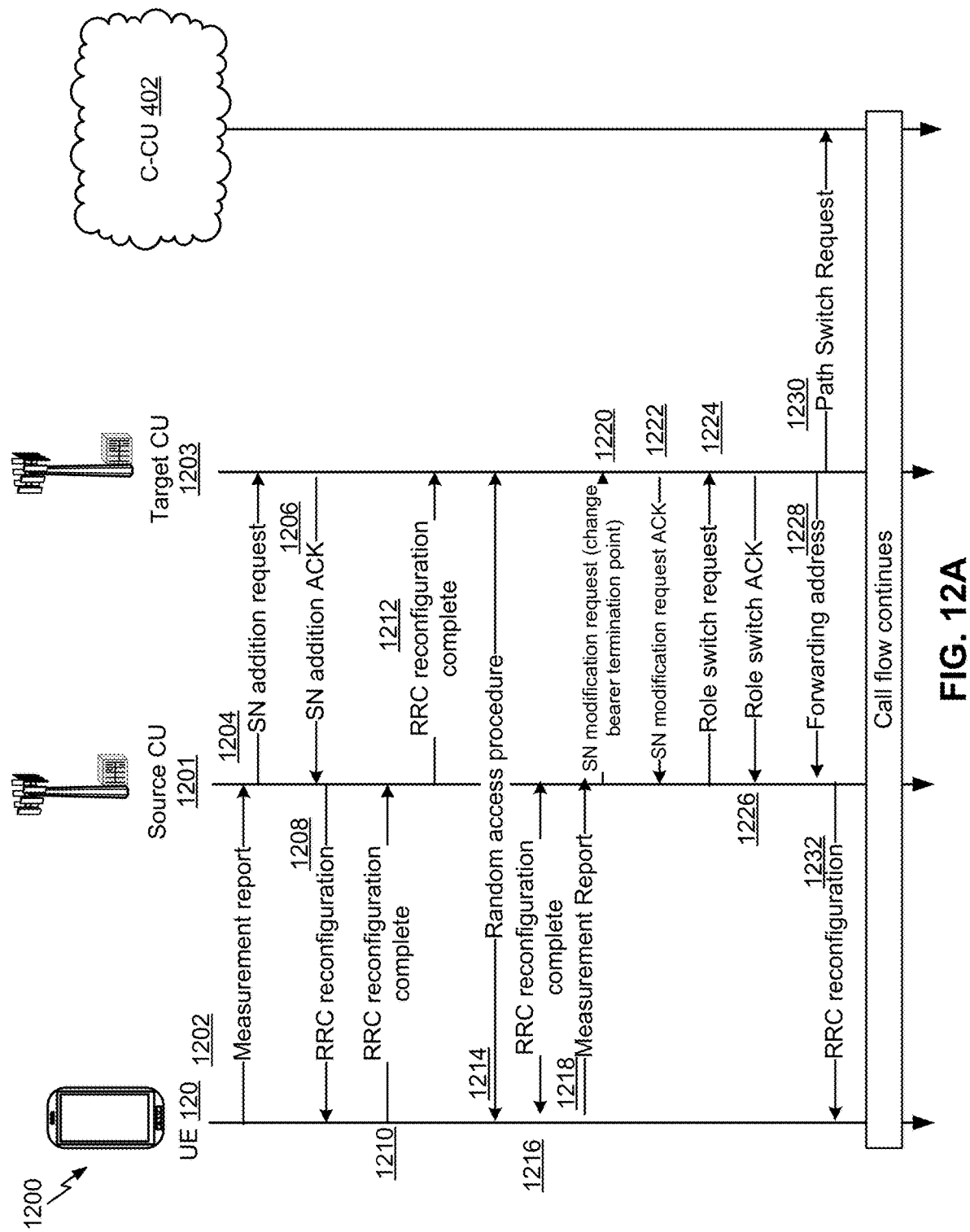

FIGS. 12A and 12B are diagrams illustrating an example 1200 of determining a handover configuration for a handover procedure of a radio access network, in accordance with various aspects of the present disclosure. As shown in a call flow of the example 1200 of FIGS. 12A and 12B, an example inter-CU handover procedure is performed, using dual connectivity, in which a source BS (e.g., a BS 110) is associated with a source CU 1201 and a target BS (e.g., another BS 110) is associated with a target CU 1203 that is different from the source CU 1201. As described herein, any operation performed by source CU 1201 and/or target CU 1203 may correspond to an operation performed by a BS associated with source CU 1201 and/or target CU 1203, respectively As shown, a UE 120, source CU 102, target CU 1203, and a C-CU 402 communicate to perform the enhanced make-before-break handover procedure. In example 1200, source CU 1201 and target CU 1203 may be implemented by C-RU 404 of FIG. 4 and C-CU 402 may be implemented by C-CU 402 of FIG. 4.

In FIG. 12A, UE 120, prior to the beginning of the call flow, may be exchanging user data (e.g., uplink user data and/or downlink user data) with C-CU 402 via source CU 1201. As shown by reference number 1202, UE 120 sends a measurement report to source CU 1201 (e.g., which may be included in a UL RRC transfer of a source BS of source CU 1201). In some aspects, the measurement report may cause source CU 1201 to determine a handover configuration that is to be used for a dual connectivity-based handover procedure for UE 120 (e.g., in a similar manner as example 1000 of FIG. 10).

As further shown in FIG. 12A, and by reference number 1204, source CU 1201 sends a secondary node (SN) addition request (sometimes referred to as an SCG addition request) to target CU 1203. In some aspects, the SN addition request may include a request for a security key, a SCG bearer, SCG configuration information, and/or the like. As shown by reference number 1206, target CU 1203 sends a SN addition acknowledge message (e.g., which may include SCG configuration information). As shown by reference number 1208, source CU 1201 sends an RRC reconfiguration message to UE 120. The example RRC reconfiguration message may include at least one of an indication to add target CU 1203 as a SCG, one or more data radio bearers (DRBs) and/or signaling radio bearers (SRBs) mapped to SCG logical channels (LCHs), and/or the like. In some aspects, UE 120 may configure target CU 1203 to be in a SCG using the identified LCH. In some aspects, UE 120 may use a UL/DL data transfer via source CU 1201 using a source protocol stack (e.g., with PDCP/RLC/MAC/PHY layers) without interruption to the UL/DL data transfer.

As further shown in FIG. 12A, and by reference number 1210, UE 120 sends an RRC configuration complete message to source CU 1201. As shown by reference number 1212, source CU 1201 sends a RRC reconfiguration complete message to target CU 1203. As shown by reference number 1214, the UE 120 performs a random access procedure with target CU 1203. As shown by reference number 1216, UE 120 sends a RRC reconfiguration complete message to source CU 1201. In some aspects, UE 120 may maintain a single PDCP and a dual protocol stack (RLC/MAC/PHY), where a source protocol stack is used for communication with source CU 1201 and a target protocol stack is used for communication with target CU 1203. In some aspects, UE 120 supports downlink reception on one or more stacks as the PDCP can continue to be used by source CU 1201. In some aspects, source CU 1201 may switch a downlink bearer to a cell of the MCG and release the bearer for the SCG. As such, UE 120 may send uplink user data to source CU 1201, which can go through target CU 1203 to C-CU 402 and downlink user data from C-CU 402 through source CU 1201, then target CU 1203.

As further shown in FIG. 12A, and by reference 1218, a (subsequent) measurement report is provided by UE 120 to source CU 1201. In some aspects, source CU 1201 may make a handover completion determination (e.g., to perform a role switch to switch target CU to MCG and release source CU 1201 from MCG) based at least in part on one or more of the message indicated by reference numbers 1218 or 1216. As shown by reference number 1220, source CU 1201 sends a role switch request to target CU 1203.

As shown by reference number 1220, the source CU 1203 may provide an SN modification request to the target CU

1203. For example, the source CU 1201 may provide the SN modification request to change a bearer termination point to the target cell for all bearers associated with the UE 120. In some aspects, the source CU 1201 may initiate the SN modification request based at least in part on determining that the role switch is to be performed (e.g., that the master cell group is to be changed to the target cell). As shown by reference number 1222, the target CU 2013 may provide an SN modification request ACK to the source CU 1201. In some aspects, the SN modification procedure and the role switch procedure may be performed as a single step or a single operation. For example, the role switch may be performed via the SN modification request/ACK messages.

In some aspects, the source CU 1201 or the target CU 1203 may perform a role switch procedure from the source CU 1201 to the target CU 1203 to switch a target cell to a master cell group and to transfer bearers of the UE to the target cell with a bearer termination point change in connection with a dual-connectivity (DC)-based MBB handover procedure; transmit or receive information associated with a packet data convergence protocol (PDCP) sequence number (SN) status transfer from the source CU 1201 to the target CU 1203 in connection with the MBB handover or the DC-based MBB handover procedure; and transmit or receive a downlink PDCP SN for data units transmitted by the target CU 1203 for radio link control acknowledged-mode and unacknowledged-mode bearers.

As shown by reference number 1226, target CU 1203 replies with a role switch request acknowledgement. As shown by reference number 1228, source CU 1201 sends a SN status transfer message to target CU 1203.

As shown by reference number 1230, target CU 1203 sends a path switch request to C-CU 402 and as shown by reference number 1232, source CU 1201 sends an RRC reconfiguration message to UE 120. In some aspects, the RRC reconfiguration message indicates that UE 120 is to switch security configuration for radio bearer to target CU 1203 key, switch MCG identifier to target CU 1203, release DRB/RLC/MAC for SCG ID, release of the SCG or the release of the connection with source CU 1201, and/or the like.

In some aspects, UE 120 continues to receive downlink user data from C-CU 402 via source CU 1201, then target CU 1203. In some aspects, the UE, may use different security keys corresponding to a same PDCP entity and/or may have different PDCP entities with a common reordering entity, as described in more detail elsewhere herein.

As shown in FIG. 12B, and by reference number 1234, UE 120 sends an RRC reconfiguration complete message to target CU 1203. As shown by reference number 1236, C-CU 402 performs internal path switch signaling (e.g., based at least in part on path switch request). For example, the internal path switching may include switching between components and/or devices of C-CU 402 and path switches between UPFs of C-CU 402. As shown by reference number 1238, target CU 1203 sends a SN release request to source CU 1201 after the path switch in the core network is successful. As shown by reference number 1240, source CU 1201 replies with a SN release acknowledgement. As shown by reference 1242, after completion of the C-CU internal switching, C-CU 402 sends a path switch acknowledgement to target CU 1203.

As further shown in FIG. 12B, and by reference number 1244, target CU 1203 sends an RRC reconfiguration message to UE 120. In some aspects, the RRC reconfiguration message may indicate the release of the SCG or the release of the connection with source CU 1201. As such, UE 120 may release the connection to source CU 1201. As shown by reference number 1246, UE 120 replies to target CU 1203 with an RRC reconfiguration complete message (indicating that UE 120 completed the reconfiguration in the RRC reconfiguration message). As shown by reference number 1248, target CU 1203 sends a SN release request to source CU 1201. As shown by reference number 1250, source CU 1201 replies to target CU 1203 with a SN release ACK. As shown by reference number 1252, target CU 1203 sends a UE context release message to source CU 1201. As shown by reference number 1254, the source CU 1201 sends a UE context release complete message to target CU 1203.

As indicated above, FIGS. 12A and 12B are provided as one or more examples. Other examples may differ from what is described with respect to FIGS. 12A and 12B.

Figure 13:
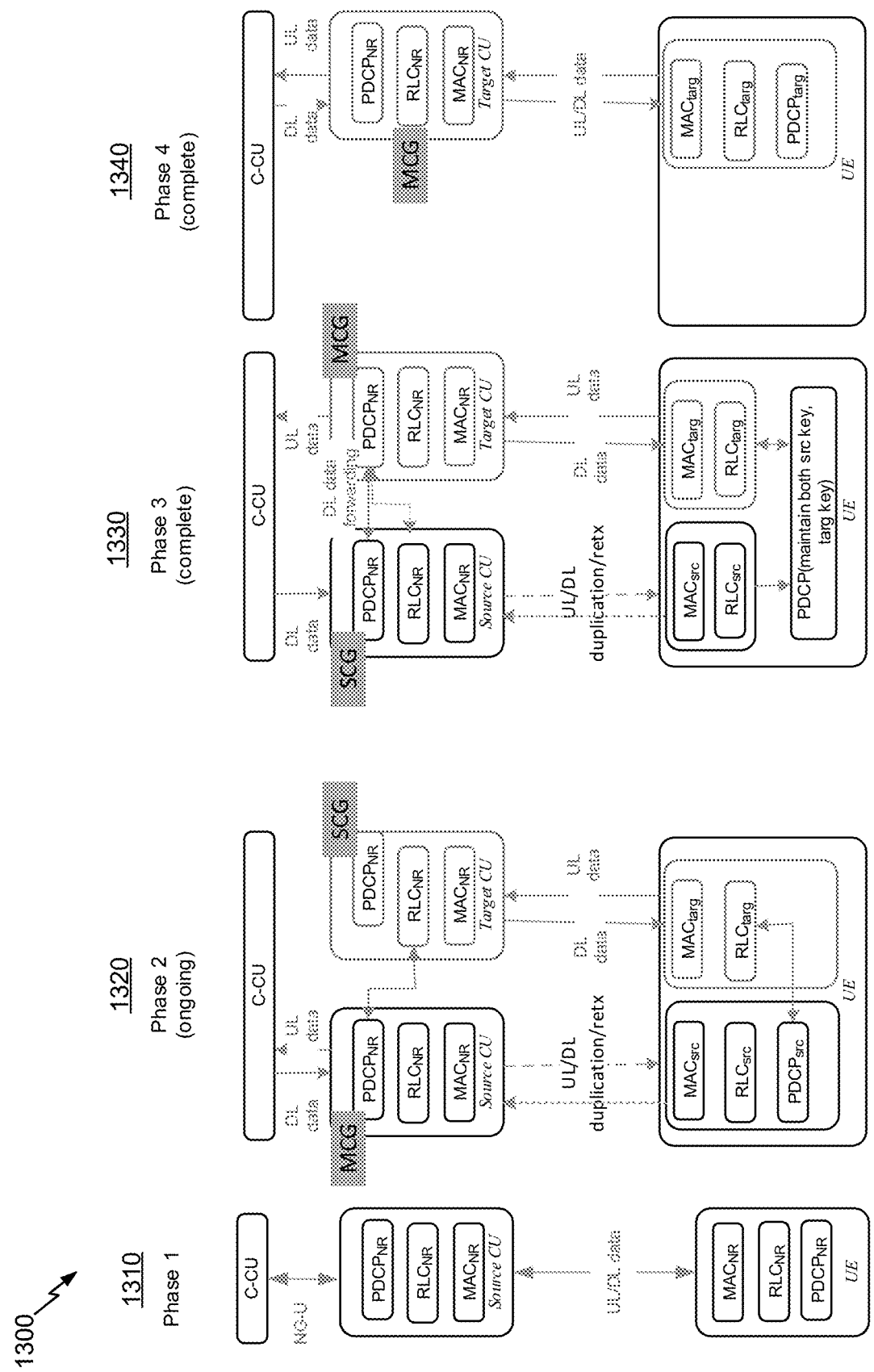

FIG. 13 is a diagram illustrating an example 1300 of a handover configuration to be used in a radio access network, in accordance with various aspects of the present disclosure. The example 1300 of FIG. 13 shows a network protocol stack and data flow for an example dual connectivity-based, inter-CU handover procedure (e.g., similar to the handover procedure described with respect to example 1200 of FIGS. 12A and 12B).

As shown by reference number 1310, in a first phase (e.g., before the handover procedure begins) of the example dual connectivity-based, inter-CU handover procedure, a UE uses a source protocol stack (e.g., with PDCP/RLC/MAC layers) to communicate with a source CU via a UL/DL bearer (using the PDCP, RLC, and MAC entities) and a C-CU. As shown by reference number 1320, in a second phase (e.g., when a connection to a target CU is being configured) of the example dual connectivity-based, inter-CU handover procedure, the UE configures a target protocol stack (e.g., with RLC/MAC layers), and the source CU, designated in a MCG, instructs the target CU, designated in a SCG, (e.g., via an Xn interface between the source CU and the target CU) to configure a corresponding PDCP/RLC/MAC entities for the UE bearers. Furthermore, as shown in the second phase, the UE supports downlink duplication/retransmission for downlink data received by the source CU and uplink data duplication/retransmission via the RLC layer through the target CU (SCG) and source CU (MCG) to the C-CU.

As shown by reference number 1330, in a third phase (e.g., after the target BS connection is complete) of the example dual connectivity-based, inter-CU handover procedure, the UE performs a role switch procedure to switch the target CU to MCG and source CU supports downlink/uplink duplication/retransmission via the source CU, now designated as SCG, and exchanges UL/DL data via the target CU, now designated as the MCG concurrently Furthermore, UE may also configure PDCP entity, which is a common PDCP entity for security handling or separate PDCP entity for security handling and a common reordering/duplicate discarding function handling entity, for the bearers configured and support downlink data reception from the target CU and uplink data transmission to the target CU via the configured PDCP/RLC/MAC entities. In such cases, the UE 120 may decide on a security key to use and perform PDCP functions, as described elsewhere herein.

As shown by reference number 1340, in a fourth phase (e.g., after the handover is complete) of the example dual connectivity-based, inter-CU handover procedure, the target CU is designated in the MCG, as the target CU (or a BS of target CU) serves the UE (and the previous source CU is released).

As indicated above, FIG. 13 is provided as an example. Other examples may differ from what is described with respect to FIG. 13.

Figure 14:
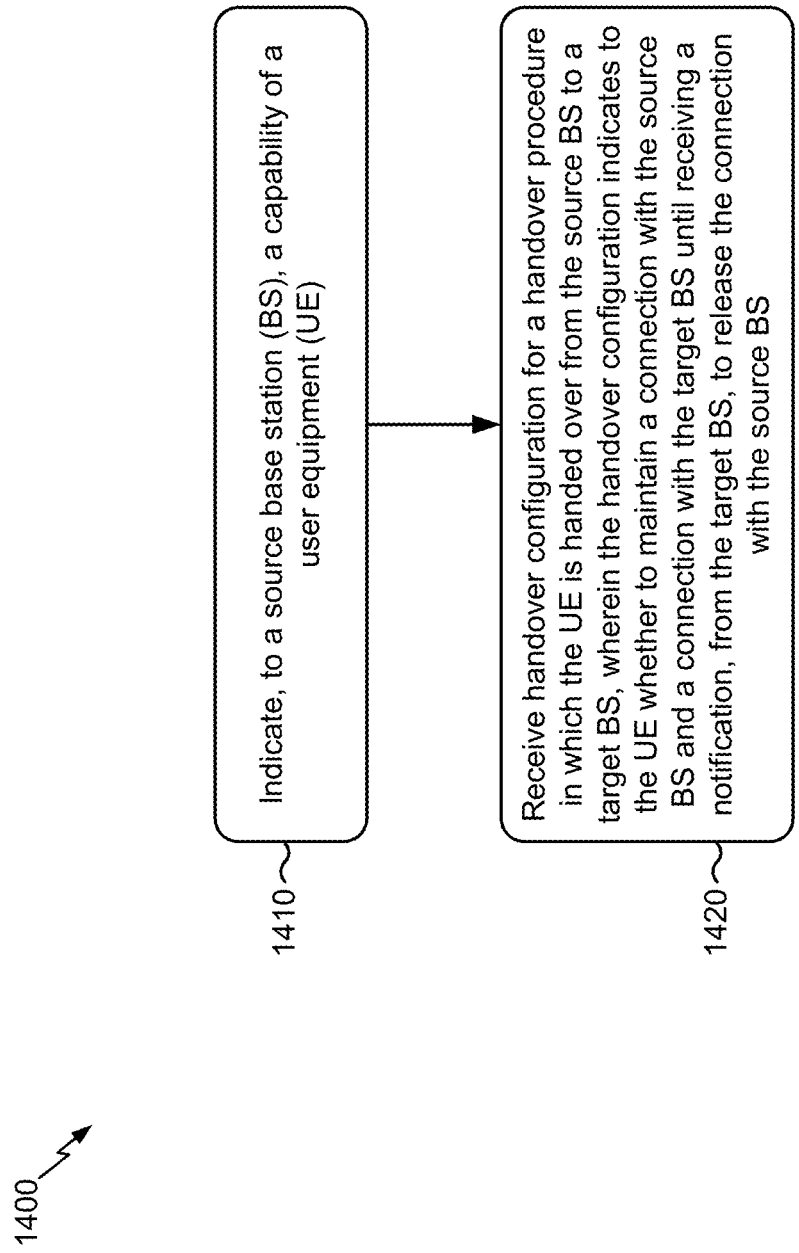
FIG. 14 is a diagram illustrating an example process performed, for example, by a user equipment, in accordance with various aspects of the present disclosure.

FIG. 14 is a diagram illustrating an example process 1400 performed, for example, by a UE, in accordance with various aspects of the present disclosure. Example process 1400 is an example where a UE (e.g., UE 120) indicates a capability associated with a handover procedure to be configured to use the capability during the handover procedure.

As shown in FIG. 14, in some aspects, process 1400 may include indicating, to a source base station (BS), a capability of a user equipment (UE) (block 1410). For example, the UE (e.g., using transmit processor 264, TX MIMO processor 266, controller/processor 280, and/or the like) may indicate a capability of the UE to a source BS, such as BS 110, as described above. In some aspects, UE may indicate the capability based on a detecting a trigger event associated with performing a handover procedure.

As shown in FIG. 14, in some aspects, process 1400 may include receiving a handover configuration for a handover procedure in which the UE is handed over from the source BS to a target BS, wherein the handover configuration indicates to the UE whether to maintain a connection with the source BS and a connection with the target BS until receiving a notification, from the target BS or the source BS, to release the connection with the source BS (block 1420). For example, the UE (e.g., using may receive a handover configuration for a handover procedure in which the UE is handed over from the source BS to a target BS, as described above. In some aspects, the handover configuration indicates to the UE whether to maintain a connection with the source BS and a connection with the target BS until receiving a notification, from the target BS or the source BS, to release the connection with the source BS.

Process 1400 may include additional aspects, such as any single aspect or any combination of aspects described below.

In some aspects, the UE is configured to release the connection with the source BS based at least in part on receiving the notification. In some aspects, the handover configuration includes an indication to use simultaneous transmission and receiving capabilities via the connection with the source BS and the connection with the target BS. In some aspects, the UE is configured to maintain the connection with the source BS while establishing the connection with the target BS. In some aspects, the UE is configured to use the connection with the target BS after successfully establishing the connection with the target BS. In some aspects, the source BS and the target BS are associated with a same centralized unit (CU) of a radio access network (RAN). In some aspects, the source BS is associated with a centralized unit (CU) of a source radio access network (RAN), that is different than a CU associated with the target BS.

In some aspects, the UE is configured to maintain two stacks of a packet data convergence protocol (PDCP) layer, a radio link control (RLC) layer, a medium access control (MAC) layer, or a physical (PHY) layer for simultaneous communication via the connection with the source BS and the connection with the target BS, wherein a target protocol stack of the two stacks is used as a primary stack for communication with the target BS after establishing the connection with the target BS, wherein the UE switches an uplink (UL) data transmission from a source stack of the two stacks to the target protocol stack, or from the target protocol stack to the source stack, based at least in part on UE link selection logic or link selection conditions, or at least in part on instructions received from the target BS or source BS after the connection with the target BS is established, and wherein the UE supports receiving downlink (DL) data from the source stack or target protocol stack or both stacks after the connection with the target BS is established.

In some aspects, the UE is configured to identify a security key to be used for ciphering and integrity protection when a centralized unit (CU) of a target radio access network (RAN) associated with the target BS is different from a source CU associated with the source BS based at least in part on at least one of: a radio link control (RLC) entity (e.g., associated with an LCH ID) from which data is received as an identifier for the security key to be used by a packet data convergence protocol (PDCP) entity; or an explicit bit set in a packet data convergence protocol (PDCP) protocol data unit (PDU) header to indicate the security key is to be used for the PDCP PDU.

In some aspects, the UE is configured to utilize packet data convergence protocol (PDCP) duplication for at least one of a signaling radio bearer (SRB) or a data radio bearer (DRB) via the source BS during the handover procedure. In some aspects, the UE is configured to receive downlink (DL) data from the source BS while sending or receiving data via the connection with the target BS to permit the source BS to empty buffers of the source BS. In some aspects, the UE is configured to receive duplicated downlink (DL) data from the target BS and from the source BS.

In some aspects, after the connection with the target BS is established, to indicate to the target BS whether to send the notification to release the connection with the source BS, the UE is configured to at least one of: transmit an uplink (UL) data transmission to the target BS, transmit a radio resource control (RRC) reconfiguration complete message to the target BS, or provide a measurement report that includes information indicating that channel conditions of the connection with the target BS satisfy a threshold.

In some aspects, the UE is configured to add a target cell of the target BS to a secondary cell group based at least in part on a request received from the source BS; and maintain a source cell of the source BS in a master cell group while establishing the connection with the target BS, wherein the UE is to send uplink (UL) data to the target BS after the connection with the target BS is established.

In some aspects, after the connection with the secondary cell group of the target BS, to indicate to the source BS whether to send the notification to switch the master cell group with the target cell of the target BS and to release the source cell of the source BS, the UE is configured to at least one of: transmit an uplink (UL) data transmission to the target BS, which is forwarded to the source BS by the target BS via Xn interface, transmit a radio resource control (RRC) reconfiguration complete message to source BS or provide one or more multiple measurement reports to the source BS that includes information indicating that channel conditions of the connection with the target BS satisfy a threshold.

In some aspects, the UE is configured to perform a role switch procedure to switch the master cell group with the target cell of the target BS, switch the security key for a packet data convergence protocol (PDCP) from a security key of the source BS to a security key of the target BS, and release the connection with the source cell of the source BS based at least in part on receiving the notifications from the source BS.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
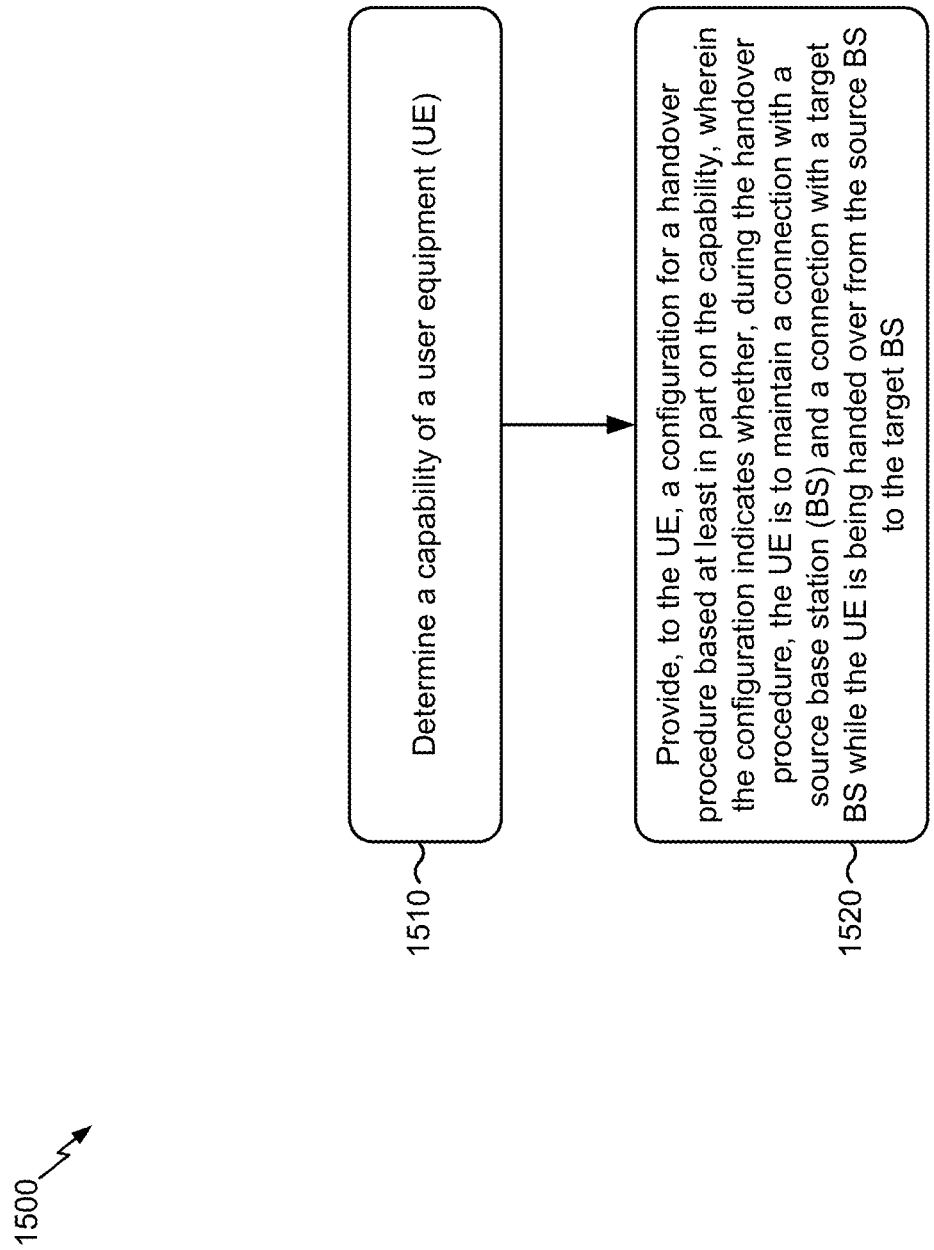
FIG. 15 is a diagram illustrating an example process performed, for example, by a wireless communication device, in accordance with various aspects of the present disclosure.

FIG. 15 is a diagram illustrating an example process 1500 performed, for example, by a wireless communication device in accordance with various aspects of the present disclosure. Example process 1500 is an example where a wireless communication device (e.g., BS 110, ANC 302, NG-CN 304, TRP 308, C-CU 402, C-RU 404, DU 406, and/or the like) determines a type of handover procedure for a UE based at least in part on a capability of the UE and provides a handover configuration for the handover procedure to the UE.

As shown in FIG. 15, in some aspects, process 1500 may include determining a capability of a user equipment (UE) (block 1510). For example, the wireless communication device (e.g., using transmit processor 220, TX MIMO processor 230, controller processor 240, and/or the like) may determine the capability of the UE, as described above. In some aspects, the wireless communication device may determine the capability based on receiving the capability from the UE (e.g., when initiating a handover procedure).

As shown in FIG. 15, in some aspects, process 1500 may include providing, to the UE, a configuration for a handover procedure based at least in part on the capability, wherein the configuration indicates whether, during the handover procedure, the UE is to maintain a connection with a source base station (BS) and a connection with a target BS while the UE is being handed over from the source BS to the target BS (block 1520). For example, the wireless communication device (e.g., using transmit processor 220, TX MIMO processor 230, controller processor 240, and/or the like) may provide a configuration for a handover procedure to the UE based at least in part on the capability, as described above. In some aspects, the configuration indicates whether, during the handover procedure, the UE is to maintain a connection with a source base station (BS) and a connection with a target BS while the UE is being handed over from the source BS to the target BS.

Process 1500 may include additional aspects, such as any single aspect or any combination of aspects described below and/or elsewhere herein.

In some aspects, the wireless communication device is configured to transmit a release message to the UE after data is received from the UE by the target BS, wherein the release message is to cause the UE to release the connection with the source BS. In some aspects, the wireless communication device is configured to determine that the UE is to perform the handover procedure based at least in part on receiving a measurement report from the UE, wherein the measurement report indicates that a measurement parameter satisfies a threshold indicating that the handover procedure is to be performed.

In some aspects, the wireless communication device is configured to receive a measurement report from the UE, wherein the measurement report indicates that the handover procedure is complete. In some aspects, the wireless communication device is configured to transmit a release message to the UE to release the connection with the source BS based at least in part on at least one of receiving an uplink (UL) data transmission from the UE, receiving a RRC reconfiguration complete message from the UE, or receiving a measurement report from the UE that includes information indicating that channel conditions of the connection with the target BS satisfy a threshold.

In some aspects, the wireless communication device is configured to utilize packet data convergence protocol (PDCP) duplication for at least one of a source radio bearer (SRB) or a destination radio bearer (DRB) via the source BS while the UE is establishing the connection with the target BS. In some aspects, the source BS and the target BS are associated with a same centralized unit (CU) of a radio access network (RAN) unit. In some aspects, the source BS is associated with a different centralized unit (CU) of a radio access network (RAN) than the target BS.

In some aspects, the wireless communication device is configured to: receive an uplink data transmission from the UE, and request the source BS to provide an uplink packet data convergence protocol (PDCP) sequence number (SN) status transfer to reduce reordering delays. In some aspects, the wireless communication device is configured to request, via the source BS, that the UE add a target cell of the target BS to a secondary cell group, wherein the wireless communication device is configured to cause the UE to maintain that a source cell of the source BS is in a master cell group while the UE is establishing the connection with the target BS.

In some aspects, the wireless communication device is configured to determine that the UE is to assign the target cell of the target BS to the secondary cell group based at least in part on a measurement report received from the UE, wherein the measurement report indicates that a measurement parameter of the measurement report satisfies a threshold to start the handover procedure.

In some aspects, the wireless communication device is configured to perform, via the source BS, a role switch procedure to assign the target cell of the target BS to the master cell group, and causing the UE to release the source cell of the source BS after the connection with the target BS is established.

In some aspects, the wireless communication device is configured to perform the role switch procedure based at least in part on at least one of receiving an RRC reconfiguration complete message from the UE, or receiving a measurement report from the UE that includes information indicating that channel conditions of the connection with the target BS satisfy a threshold.

In some aspects, the wireless communication device is configured to determine that the UE is to assign the target cell of the target BS to the master cell group based at least in part on a measurement report received from the UE, wherein the measurement report indicates that a measurement parameter of the measurement report satisfies a threshold to start a handover completion procedure.

In some aspects, the wireless communication device is configured to determine that the UE is to release the source cell of the source BS based at least in part on a measurement report received from the UE, wherein the measurement report indicates that a measurement parameter of the measurement report satisfies a threshold to complete the handover procedure.

In some aspects, the wireless communication device is configured to utilize packet data convergence protocol (PDCP) duplication for at least one of a signaling radio bearer (SRB) or a data radio bearer (DRB) via the source cell of the source BS while the UE is establishing the connection with the target cell of the target BS.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
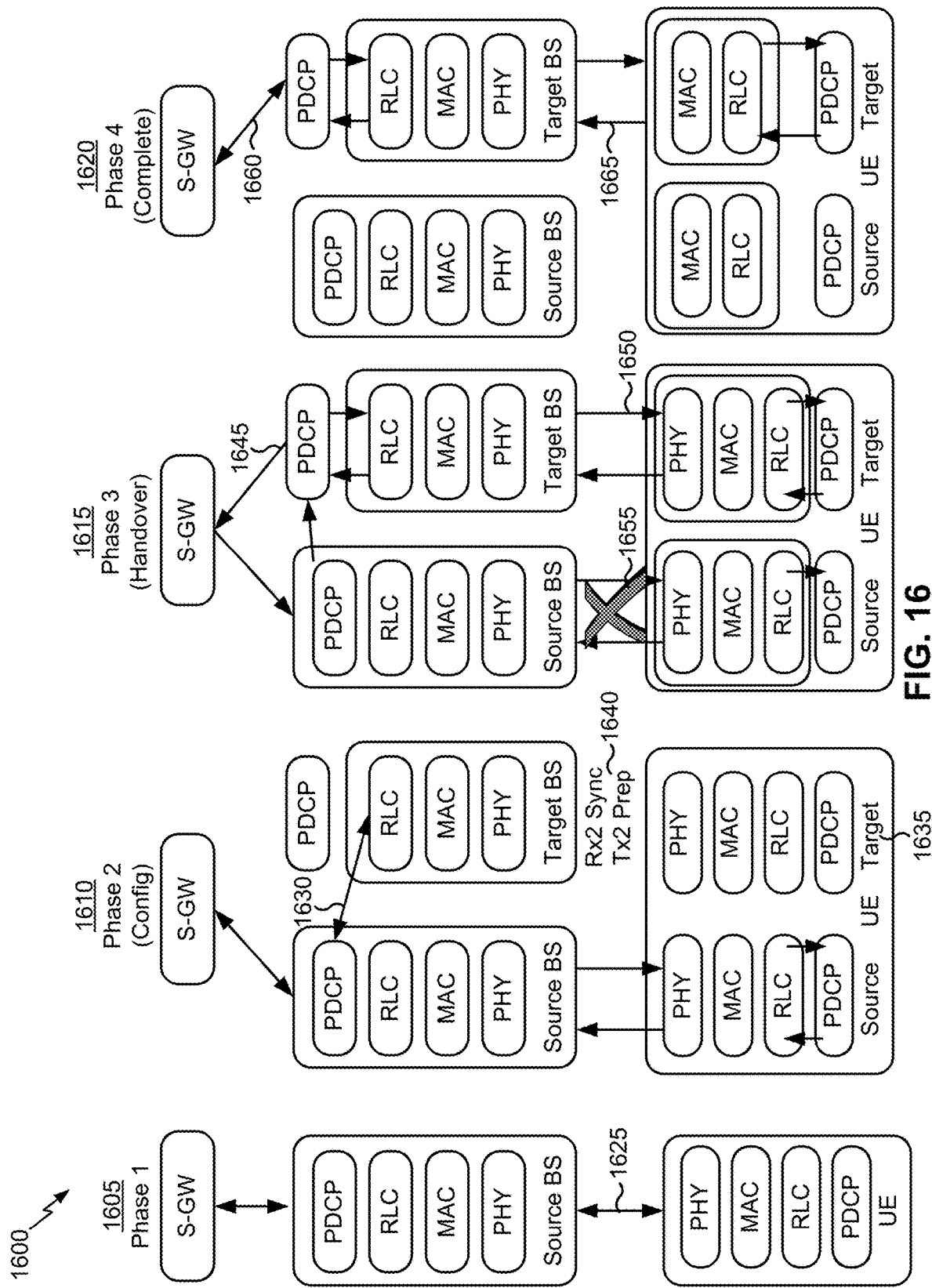
FIG. 16 is a diagram illustrating an example of configuration of a low-latency handover using two UE protocol stacks, in accordance with various aspects of the present disclosure.

FIG. 16 is a diagram illustrating an example 1600 of configuration of a low-latency handover using two UE protocol stacks, in accordance with various aspects of the present disclosure. As shown, example 1600 includes four phases: a phase 1, shown by reference number 1605, a phase 2 (e.g., a configuration phase) shown by reference number 1610, a phase 3 (e.g., a handover phase) shown by reference number 1615, and a phase 4 (e.g., a completion phase) shown by reference number 1620.

As shown by reference number 1605, a UE (e.g., UE 120) may be associated with a protocol stack before handover is performed. For example, the protocol stack may include a physical (PHY) layer, a media access control (MAC) layer, a radio link control (RLC) layer, and a packet data convergence protocol (PDCP) layer. The protocol stack may handle communication with a source BS (e.g., BS 110), which is associated with another protocol stack. As shown by reference number 1625, the UE may have a connection with the source BS. In some aspects, the connection may be associated with a particular communication chain (e.g., receive chain, transmit chain, radio frequency (RF) chain, etc.) of the UE. For example, the UE may have at least two communication chains, and the connection with the source BS may be associated with one of these at least two communication chains of the UE. As further shown, the BS may be associated with a connection with a serving gateway (S-GW). For example, the connection may be a data path of the UE, and/or may be configured by a mobility management entity (MME).

As shown by reference number 1610, the UE and the BS may begin the configuration phase of the handover. For example, the UE may identify a target base station. The process of identifying the target base station is not shown. In some aspects, the UE may identify the target base station based at least in part on a measurement associated with the source base station and/or the target base station. For example, the UE may determine the target base station based at least in part on a measurement offset between a signal power or quality of the source base station and a signal power or quality of the target base station. In some aspects, the measurement offset may be configured to be smaller than for a legacy handover implementation. For example, an A3 measurement offset for identifying a target base station may be associated with a typical value of 2 to 16 decibels and/or the like. In this case, the UE may use a smaller offset (e.g., 0 decibels, 1 decibel, and/or the like), and may not wait until the source BS quality degrades to a very poor RSRP/RSRQ signal quality so that a connection with the source BS is not lost before the handover to the target BS is completed. In some aspects, the UE may provide a measurement report to the source BS identifying the target BS, as described in more detail elsewhere herein.

As shown by reference number 1630, the source BS may establish a backhaul interface with the target BS (e.g., with an L2 layer of the target BS). For example, the backhaul interface may include an X2 interface and/or the like. The backhaul interface may provide for the exchange of configuration information, timing information, and/or uplink or downlink data associated with the handover of the UE from the source BS to the target BS.

As shown by reference number 1635, the UE may generate or configure a second protocol stack. For example, the second protocol stack may be termed herein a target protocol stack. The target protocol stack may be associated with the target BS. For example, the target protocol stack may perform configuration and communication operations with the target BS to enable low-latency handover of the UE from the source BS to the target BS. By using the source protocol stack and the target protocol stack, the UE can continue routing communication with the source BS using the source protocol stack as the handover is configured with the target BS using the target protocol stack, thereby reducing a delay or latency associated with the handover.

As shown by reference number 1640, the target protocol stack of the UE may perform synchronization and/or handover preparation with regard to the target BS. For example, the target protocol stack may detect synchronization signals sent by the target BS, and may synchronize accordingly. In some aspects, the target protocol stack may be associated with a communication chain other than the communication chain associated with the source protocol stack. Additionally, or alternatively, the source protocol stack and the target protocol stack may be associated with one or more shared communication chains. For example, the source protocol stack and the target protocol stack may be associated with different receive chains and the same transmit chain, may be associated with different receive chains and different transmit chains, or may be associated with the same receive chain and the same transmit chain.

Here, the PDCP layer of the source protocol stack is shown as being separate from the PDCP layer of the target protocol stack (these are referred to as PDCP entities elsewhere herein). This may allow the separate handling of security keys for the source BS and the target BS. In some aspects, the source protocol stack and the target protocol stack may use a shared PDCP layer (sometimes referred to herein as a common PDCP function, which may include or be associated with a common PDCP entity). For example, the shared PDCP layer may handle security keys for the source BS and for the target BS. This may conserve processor resources that would otherwise be used to operate two PDCP layers.

As shown by reference number 1615, the UE, the source BS, and the target BS may enter the handover phase. As shown by reference number 1645, the target BS may be associated with a connection with the S-GW. For example, the source BS may provide a handover request to the target BS, and the target BS may configure the connection with the S-GW. The target BS's connection with the S-GW may be later used for a data path for the UE, as described in more detail below. In some aspects, the target BS may provide information regarding the handover to the target BS via the connection, as described in more detail below.

As shown by reference number 1650, the target protocol stack may configure a connection with the target BS. For example, the target protocol stack and the target BS may establish a bearer (e.g., an uplink bearer and/or a downlink bearer). In some aspects, the connection may be associated with the communication chain associated with the target protocol stack. In this way, the target protocol stack initiates a connection with the target BS before the connection with the source BS is released, thereby reducing interruption associated with the handover. For example, the target protocol stack may not initiate the connection until RRC reconfiguration of the UE and/or the target BS is complete, as described in more detail elsewhere herein.

Below is a description of various physical-layer implementation details, after which the description of FIG. 16 will resume at reference number 1655. In some aspects, the UE may use a form of carrier aggregation resources to concurrently connect with the source BS and the target BS. For example, assume that the UE supports 5 component carriers. In such a case, the UE may redirect one or more component carriers from the source BS to the target BS while using one or more remaining component carriers to connect with the source BS. Thus, techniques and apparatuses described herein are supported using downlink carrier aggregation of multiple different BSs.

In some aspects, the UE may use MIMO to concurrently connect with the source BS and the target BS. For example, assume that the UE supports 2 transmit antennas in a given band. During handover, the UE may use one of the transmit antennas for the source BS and one of the transmit antennas for the target BS. The same technique can be extended to multiple antennas in different bands. Thus, techniques and apparatuses described herein are supported using uplink MIMO.

In some aspects, the source BS and the target BS may be associated with a same frequency. In such a case, the handover may be termed an intra-frequency handover. In such a case, and when simultaneous connection with the source BS and the target BS is handled using carrier aggregation, the UE may need at least one of an additional RF chain and/or additional baseband capability to communicate with the source BS and the target BS based at least in part on whether tracking loops for the source BS and the target BS occur in the RF chain or the baseband. When the UE uses a single RF chain, the UE may route samples from the single RF chain to two different baseband buffers (e.g., ones for the source BS and one for the target BS). The two baseband buffers may process the samples as two different component carriers. In such a case, the UE may signal, to the source BS, that the UE supports intra-frequency low-latency handover with a constraint on the maximum number of carriers (or a maximum number of physical resource blocks, a maximum bandwidth, and/or the like). For example, a UE may be capable of aggregating 5 component carriers, but during handover, one of those component carriers would be used for the target BS, so the source BS may change the carrier aggregation configuration according to a capability indication of the UE.

In some aspects, the UE may combine baseband signals for the source BS and the target BS for transmission using a single RF chain. For example, the UE may combine the baseband signals after inverse discrete Fourier transformation (IDFT) is performed, since the timing advance for the two BSs may be different. In such a case, the UE may perform a power backoff (e.g., a maximum power reduction and/or the like) due to an increase in peak-to-average power ratio of the waveform transmitted by the UE.

When the UE uses two RF chains (e.g., one for the source BS and one for the target BS), the UE may use additional baseband capability and additional RF capability. This can be signaled by adding new carrier aggregation combinations of the form BX_BY_BZ+BY (wherein BX, BY, and BZ are band identifiers). This may indicate that the UE can support BX_BY_BZ in carrier aggregation while performing low-low latency handover in BY. In some aspects, the UE may signal each band combination in which the UE can perform low-latency handover. For example, BX_BY_BZ {BX,BY} may indicate that the UE can perform low-latency handover in BX_BY, and not in BZ, under the carrier aggregation combination of BX_BY_BZ.

In the case of intra-frequency handover using MIMO, in some aspects, the UE may decrease (e.g., temporarily) a MIMO capability for the source BS, and may use one or more antennas, associated with the decreased MIMO capability, for the target BS. This may be useful for a case in which the tracking loop occurs in the RF chain, and all RF chains of the UE are in use. As an example, assume that a UE supports aggregating 2 bands with 4 receivers each (for a total of 8 receivers), and assume that 4 of the receivers are usable for a given band or frequency. In this case, the UE may signal to switch 2 of the receivers to a different component carrier, thus decreasing MIMO capability for the source BS. In this case, when initiating the low-latency handover procedure, a transmission mode, channel state information (CSI) feedback scheme, sounding reference signal switching scheme, and/or the like may be configured or reconfigured to accommodate the two-receiver configuration for the source BS.

In some aspects, the UE may apply a time division multiplexing (TDM) pattern with regard to the MIMO resource allocation. For example, the source BS may provide information identifying subframes in which the UE is to monitor a downlink of the target BS. In the identified subframes, the UE may decrease a MIMO capability with regard to the source BS, and may a full MIMO capability in other subframes.

In some aspects, when using MIMO on the uplink for an intra-frequency handover, the UE may use a first transmit chain for the source BS and a second transmit chain for the target BS. In such a case, the first transmit chain and the second transmit chain may interfere with one another. However, if the coding rate is sufficiently small, and with MIMO processing at the source BS and the target BS, decoding can be performed. In some aspects, different uplink control and/or uplink shared resources (e.g. different physical resource blocks) may be assigned for the source BS than for the target BS, which further reduces interference. In some aspects, the UE may select which antenna or receive chain is to be used for a BS based at least in part on a received signal strength of the BS. For example, the UE may use a more powerful antenna or receive chain for a BS associated with a weaker signal (e.g., to ensure that information is successfully transmitted to the BS).

In some aspects, the UE may time-division multiplex the uplink with regard to the source BS and the target BS. In some aspects, the source BS and the target BS may by synchronous with regard to each other. In such a case, a transmission for one BS in one subframe interrupts the other BS in the same subframe (e.g., plus or minus a timing advance difference). For some cases, the timing advance difference may be inconsequential or small. The source BS and the target BS may exchange information (e.g. via an X2 interface) regarding a TDM pattern for the UE, and the UE may use a prioritization rule between grants received from the BSs to determine which transmission is to be performed.

In the asynchronous case, the time reference is not the same in the source BS and the target BS. The information regarding the TDM pattern (e.g., exchanged via the X2 interface) may be configured to avoid overlapping (e.g., a subframe transmitted for the source BS may overlap with two subframes for the target BS). In some aspects, the source BS and the target BS may determine a relative offset between the source BS and the target BS, and may configure the TDM appropriately. In some aspects, the UE may report a received time difference between the BSs as part of radio resource management measurements, so that when a handover is triggered, the BSs can coordinate via the X2 interface. One way to report this offset may be to signal which subframes for the target BS are interfered by a particular subframe of the source BS.

In some aspects, the UE may perform an inter-frequency handover, wherein the source BS and the target BS are associated with different frequencies. In some aspects, the UE may perform the operations described above with regard to the carrier aggregation and MIMO cases to perform inter-frequency handover. For example, when uplink and downlink carrier aggregation are supported in the source and target bands, the UE may perform the operations described above. When downlink carrier aggregation is supported and uplink carrier aggregation is not supported, the UE may switch from the source band to a target band. For example, the UE may report a length of time to switch from one band to another band, and the source BS and/or the target BS may use this information to configure handover of the UE.

As shown by reference number 1655, the source protocol stack may end the connection with the source BS. In some aspects, the source BS may continue to provide downlink data as the connection with the target BS is set up. For example, the source BS may schedule downlink data until the source BS receives an indication from the target BS or until a timer expiry upon receiving an indication from the target BS or until a buffer (e.g., a radio link control buffer) of the source BS is cleared (e.g., is emptied), and thereafter may end the connection with the source BS.

Additionally, or alternatively, the source BS may provide downlink data to the target BS for transmission to the UE via the connection with the target protocol stack, as described in more detail below. In this way, interruption of traffic associated with the handover is reduced, thereby reducing latency associated with the handover and also provides reliability of data transfer during handover. In some aspects, the source BS and the target BS may provide redundant downlink data to the UE. For example, the source BS and the target BS may each provide the same data, thereby reducing a likelihood of unsuccessful decoding of the data and further reducing latency.

As shown by reference number 1620, the UE, the source BS and the target BS may enter a completion phase of the handover. As shown by reference number 1660, the target BS may be associated with a connection with the S-GW. For example, the S-GW may switch a data path of the UE from the source BS to the target BS (e.g., based at least in part on a notification from the target BS that RRC reconfiguration of the UE is complete). As further shown, the source BS has released the connection with the source protocol stack. As shown by reference number 1665, the target BS may be associated with a connection with the UE. For example, the connection may be an uplink/downlink bearer (e.g., a signaling radio bearer and/or a data radio bearer), and may be a primary path to the target UE. In this way, the target protocol stack and the target BS configure low-latency handover of the UE without interrupting a traffic flow that is performed between the source BS and the UE, thereby reducing latency and enabling seamless/lossless handover of the UE.

As indicated above, FIG. 16 is provided as an example. Other examples may differ from what is described with respect to FIG. 16.

Figure 17A:
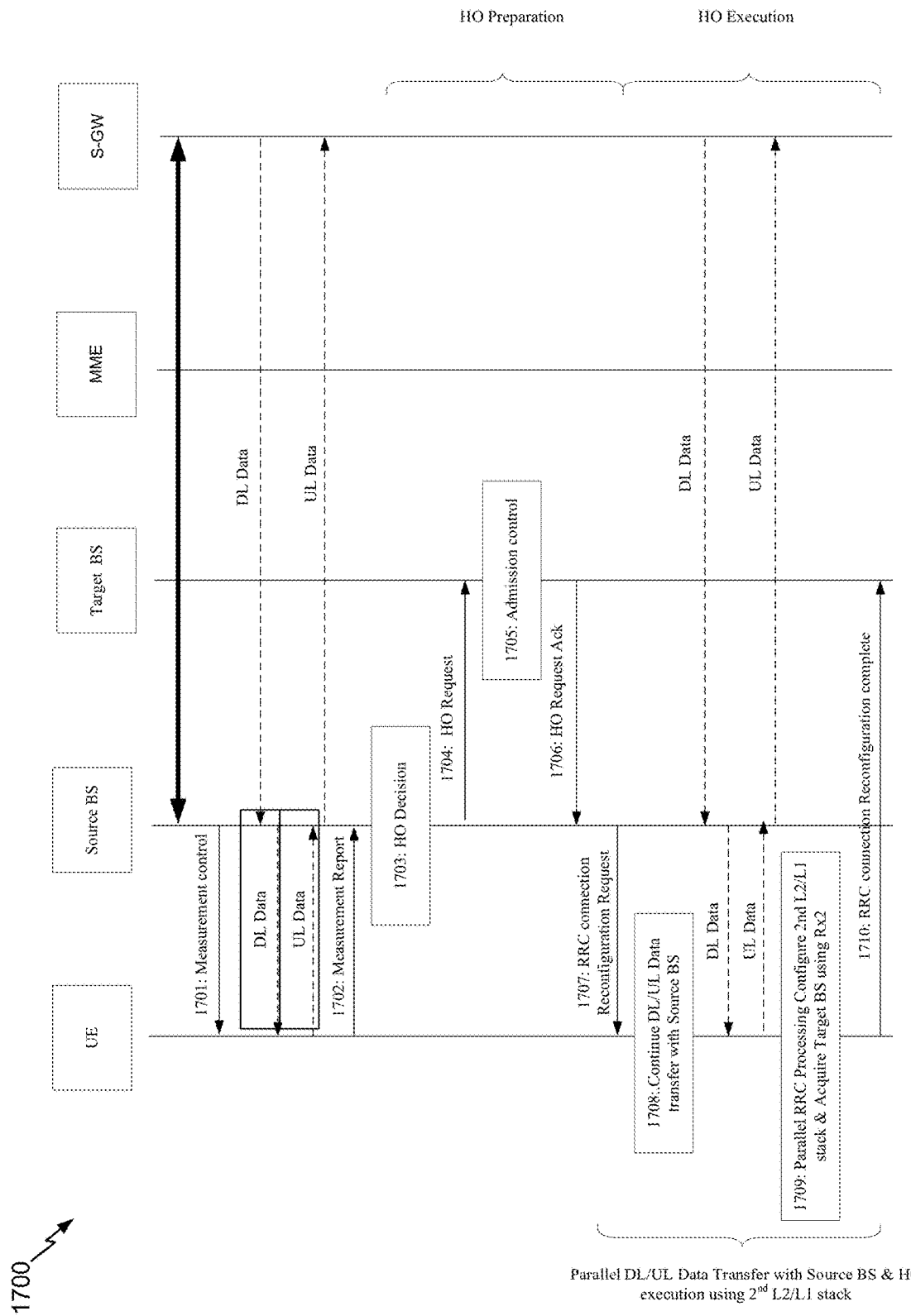
FIGS. 17A and 17B are diagrams of a call flow for configuring a low-latency handover of a UE using two protocol stacks of the UE, in accordance with various aspects of the present disclosure.
Figure 17B:
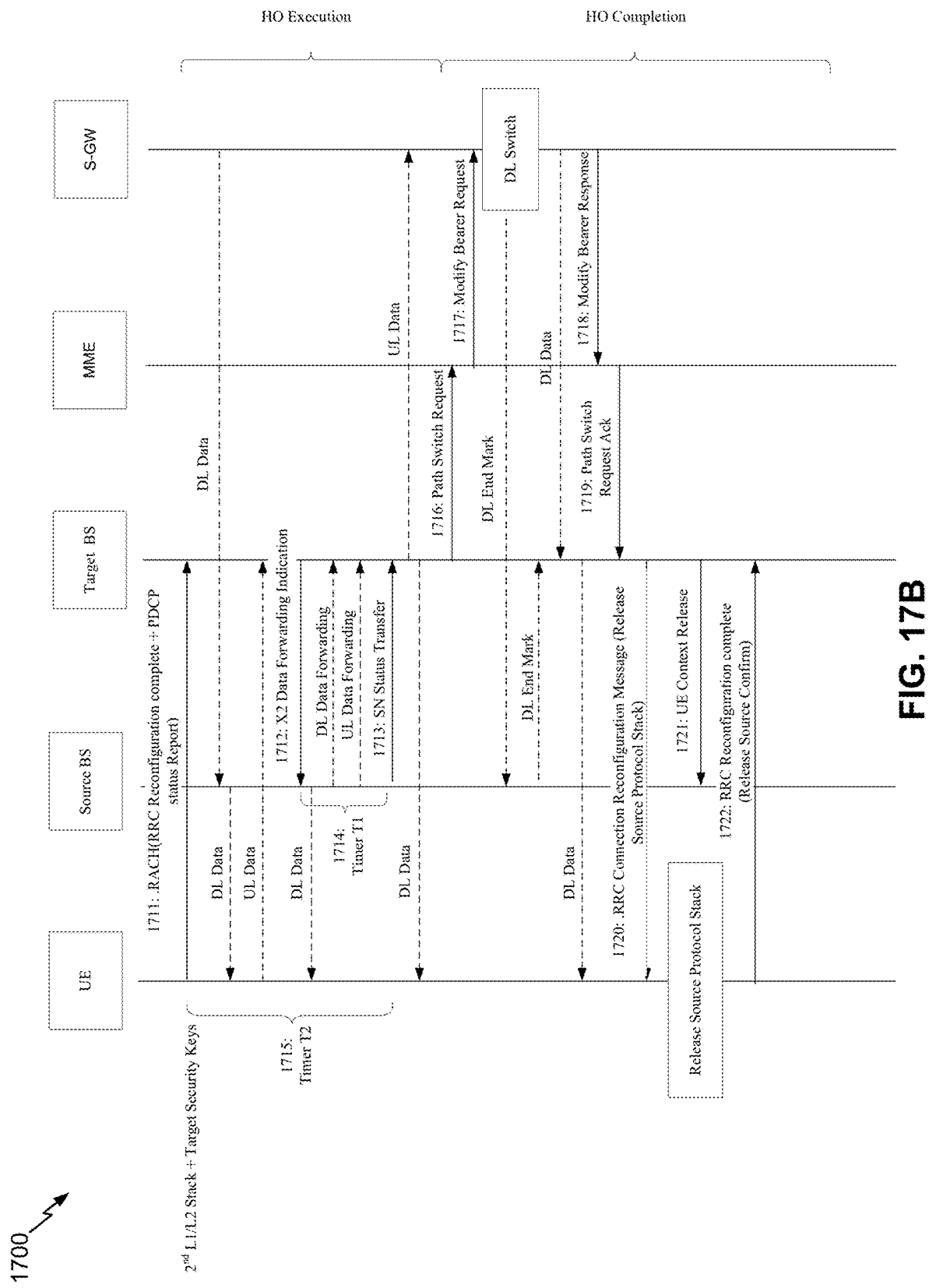

FIGS. 17A and 17B are diagrams of a call flow 1700 for configuring a low-latency handover of a UE using two protocol stacks of the UE, in accordance with various aspects of the present disclosure.

As shown by reference number 1701, the source BS may provide a measurement control message to the UE. The measurement control message may indicate for the UE to determine measurement for handover of the UE. In some aspects, the measurement control message may indicate to determine a particular measurement report, such as an A3 measurement report, and/or may indicate a measurement configuration of the UE.

As shown by reference number 1702, the UE may provide a measurement report to the BS in connection with the measurement control message. For example, the UE may determine measurements for cells that cover the UE. Assume that the target BS is identified based at least in part on the measurements. Assume that the target BS is associated with a threshold measurement value so that the source BS is to configure handover of the UE from the source BS to the target BS. For example, the threshold measurement value may be smaller than a legacy measurement value (e.g., a measurement value for non-low-latency handover), as described in more detail elsewhere herein.

As shown by reference number 1703, the source BS may perform a handover decision based at least in part on the measurement report. For example, the source BS may determine that the UE is to be handed over to the target BS based at least in part on the measurement report (e.g., in connection with the target BS, a network device, and/or the like). As shown by reference number 1704, the source BS may provide a handover request to the target BS in connection with performing the handover decision. For example, the handover request may identify the UE and may indicate that the UE is to be handed over to the target BS. As shown by reference number 1705, the target BS may perform admission control. For example, the target BS may determine whether the UE is permitted to connect with the target BS, may determine whether the handover can be performed, may determine whether the target BS has sufficient resources to handle the UE, and/or the like. Here, the admission control is successful.

As shown by reference number 1706, the target BS may provide a handover request acknowledgment (ACK) to the source BS. For example, the target BS may provide the handover request ACK to indicate that the target BS accepts the handover of the UE.

As shown by reference number 1707, the source BS may provide an RRC connection reconfiguration request to the UE. The RRC reconfiguration request may indicate that the UE is to be handed over from the source BS to the target BS. In some aspects, the source BS may provide the RRC connection reconfiguration request to a source protocol stack of the UE.

As shown by reference number 1708, the UE (e.g., the source protocol stack of the UE) may continue downlink/uplink data communications (e.g., transfer) with the source BS. For example, the UE may continue to receive downlink data and to transmit uplink data to the source BS. In this way, communications of the UE with the source BS may not be interrupted, thereby reducing latency associated with interruption of communications of the UE during handover.

As shown by reference number 1709, the UE may perform parallel RRC processing to configure the target protocol stack (e.g., a second L2/L1 stack) and to acquire the target BS using a second receive antenna of the UE (e.g., Rx2). For example, the UE may configure (e.g., generate, activate, etc.) the target protocol stack to perform the handover. In some aspects, the UE may configure the target protocol stack based at least in part on receiving the RRC reconfiguration request. In this way, the UE may perform RRC processing to configure the handover using the target protocol stack while (e.g., in parallel) maintaining communications with the source BS. The target protocol stack and the source protocol stack may share a common PDCP function (e.g., using a common PDCP entity or respective PDCP entities, as described in more detail elsewhere herein). In some aspects, the common PDCP function may provide (e.g., perform, include, comprise, etc.) PDCP sequence number (SN) continuity for RLC acknowledged mode (AM) and RLC unacknowledged mode (UM) data units that are transmitted on the connection with the source BS or the connection with the target BS. For example, this common PDCP function may be performed for the uplink and/or for the downlink.

In some aspects, the target protocol stack of the UE may synchronize with the target BS. In some aspects, the target protocol stack of the UE may acquire the target BS.

As shown by reference number 1710, the UE may provide a message to the target BS indicating that RRC connection reconfiguration of the UE is complete. For example, the second protocol stack may provide the message indicating that RRC connection reconfiguration of the UE is complete.

As shown in FIG. 17B and by reference number 1711, in some aspects, the UE (e.g., the target protocol stack) may provide random access information to the target BS. For example, the random access information may indicate that RRC connection reconfiguration of the UE is complete. Additionally, or alternatively, the random access information may report a PDCP status of the UE. By providing random access information (e.g., using a random access channel (RACH)), resources of the UE are conserved that would otherwise be used to perform grant-based initial access to the target BS.

As shown, at this point, the UE may provide uplink data to the target BS. For example, the UE may be associated with an uplink connection with the target BS, and may provide the uplink data to the target BS. In some aspects, the UE may be associated with a single transmit chain. For example, the UE may tune the single transmit chain from the source BS to the target BS to provide the uplink data to the target BS. In this way, the UE conserves resources and reduces latency that would be associated with providing the uplink data to only the source BS, or the source BS and the target BS. In some aspects, the UE may provide the uplink data to the source BS and to the target BS, which improves robustness of the uplink data.

As shown by reference number 1712, the target BS may provide a data forwarding notification to the source BS. For example, the data forwarding notification may include an X2 data forwarding notification for an X2 interface between the target BS and the source BS and/or the like. The data forwarding notification may indicate that the source BS is to forward at least a portion of downlink data of the UE to the target BS. For a more detailed description of such data forwarding, refer to FIGS. 18A and 18B, below. By configuring data forwarding between the source BS and the target BS, the target BS reduces latency associated with the handover process pursuant to lost or dropped data.

As shown by reference number 1713, the source BS may provide serial number (SN) information (e.g., an SN status transfer) to the target BS. For example, in a subsequent step of this call flow, the source BS may cease providing downlink data to the UE. If the source BS does not coordinate SNs for the downlink data (e.g., PDCP SNs and/or the like), collisions may occur between downlink data of the source BS and downlink data of the target BS. This may increase latency of the handover process and/or lead to dropped traffic.

As shown by reference number 1714, the source BS may be associated with a first timer (e.g., timer 1). The first timer may identify a backhaul delay period. For example, the first timer may identify a length of time after which the source BS is to stop providing downlink data to the UE. Additionally, or alternatively, the first timer may identify a length of time after which a PDCP of the source BS is to stop providing downlink data to an RLC layer of the source BS for transmission to the UE. In some aspects, after expiry of the first timer, the source BS may continue to transmit downlink data. For example, the source BS may continue to transmit downlink data until a buffer (e.g., an RLC buffer) of the source BS is cleared. As another example, the source BS may continue to transmit downlink data until a connection with the UE is ended or lost. As yet another example, the target BS may provide an indication to cause the source BS to end the connection.

As shown by reference number 1715, the target BS may be associated with a second timer (e.g., timer 2). The second timer may identify a length of time during which the UE may receive downlink data from the source BS and the target BS. For example, the UE may receive redundant data from the source BS and the target BS between the RRC reconfiguration complete message and the SN status transfer message. After the SN status transfer message, the target BS may begin to provide downlink data to the UE. In some aspects, the first timer and/or the second timer may not be used. For example, when backhaul delay of the source BS and the target BS is small (e.g., less than approximately 3 to 5 ms), the first timer and/or the second timer may not be used, thereby conserving processor resources.

As shown by reference number 1716, the target BS may provide a path switch request to an MME. The path switch request may indicate that a data path (e.g., a main path, a primary path, etc.) of the UE is to be switched from the source BS to the target BS. As shown by reference number 1717, the MME may provide a modify bearer request to the S-GW based at least in part on the path switch request to cause the S-GW to switch the data path from the source BS to the target BS.

As shown, the S-GW may switch the data path from the source BS to the target BS. As further shown, the S-GW may provide a downlink end mark to the source BS indicating that the data path has been switched to the target BS. As shown, the source BS may provide the downlink end mark (or information based at least in part on the downlink end mark) to the target BS. At this point, and as shown, the S-GW may provide downlink data for the UE to the target BS, and the target BS may provide the downlink data to the UE (e.g., to the target protocol stack of the UE).

As shown by reference number 1718, the S-GW may provide a modify bearer response to the MME in connection with the modify bearer request. As shown by reference number 1719, the MME may provide a path switch request acknowledgment (ACK) to the target BS. The path switch request acknowledgment may indicate that the data path has been switched from the source BS to the target BS.

As shown by reference number 1720, the target BS may provide, to the UE (e.g., the target protocol stack of the UE), an RRC connection reconfiguration message. The RRC connection reconfiguration message may indicate to release the source protocol stack. As further shown, the UE (e.g., the target protocol stack of the UE) may release the source protocol stack.

As shown by reference number 1721, the target BS may provide a message to cause the source BS to release a UE context of the UE (e.g., the source protocol stack). The source BS may release the UE context in connection with the message. Thus, the target BS may cause the source BS to release the context (e.g., and/or a corresponding connection) with the UE. As shown by reference number 1722, the UE may provide a message indicating that RRC reconfiguration is complete (e.g., that the release of the source BS is complete). For example, the target protocol stack of the UE may provide the message to indicate that handover to the target BS is complete.

As indicated above, FIGS. 17A and 17B are provided as examples. Other examples may differ from what is described with respect to FIGS. 17A and 17B.

Figure 18A:
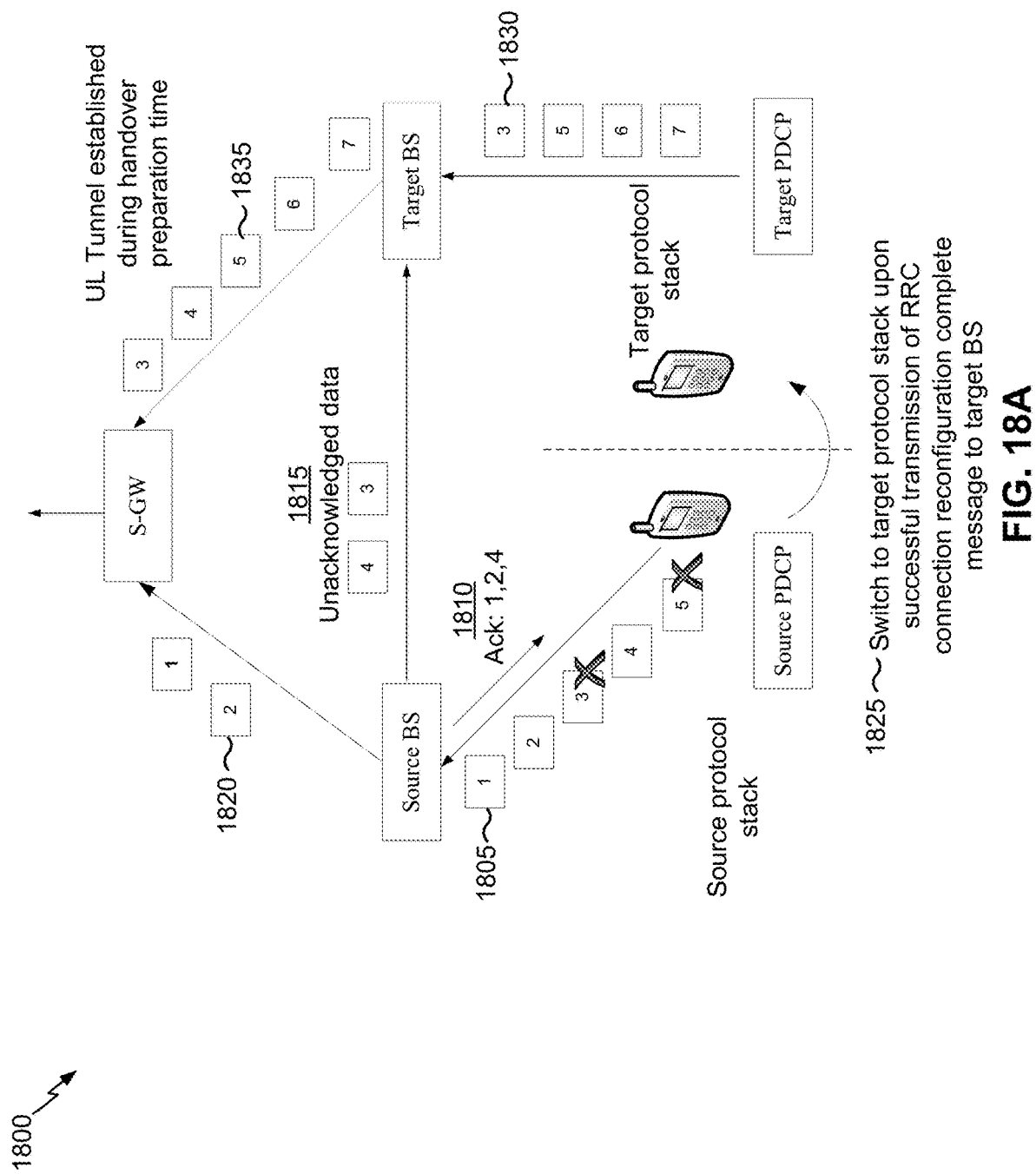
FIGS. 18A and 18B are diagrams of examples of uplink data transmission and downlink data transmission associated with a low-latency handover, in accordance with various aspects described herein.
Figure 18B:
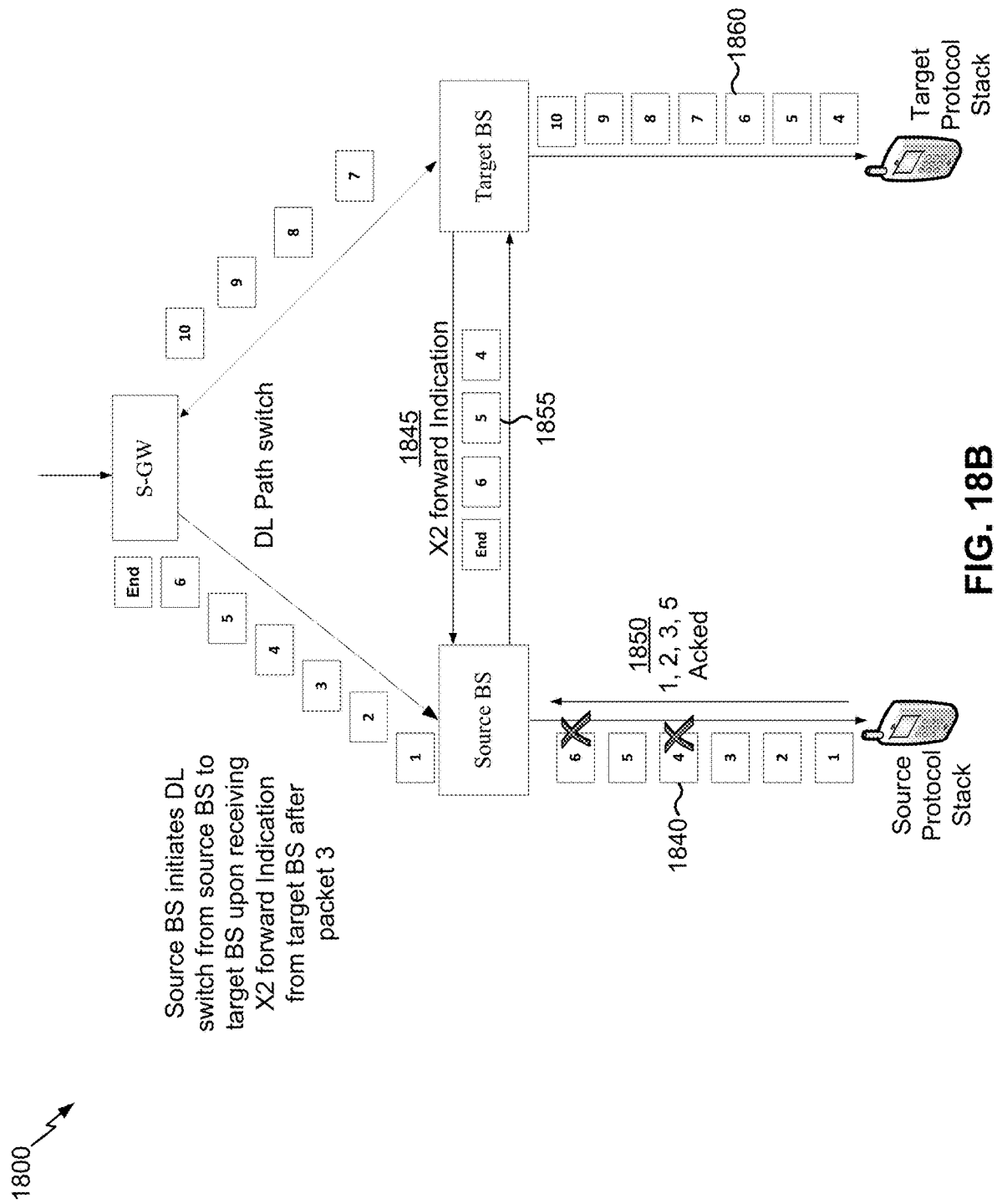

FIGS. 18A and 18B are diagrams of examples 1800 of uplink data transmission and downlink data transmission associated with a low-latency handover, in accordance with various aspects described herein. In FIGS. 18A and 18B, various communications are described with reference to packets, which may include frames, protocol data units (PDUs), service data units (SDUs), and/or the like.

FIG. 18A illustrates an example of uplink transmission. As shown in FIG. 18A, and by reference number 1805, a source protocol stack of a UE (e.g., UE 120 and/or the like) may transmit data packets including packets 1 through 4 to a source BS (e.g., BS 110 and/or the like). For example, the source BS and the UE may be performing a handover of the UE to a target BS (e.g., BS 110 and/or the like). As shown by reference number 1810, the source BS may provide acknowledgments in connection with successfully receiving packets 1, 2, and 4, and may not successfully receive packets 3 and 5.

As shown by reference number 1815, the source BS may provide information identifying unacknowledged data to the target BS. Here, the source BS provides information identifying packets 3 and 4. For example, the source BS may provide information identifying serial numbers of packets 3 and 4. In this example, packet number 5 is not received by Source BS even though packet number 5 was transmitted by UE. As shown by reference number 1820, the source BS may provide packets 1 and 2 to the S-GW. In some aspects, the source BS may provide packet 4 to the S-GW based at least in part on successfully receiving packet 4. In some aspects, the source BS may not provide packet 4 to avoid out-of-order traffic at the S-GW. In such a case, the source BS may provide packet 4 to the target BS so that the target BS can provide packet 4 to the S-GW. Additionally, or alternatively, the source BS may provide information associated with packets 3 and 4, such as soft buffer information and/or the like.

As shown by reference number 1825, the UE may switch uplink transmission to the target protocol stack upon successful transmission of the RRC connection reconfiguration complete message to the target BS. As shown by reference number 1830, the target protocol stack may provide packets 3, 5, 6, and 7 (and so on) to the target BS. For example, the target protocol stack may provide packets 3 and 5 based at least in part on not receiving an acknowledgment with packets 3 and 5. As shown by reference number 1835, the target BS may provide packets 3 through 7 to the S-GW. For example, the target BS may provide packets 3 through 7 via an uplink tunnel with the S-GW established during handover configuration or handover preparation. In this way, data loss associated with handover is avoided by using a source protocol stack and a target protocol stack, thereby reducing latency associated with handover and improving reliability of traffic of the UE during handover.

FIG. 18B illustrates an example of downlink transmission. As shown in FIG. 18B, and by reference number 1840, the source BS may provide data including packets 1 through 6 to a source protocol stack of the UE. As shown by reference number 1845, the source BS may receive a forward indication from the target BS after packet 3. In some aspects, and as shown, the source BS may continue to provide data (e.g., packets 4 through 6) to the source protocol stack. This may reduce latency and packet loss associated with the handover procedure. As shown by reference number 1850, the source protocol stack of the UE may acknowledge packets 1, 2, 3, and 5. For example, the UE may fail to receive packets 4 & 6.

As shown by reference number 1855, the source BS may provide packets 4 through 6 to the target BS as a duplicate transmission. For example, the source BS may provide packets 4 through 6 via the X2 interface between the source BS and the target BS. The source BS may provide packets 4 through 6 in connection with having received the X2 forward indication after packet 3. In other words, the source BS may provide redundant data to the UE and the target BS between receiving the X2 forward indication and ending the connection (e.g., bearer) with the source protocol stack. As shown by reference number 1860, the target BS may provide packets 4 through 6 (received on the X2 interface) and 7 through 10 (received from the S-GW on the downlink path of the UE) to the UE. Thus, latency of the handover procedure is improved and data reliability is increased.

In some aspects, an interface (e.g., an X2 interface and/or the like) between the source BS and the target BS may cause some delay in packet forwarding from the source BS to the target BS. In such a case, the source BS may forward downlink PDUs to the target BS and may provide the downlink packets via a downlink connection with the UE, which may reduce the delay in packet forwarding. Furthermore, if the downlink connection of the source BS is of low quality (e.g., requiring retransmission and/or the like), providing the downlink packets via the X2 interface and the target BS may reduce delay and improve reliability.

In some aspects, a collision of serial numbers between packets (e.g., PDCP PDUs) provided by the source BS and the target BS may occur. This may cause data loss and/or additional latency with regard to the handover. To avoid such a collision during switching of the UE's data path from the source BS to the target BS, the target BS may wait until all packets received from the source BS on the interface (e.g., the X2 interface) have been transmitted by the target BS, and may thereafter start allocating new (e.g., unused) SNs to downlink packets received from the S-GW. For example, the new SNs may start after a last-used SN of a last packet received on the interface. In some aspects, the source BS may reserve a set of PDCP SNs to finish transmitting downlink traffic to the UE until the path switch is completed. The source BS may provide information identifying the reserved set of PDCP SNs to the target BS. The target BS may not use the reserved set of PDCP SNs. In the event that the source BS does not use all of the reserved set, the source BS may generate dummy packets with the unused SNs, or may indicate to the target BS that not all of the reserved set were used. In this way, SN collision between the source BS and the target BS is avoided. Alternatively, when exactly the source BS sends the PDCP SN status transfer to the target BS can be based at least in part on source BS implementation. In some cases, multiple PDCP SN Status Reports can be used between the source BS and the target BS.

As indicated above, FIGS. 18A and 18B are provided as examples. Other examples may differ from what is described with regard to FIGS. 18A and 18B.

Figure 19:
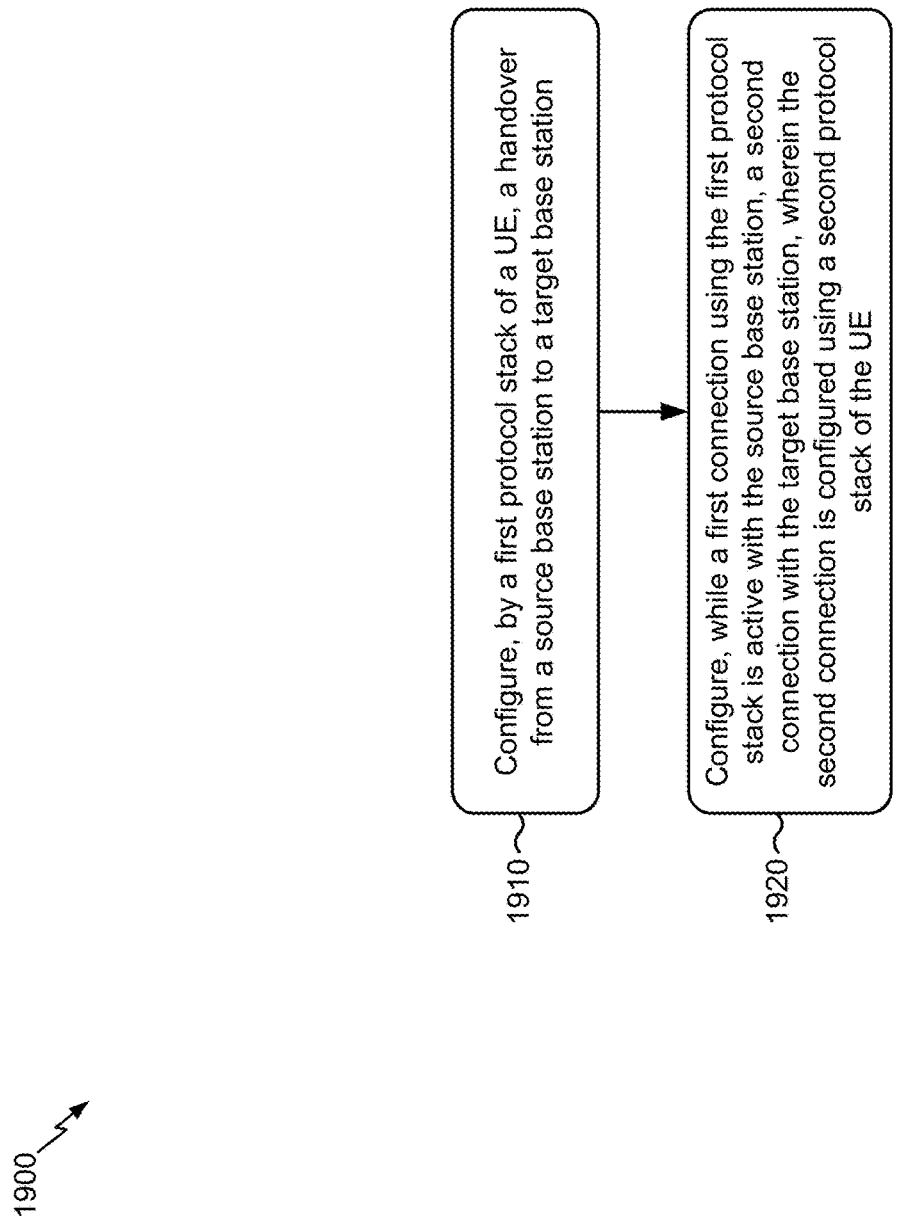
FIG. 19 is a diagram illustrating an example process performed, for example, by a user equipment, in accordance with various aspects of the present disclosure.

FIG. 19 is a diagram illustrating an example process 1900 performed, for example, by a UE, in accordance with various aspects of the present disclosure. Example process 1900 is an example where a UE (e.g., UE 120) performs a low-latency handover using a source protocol stack and a target protocol stack.

As shown in FIG. 19, in some aspects, process 1900 may include configuring, by a first protocol stack of the UE, a handover from a source base station to a target base station (block 1910). For example, the UE may have a first protocol stack for the source base station and a second protocol stack for the target base station. In some aspects, the first protocol stack may be termed a source protocol stack and the second protocol stack may be termed a target protocol stack. The first protocol stack of the UE (e.g., using controller/processor 280 and/or the like) may configure a handover from the source base station to the target base station.

As shown in FIG. 19, in some aspects, process 1900 may include configuring, while a first connection using the first protocol stack is active with the source base station, a second connection with the target base station, wherein the second connection is configured using a second protocol stack of the UE (block 1920). For example, the UE (e.g., using controller/processor 280 and/or the like) may configure a second connection with the target base station while a first connection with the source base station is active. The first connection may be associated with the first protocol stack and the second connection may be associated with the target protocol stack.

Process 1900 may include additional aspects, such as any single aspect or any combination of aspects described below.

In some aspects, the first protocol stack is associated with a first transmit chain and/or a first receive chain, and the second protocol stack is associated with a second transmit chain and/or a second receive chain. In some aspects, the UE may perform a handover operation to permit the UE to be handed over to the target base station. In some aspects, performing the handover operation is based at least in part on a downlink path switch from the source base station to the target base station. In some aspects, the first connection is maintained until a downlink buffer is cleared or an indication is provided to the source base station.

In some aspects, the first connection is released by the UE after the handover is performed based on a UE timer or a signaling indication. In some aspects, the first protocol stack and the second protocol stack are associated with respective packet data convergence protocols. In some aspects, the first protocol stack and the second protocol stack are associated with a shared packet data convergence protocol. In some aspects, the shared packet data convergence protocol handles security keys associated with the source base station and the target base station.

In some aspects, the UE may transmit, to the source base station or the target base station, an indicator that the UE is capable of performing the handover with the first connection and the second connection active. The indicator may include information regarding a capability of the UE.

In some aspects, redundant downlink data is received on the first connection and the second connection while the handover is performed. In some aspects, synchronization is performed with regard to the target base station using the second protocol stack while uplink or downlink data is communicated with the source base station using the first protocol stack. In some aspects, the UE may provide a radio resource control (RRC) reconfiguration complete message to the target base station, via the second connection, to complete the handover.

In some aspects, the UE may switch from providing uplink data to the source base station to providing uplink user plane data to the target base station based at least in part on providing the RRC reconfiguration complete message. In some aspects, the UE may receive a stack release message from the target base station indicating to release the first protocol stack. In some aspects, the handover is triggered based at least in part on an event offset of less than approximately 1 or 2 decibels. In some aspects, the UE is configured for carrier aggregation, wherein the UE is configured to use at least one first carrier for the first connection, and wherein the UE is configured to use at least one second carrier for the second connection.

In some aspects, the UE is configured for uplink multiple-input-multiple-output (MIMO), the UE is configured to use at least one first antenna for the first connection, and the UE is configured to use at least one second antenna for the second connection. In some aspects, the UE may signal a diminished MIMO capability to the source base station to permit the at least one second antenna to be used for the second connection. In some aspects, the at least one second antenna is used for the second connection in one or more particular subframes, and the at least one second antenna is used for the first connection otherwise. In some aspects, different uplink resources are assigned for the source base station than for the target base station. In some aspects, data associated with the first connection and data associated with the second connection are received using a same radio frequency chain, and the data associated with the first connection is processed using a first baseband buffer, and the data associated with the second connection is processed using a second baseband buffer.

In some aspects, the UE is associated with a priority rule to indicate relative priority of communications on the first connection and communications on the second connection. In some aspects, the UE may report a time difference between the source base station and the target base station based at least in part on the source base station and the target base station being asynchronous, the time difference being for configuration of communications on the first connection and communications on the second connection. In some aspects, the source base station is associated with a first frequency and the target base station is associated with a second frequency. The UE may provide, to the source base station or the target base station, information identifying a length of time for the UE to switch from the first frequency to the second frequency.

Although FIG. 19 shows example blocks of process 1900, in some aspects, process 1900 may include additional blocks, fewer blocks, different blocks, or differently arranged blocks than those depicted in FIG. 19. Additionally, or alternatively, two or more of the blocks of process 1900 may be performed in parallel.

Figure 20:
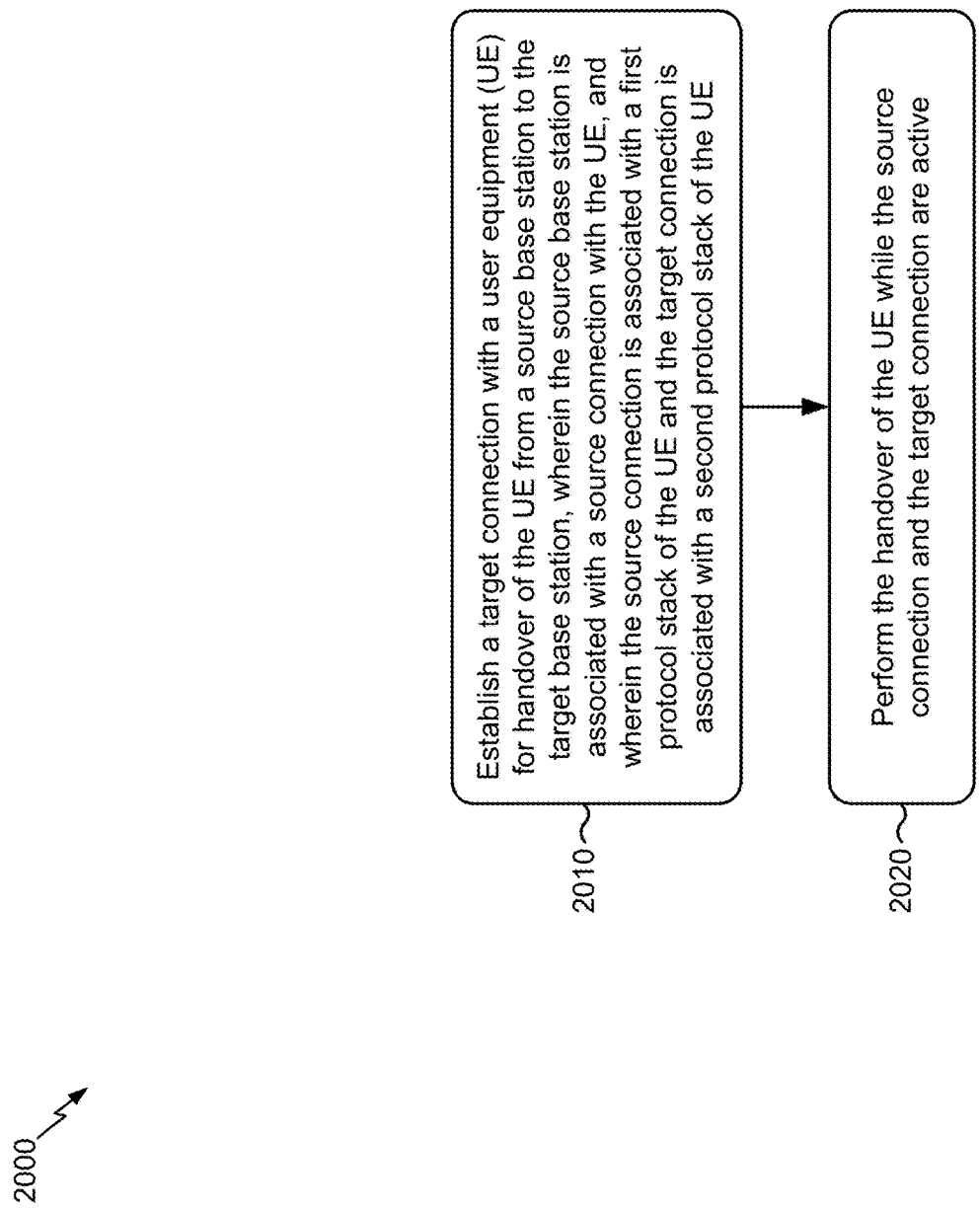
FIG. 20 is a diagram illustrating an example process performed, for example, by a base station, in accordance with various aspects of the present disclosure.

FIG. 20 is a diagram illustrating an example process 2000 performed, for example, by a base station, in accordance with various aspects of the present disclosure. Example process 2000 is an example where a target base station (e.g., BS 110) performs a low-latency handover using a source protocol stack and a target protocol stack.

As shown in FIG. 20, in some aspects, process 2000 may include establishing a target connection with a user equipment (UE) for handover of the UE from a source base station to the target base station, wherein the source base station is associated with a source connection with the UE, and wherein the source connection is associated with a first protocol stack of the UE and the target connection is associated with a second protocol stack of the UE (block 2010). For example, the target base station (e.g., using controller/processor 240 and/or the like) may establish a target connection with a UE. The target connection may be for configuring a handover of the UE from a source base station to the target base station. The source base station may be associated with a source connection with the UE. The source connection may be associated with a first protocol stack of the UE (e.g., a source protocol stack) and the target connection may be associated with a second protocol stack of the UE (e.g., a target protocol stack of the UE).

As shown in FIG. 20, in some aspects, process 2000 may include performing the handover of the UE while the source connection and the target connection are active (block 2020). For example, the target base station (e.g., using controller/processor 240 and/or the like) may perform the handover of the UE. The target base station may perform the handover of the UE while the source connection and the target connection are active. For example, the second protocol stack of the UE may configure the handover and/or the target connection while communication with the source base station via the source connection is ongoing.

Process 2000 may include additional aspects, such as any single aspect or any combination of aspects described below.

In some aspects, the target base station may perform synchronization with the UE via the second protocol stack of the UE. In some aspects, the target base station may receive a radio resource configuration (RRC) reconfiguration complete message, associated with the handover, from the UE via the target connection. In some aspects, the target base station may provide, via a backhaul interface, an indication to the source base station to cause the source base station to provide downlink or uplink data, associated with the UE, to the target base station. In some aspects, the target base station may transmit a data forwarding notification; and receive downlink data for the UE, wherein the downlink data is transmitted to the UE by the source base station and provided to the target base station via a backhaul interface.

In some aspects, the target base station may transmit, to the UE, an indication to release the first protocol stack. In some aspects, the target base station may initiate a switch of a downlink path of the UE from the source base station to the target base station. In some aspects, before the switch is performed, the target base station is configured to receive downlink data or uplink data, associated with the UE, from the source base station via a backhaul interface. In some aspects, the target base station may provide, to the UE, the downlink data and data destined for the UE from a gateway. In some aspects, the downlink data is provided before the data destined for the UE, and all serial numbers for the downlink data are assigned before any serial numbers for the data destined for the UE, and the serial numbers for the downlink data are different than the serial numbers for the data destined for the UE.

In some aspects, the downlink data is received in association with information identifying serial numbers associated with the downlink data, and the target base station, when assigning serial numbers for the data destined for the UE, assigns no serial number of the serial numbers identified by the information identifying the serial numbers. In some aspects, the target base station may determine at least one of a timing difference or a synchronization offset with the source base station; and configure the handover based at least in part on the timing difference or the synchronization offset.

Although FIG. 20 shows example blocks of process 2000, in some aspects, process 2000 may include additional blocks, fewer blocks, different blocks, or differently arranged blocks than those depicted in FIG. 20. Additionally, or alternatively, two or more of the blocks of process 2000 may be performed in parallel.

Figure 21:
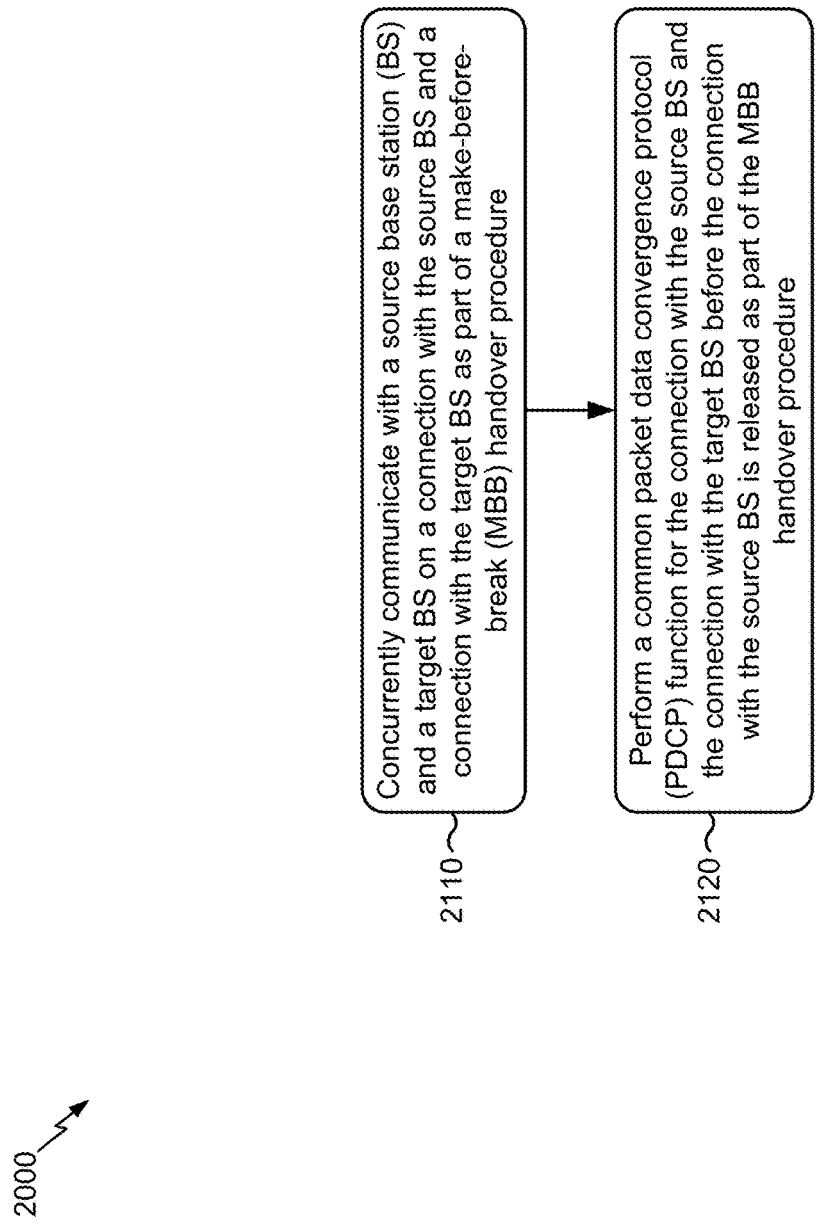
FIG. 21 is a diagram illustrating an example process performed, for example, by a user equipment, in accordance with various aspects of the present disclosure.

FIG. 21 is a diagram illustrating an example process 2100 performed, for example, by a UE, in accordance with various aspects of the present disclosure. Example process 2100 is an example where a UE (e.g., UE 120) performs a low-latency handover using a source protocol stack and a target protocol stack.

As shown in FIG. 21, in some aspects, process 2100 may include concurrently communicating with a source base station (BS) and a target BS on a connection with the source BS and a connection with the target BS as part of a make-before-break (MBB) handover procedure (block 2110). For example, the UE (e.g., using controller/processor 280, transmit processor 264, TX MIMO processor 266, MOD 254, antenna 252, DEMOD 254, MIMO detector 256, receive processor 258, and/or the like) may concurrently communicate with a source BS and a target BS on a connection with the source BS and a connection with the target BS. The UE may concurrently communicate with the source BS and the target BS as part of a MBB handover procedure.

As shown in FIG. 21, in some aspects, process 2100 may include performing a common packet data convergence protocol (PDCP) function for the connection with the source BS and the connection with the target BS before the connection with the source BS is released as part of the MBB handover procedure (block 2120). For example, the UE (e.g., using controller/processor 280 and/or the like) may perform a common PDCP function for the connection with the source BS and the connection with the target BS. The UE may perform the common PDCP function before the connection with the source BS is released as part of the MBB handover procedure.

Process 2100 may include additional aspects, such as any single aspect or any combination of aspects described below and/or elsewhere herein.

In some aspects, the common PDCP function is performed by a common PDCP entity of the UE, wherein the common PDCP entity handles data of radio bearers associated with the connection with the source BS and the connection with the target BS. In some aspects, the common PDCP function comprises security key management for storing security keys of the source BS and the target BS and using the security keys of the source BS and the target BS. For example, the UE may maintain keys for two protocol stacks separately, may derive keys based at least in part on security keys of a base station (e.g., the target BS and/or the source BS), and/or the like. In some aspects, the common PDCP function comprises ciphering, deciphering, integrity protection, or integrity verification for data units transmitted or received over the connection with the source BS or the connection with the target BS. In some aspects, when a security key associated with the target BS is different from a security key associated with the source BS, the UE is configured to identify a security key to be used for ciphering, deciphering, integrity protection, or integrity verification based at least in part on at least one of: a radio link control (RLC) entity from which an identifier for the security key to be used for ciphering, deciphering, integrity protection, or integrity verification is received, an explicit bit in a packet data convergence protocol (PDCP) protocol data unit (PDU) header that indicates the security key to be used for ciphering, deciphering, integrity protection, or integrity verification, or a unique identifier associated with a logical channel or a radio bearer.

In some aspects, the common PDCP function comprises data unit reordering and duplicate discarding for one or more data units that are received on the connection with the source BS and the connection with the target BS based at least in part on retransmission of unacknowledged data units or data unit duplication. In some aspects, the common PDCP function comprises duplication for data units of a radio bearer via the source BS during the handover procedure. In some aspects, the common PDCP function comprises link selection logic for switching an uplink (UL) signaling or user data transmission from a source stack associated with the source BS to a target protocol stack associated with the target BS, or from the target protocol stack to the source stack, based at least in part on link selection conditions or based at least in part on instructions received from the target BS or the source BS after the connection with the target BS is established.

In some aspects, the UE is configured to perform data transmission or reception for a radio bearer via the source BS while the UE is establishing the connection with the target BS or while sending or receiving data via the connection with the target BS. In some aspects, the connection with the source BS and the connection with the target BS are associated with respective physical layer, medium access control layer, or radio link control layer entities.

In some aspects, the connection with the source BS and the connection with the target BS comprise respective data radio bearers and signaling radio bearers. In some aspects, the UE may designate a target cell of the target BS to a secondary cell group based at least in part on a request received from the source BS; and maintain a source cell of the source BS in a master cell group while establishing the connection with the target BS, wherein the UE is configured to send uplink (UL) data to the target BS after the connection with the target BS is established.

In some aspects, after the target cell of the target BS is designated to the secondary cell group, the UE may provide at least one indication to the source BS or the target BS based at least in part on a successful setup of the connection with the target BS; and receive one or more notifications to designate the target cell to the master cell group or to release the source cell of the source BS.

In some aspects, the UE may receive a master cell group serving cell identification field in a radio resource control (RRC) reconfiguration message indicating which configured cell group is the master cell group; perform a role switch procedure to switch the master cell group to the target cell of the target BS, wherein the connection with the source cell of the master cell group is maintained during the role switch procedure; and release the connection with the source cell of the master cell group based at least in part on receiving the one or more notifications. In some aspects, the MBB handover procedure comprises a dual-connectivity based MBB handover procedure.

In some aspects, the MBB handover procedure is based at least in part on a radio resource control (RRC) reconfiguration message indicating that the UE is to perform the MBB handover procedure, and the RRC reconfiguration message includes an indication to use the MBB handover or a dual connectivity based MBB handover based at least in part on a capability of the UE. In some aspects, the UE may signal the capability of the UE to a network entity, wherein the capability is a simultaneous transmission and receiving capability. In some aspects, the UE is to switch the data communication to the connection with the target BS as a primary connection after an RRC reconfiguration complete message is transmitted by the UE.

In some aspects, the UE may release the connection with the source BS based at least in part on a message received from the source BS or target BS. In some aspects, the UE may perform radio resource control signaling for the MBB handover procedure on a signaling radio bearer for the source BS before a signaling radio bearer for the target BS is established; and perform radio resource control signaling for the MBB handover procedure on the signaling radio bearer for the source BS or the signaling radio bearer for the target BS after the signaling radio bearer for the target BS is established.

In some aspects, the common PDCP function comprises at least one of security key management, ciphering or deciphering, or integrity protection or verification. The common PDCP function may be performed by respective PDCP entities corresponding to the connection with the source BS and the target BS.

In some aspects, the source BS and the target BS are associated with a same centralized unit (CU) of a radio access network (RAN). In some aspects, the source BS and the target BS are associated with a same radio access technology.

Although FIG. 21 shows example blocks of process 2100, in some aspects, process 2100 may include additional blocks, fewer blocks, different blocks, or differently arranged blocks than those depicted in FIG. 21. Additionally, or alternatively, two or more of the blocks of process 2100 may be performed in parallel.

Figure 22:
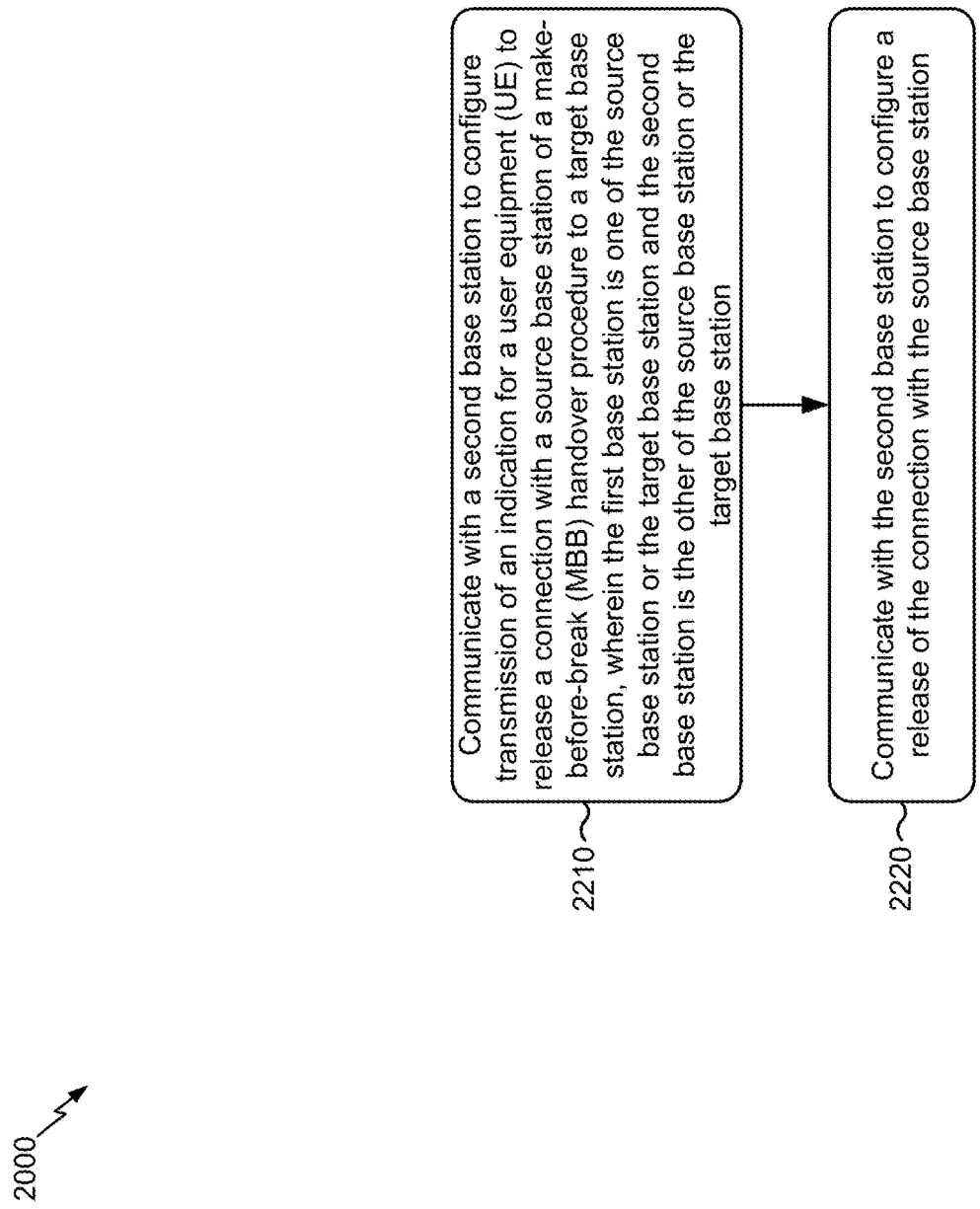
FIG. 22 is a diagram illustrating an example process performed, for example, by a base station, in accordance with various aspects of the present disclosure.

FIG. 22 is a diagram illustrating an example process 2200 performed, for example, by a base station, in accordance with various aspects of the present disclosure. Example process 2200 is an example where a first base station (e.g., BS 110) performs a low-latency handover using a source protocol stack and a target protocol stack.

As shown in FIG. 22, in some aspects, process 2200 may include communicating with a second base station to configure transmission of an indication for a user equipment (UE) to release a connection with a source base station of a make-before-break (MBB) handover procedure to a target base station, wherein the first base station is one of the source base station or the target base station and the second base station is the other of the source base station or the target base station (block 2210). For example, the first base station (e.g., using controller/processor 240, transmit processor 220, TX MIMO processor 230, MOD 232, antenna 234, DEMOD 232, MIMO detector 236, receive processor 238, and/or the like) may communicate with a second base station to configure transmission of an indication for a UE to release a connection with a source base station. The source base station may be associated with an MBB handover procedure to a target base station. The first base station may be one of the source base station and the target base station. The second base station may be the other of the source base station or the target base station. In other words, process 2200 may be performed by the source base station or the target base station.

As shown in FIG. 22, in some aspects, process 2200 may include communicating with the second base station to configure a release of the connection with the source base station (block 2220). For example, the first base station (e.g., using controller/processor 240, transmit processor 220, TX MIMO processor 230, MOD 232, antenna 234, DEMOD 232, MIMO detector 236, receive processor 238, and/or the like) may communicate with the second base station to configure a release of the connection with the source base station.

Process 2200 may include additional aspects, such as any single aspect or any combination of aspects described below and/or elsewhere herein.

In some aspects, the first base station may transmit an indication to release the connection with the source base station. In some aspects, the first base station may transmit or receive information associated with a packet data convergence protocol (PDCP) sequence number (SN) status transfer from the source base station to the target base station in connection with the MBB handover procedure; and transmit or receive a downlink PDCP SN for data units transmitted by the target BS for radio link control acknowledged-mode and unacknowledged-mode bearers. In some aspects, the first base station may request that the UE add a target cell of the target BS to a secondary cell group; and cause the UE to maintain a source cell of the source BS in a master cell group while the UE is establishing the connection with the target BS. In some aspects, the first base station may transmit an indication that the UE is to perform the MBB handover procedure or a dual-connectivity (DC)-based MBB handover procedure based at least in part on a capability of the UE or a type of handover scenario of the MBB handover procedure or the DC-based MBB handover procedure.

Although FIG. 22 shows example blocks of process 2200, in some aspects, process 2200 may include additional blocks, fewer blocks, different blocks, or differently arranged blocks than those depicted in FIG. 22. Additionally, or alternatively, two or more of the blocks of process 2200 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based at least in part on" is intended to mean "based, at least in part, on" unless explicitly stated otherwise.

What is claimed is:

1. A method of wireless communication performed by a user equipment (UE), comprising:
    communicating, as part of a make-before-break (MBB) handover procedure, with a source base station (BS) on a connection with the source BS and with a target BS on a connection with the target BS;
    performing, before the connection with the source BS is released as part of the MBB handover procedure, a common packet data convergence protocol (PDCP) function for the connection with the source BS;
    providing, to the source BS or the target BS, at least one indication based at least in part on a successful setup of the connection with the target BS; and
    receiving, after a target cell of the target BS is added to a secondary cell group, one or more notifications to designate the target cell to a master cell group or to release a source cell of the source BS.

2. The method of claim 1, wherein the common PDCP function is performed by a common PDCP entity of the UE, and wherein the common PDCP entity handles data of radio bearers associated with the connection with the source BS.

3. The method of claim 1, wherein the common PDCP function comprises security key management for storing security keys of the source BS and using the security keys of the source BS.

4. The method of claim 1, wherein the common PDCP function comprises ciphering, deciphering, integrity protection, or integrity verification for data units transmitted or received over the connection with the source BS.

5. The method of claim 4, wherein, when a security key associated with the target BS is different from a security key associated with the source BS, the UE is configured to identify a security key to be used for ciphering, deciphering, integrity protection, or integrity verification based at least in part on at least one of:
    a radio link control (RLC) entity from which an identifier for the security key to be used for ciphering, deciphering, integrity protection, or integrity verification is received,
    an explicit bit in a packet data convergence protocol (PDCP) protocol data unit (PDU) header that indicates the security key to be used for ciphering, deciphering, integrity protection, or integrity verification, or
    a unique identifier associated with a logical channel or a radio bearer.

6. The method of claim 1, wherein the common PDCP function comprises PDCP sequence number (SN) continuity for radio link control (RLC) acknowledged mode and RLC unacknowledged mode data units that are transmitted on the connection with the source BS.

7. The method of claim 1, wherein the common PDCP function comprises data unit reordering and duplicate discarding for one or more data units that are received on the connection with the source BS based at least in part on retransmission of unacknowledged data units or data unit duplication.

8. The method of claim 1, wherein the common PDCP function comprises duplication for data units of a radio bearer via the source BS during the handover procedure.

9. The method of claim 1, wherein the common PDCP function comprises link selection logic for switching an uplink (UL) signaling or user data transmission from a source protocol stack associated with the source BS to a target protocol stack associated with the target BS, or from the target protocol stack to the source protocol stack, based at least in part on link selection conditions or based at least in part on instructions received from the target BS or the source BS after the connection with the target BS is established.

10. The method of claim 1, wherein the UE is configured to perform data transmission or reception for a radio bearer via the source BS while the UE is establishing the connection with the target BS or while sending or receiving data via the connection with the target BS.

11. The method of claim 1, wherein the connection with the source BS and the connection with the target BS comprise respective data radio bearers and signaling radio bearers and are associated with respective physical layer, medium access control layer, or radio link control layer entities.

12. The method of claim 1, further comprising:
adding the target cell to the secondary cell group based at least in part on a request received from the source BS; and
maintaining the source cell in the master cell group while establishing the connection with the target BS,
wherein the UE is configured to send uplink (UL) data to the target BS after the connection with the target BS is established.

13. The method of claim 12, wherein the at least one indication is provided after the target cell is added to the secondary cell group.

14. The method of claim 12, wherein the MBB handover procedure comprises a dual-connectivity based MBB handover procedure.

15. The method of claim 1, further comprising:
receiving a master cell group serving cell identification field in a radio resource control (RRC) reconfiguration message indicating which configured cell group is the master cell group;
performing a role switch procedure to switch the master cell group to the target cell, wherein the connection with the source cell is maintained during the role switch procedure; and
releasing the connection with the source cell based at least in part on receiving the one or more notifications.

16. The method of claim 1, wherein the MBB handover procedure is based at least in part on a radio resource control (RRC) reconfiguration message indicating that the UE is to perform the MBB handover procedure, and wherein the RRC reconfiguration message includes an indication of a handover type as an MBB handover or a dual connectivity based MBB handover based at least in part on a capability of the UE.

17. The method of claim 16, further comprising:
signaling the capability of the UE to a network entity, wherein the capability is a simultaneous transmission and receiving capability.

18. The method of claim 17, wherein the UE is to switch a data communication to the connection with the target BS as a primary connection after an RRC reconfiguration complete message is transmitted by the UE.

19. The method of claim 1, further comprising:
releasing the connection with the source BS based at least in part on a message received from the source BS or the target BS.

20. The method of claim 1, further comprising:
performing radio resource control signaling for the MBB handover procedure on a signaling radio bearer for the source BS before a signaling radio bearer for the target BS is established; and
performing radio resource control signaling for the MBB handover procedure on the signaling radio bearer for the source BS or the signaling radio bearer for the target BS after the signaling radio bearer for the target BS is established.

21. The method of claim 1, wherein the common PDCP function comprises at least one of:
security key management,
ciphering or deciphering, or
integrity protection or verification, and wherein the common PDCP function is performed by respective PDCP entities corresponding to the connection with the source BS.

22. The method of claim 1, wherein the source BS and the target BS are associated with a same centralized unit (CU) of a radio access network (RAN).

23. The method of claim 1, wherein the source BS and the target BS are associated with a same radio access technology.

24. A method of wireless communication, comprising:
performing a role switch procedure from a source base station to a target base station to switch a target cell to a master cell group and to transfer bearers of a user equipment (UE) to the target cell with a bearer termination point change in connection with a dual-connectivity (DC)-based make-before-break (MBB) handover procedure;
transmitting or receiving information associated with a packet data convergence protocol (PDCP) sequence number (SN) status transfer from the source base station to the target base station in connection with an MBB handover procedure or the DC-based MBB handover procedure; and
transmitting or receiving a downlink PDCP SN for data units transmitted by the target BS for radio link control acknowledged-mode and unacknowledged-mode bearers.

25. The method of claim 24, further comprising:
communicating, by a first base station, with a second base station to configure transmission of an indication for a user equipment (UE) to release a connection with the source base station of a make-before-break (MBB) handover procedure to the target base station,
wherein the first base station is one of the source base station or the target base station and the second base station is another one of the source base station or the target base station; and
communicating with the second base station to configure a release of the connection with the source base station.

26. The method of claim 24, further comprising:
transmitting an indication to release the connection with the source base station.

27. The method of claim 24, further comprising:
requesting that the UE add the target cell to a secondary cell group; and causing the UE to maintain a source cell of the source BS in the master cell group while the UE is establishing the connection with the target BS.

28. The method of claim 24, further comprising:
transmitting an indication of a handover type as an the MBB handover procedure or a dual-connectivity (DC)-based MBB handover procedure based at least in part on a capability of the UE or a type of handover scenario of the MBB handover procedure or the DC-based MBB handover procedure.

29. A user equipment (UE) for wireless communication, comprising:
a memory; and
one or more processors operatively coupled to the memory, the memory and the one or more processors configured to:
communicate, as part of a make-before-break (MBB) handover procedure, with a source base station (BS) on a connection with the source BS and with a target BS on a connection with the target BS
perform, before the connection with the source BS is released as part of the MBB handover procedure, a common packet data convergence protocol (PDCP) function for the connection with the source BS;
provide, to the source BS or the target BS, at least one indication based at least in part on a successful setup of the connection with the target BS; and
receive, after a target cell, of the target BS, is added to a secondary cell group, one or more notifications to designate the target cell to a master cell group or to release a source cell of the source BS.

30. A source base station for wireless communication, comprising:
a memory; and
one or more processors operatively coupled to the memory, the memory and the one or more processors configured to:
perform a role switch procedure from the source base station to a target base station to switch a target cell to a master cell group and to transfer bearers of a user equipment (UE) to the target cell with a bearer termination point change in connection with a dual-connectivity (DC)-based make-before-break (MBB) handover procedure;
transmit or receive information associated with a packet data convergence protocol (PDCP) sequence number (SN) status transfer from the source base station to the target base station in connection with an MBB handover procedure or the DC-based MBB handover procedure; and
transmit or receive a downlink PDCP SN for data units transmitted by the target BS for radio link control acknowledged-mode and unacknowledged-mode bearers.

\* \* \* \* \*